US012800818B2

(12) United States Patent
Shramkova et al.

(10) Patent No.: US 12,800,818 B2
(45) Date of Patent: Nov. 17, 2026

(54) SINGLE MODE FULL COLOR WAVEGUIDE COMBINER USING ASYMMETRIC TRANSMISSIVE AND REFLECTIVE DIFFRACTION GRATINGS

(71) Applicant: INTERDIGITAL MADISON PATENT HOLDINGS, SAS, Paris (FR)

(72) Inventors: Oksana Shramkova, Liffré (FR); Valerie Allie, Saint-Armel (FR); Valter Drazic, Betton (FR)

(73) Assignee: INTERDIGITAL MADISON PATENT HOLDINGS, SAS, New York, NY (US)

( * ) Notice: Subject to any disclaimer, the term of this patent is extended or adjusted under 35 U.S.C. 154(b) by 644 days.

(21) Appl. No.: 18/035,464

(22) PCT Filed: Nov. 4, 2021

(86) PCT No.: PCT/EP2021/080665
§ 371 (c)(1),
(2) Date: May 4, 2023

(87) PCT Pub. No.: WO2022/096588
PCT Pub. Date: May 12, 2022

(65) Prior Publication Data

US 2023/0400618 A1 Dec. 14, 2023

(30) Foreign Application Priority Data

Nov. 5, 2020 (EP) .................................... 20306331
Nov. 5, 2020 (EP) .................................... 20306332
Nov. 5, 2020 (EP) .................................... 20306333

(51) Int. Cl.
*G02B 6/00* (2006.01)
*F21V 8/00* (2006.01)
(Continued)

(52) U.S. Cl.
CPC ......... *G02B 6/0016* (2013.01); *G02B 5/1823* (2013.01); *G02B 6/0038* (2013.01);
(Continued)

(58) Field of Classification Search
CPC .... G02B 2027/0123; G02B 2027/0125; G02B 27/0081; G02B 27/0101; G02B 27/0172;
(Continued)

(56) References Cited

U.S. PATENT DOCUMENTS 10,514,509 B2 * 12/2019 Popovic .................. G02B 6/34
10,983,275 B2 * 4/2021 Popovic ................ G02B 6/305
(Continued)

FOREIGN PATENT DOCUMENTS

EP 3540479 9/2019
WO 2019147476 8/2019
(Continued)

OTHER PUBLICATIONS

Kress et al., Waveguide combiners for mixed reality headsets: a nanophotonics design perspective Nanophotonics, vol. 10, No. 1, 2021, pp. 41-74. Oct. 16, 2020. https://doi.org/10.1515/nanoph-2020-0410 (Year: 2020).*
(Continued)

*Primary Examiner* — Peter Radkowski
(74) *Attorney, Agent, or Firm* — Chris Kolefas

(57) ABSTRACT

Example embodiments include an optical system comprising a waveguide substrate. A diffractive coupler is associated with the waveguide substrate, the diffractive coupler comprising at least two diffraction gratings. Each of the diffraction gratings includes a first layer of grating elements and a second layer of grating elements, the first and second layers of grating elements being arranged in different planes. The first and second layers of grating elements each have a grating period associated with the respective diffraction
(Continued)

grating, and the grating elements of the second layer have a lateral offset with respect to the grating elements of the first layer.

20 Claims, 47 Drawing Sheets

(51) Int. Cl.

| | |
|---|---|
| ***G02B 5/18*** | (2006.01) |
| ***G02B 27/00*** | (2006.01) |
| ***G02B 27/01*** | (2006.01) |
| ***G02B 27/28*** | (2006.01) |
| ***G02B 27/42*** | (2006.01) |
| ***G02B 27/44*** | (2006.01) |

(52) U.S. Cl.
CPC ..... *G02B 27/0081* (2013.01); *G02B 27/0101* (2013.01); *G02B 27/286* (2013.01); *G02B 27/4272* (2013.01); *G02B 27/44* (2013.01); *G02B 6/0076* (2013.01); *G02B 2027/0125* (2013.01)

(58) Field of Classification Search
CPC .. G02B 27/286; G02B 27/4272; G02B 27/44; G02B 5/1823; G02B 6/0001; G02B 6/0016; G02B 6/0038; G02B 6/0076
See application file for complete search history.

(56) References Cited

U.S. PATENT DOCUMENTS

| | | | | |
|---|---|---|---|---|
| 11,500,203 | B2 * | 11/2022 | Basset | G02B 5/1861 |
| 2003/0043157 | A1 * | 3/2003 | Miles | G02B 26/0841 359/260 |
| 2006/0262250 | A1 * | 11/2006 | Hobbs | G02B 5/3058 349/96 |
| 2014/0193115 | A1 * | 7/2014 | Popovic | G02B 6/124 385/14 |
| 2015/0224809 | A1 * | 8/2015 | Tompkin | B42D 25/328 283/73 |
| 2016/0231568 | A1 * | 8/2016 | Saarikko | G02B 5/1866 |
| 2017/0269297 | A1 * | 9/2017 | Popovic | G02B 6/34 |
| 2019/0383984 | A1 * | 12/2019 | Menezes | G02B 6/0076 |
| 2020/0241301 | A1 * | 7/2020 | Basset | G02B 5/1814 |

FOREIGN PATENT DOCUMENTS

| | | |
|---|---|---|
| WO | 2021233877 | 11/2021 |
| WO | 2021233968 | 11/2021 |

OTHER PUBLICATIONS

R. M. A. Azzam, Phase shifts in frustrated total internal reflection and optical tunneling by an embedded low-index thin film, J. Opt. Soc. Am. A 23, 960-965 (2006) (Year: 2006).*

Joseph H. Apfel, Phase retardance of periodic multilayer mirrors, Appl. Opt. 21, 733-738 (1982) (Year: 1982).*

Atkins et al., Investigating thin film interference with a digital camera, Am. J. Phys. 78, 1248-1253 (2010) https://doi.org/10.1119/1.3490011 (Year: 2010).*

Kress, Optical Waveguide Combiners for AR Headsets: Features and Limitations, SPIE Proceedings; [Proceedings of SPIE ISSN SPIE, US, vol. 11062, Jul. 16, 2019 (Jul. 16, 2019) , pp. 1106200-1106200.

Varghese, et al., Influence of an Edge Height on the Diffracted EM Field Distribution, In 2019 21st International Conference on Transparent Optical Networks (ICTON), pp. 1-4. IEEE, 2019.

Boriskin et al., Near Field Focusing by Edge Diffraction, Optics Letters, vol. 43, No. 16, Aug. 2018, pp. 4053-4056 (4 pages).

* cited by examiner

SINGLE MODE FULL COLOR WAVEGUIDE COMBINER USING ASYMMETRIC TRANSMISSIVE AND REFLECTIVE DIFFRACTION GRATINGS

CROSS-REFERENCE TO RELATED APPLICATIONS

The application is a national stage application under 35 U.S.C. § 371 of International Application No. PCT/EP2021/08066, entitled "SINGLE MODE FULL COLOR WAVEGUIDE COMBINER USING ASYMMETRIC TRANSMISSIVE AND REFLECTIVE DIFFRACTION GRATINGS," filed on Nov. 4, 2021, which claims priority from European Patent Application Nos. EP20306331.8, EP20306332.6, and 20306333.4, all of which were filed on 5 Nov. 2020, all of which are incorporated herein by reference in their entirety.

BACKGROUND

The present disclosure relates to the field of optics and photonics, and more specifically to an optical device comprising at least one diffraction grating. It may find applications in the field of conformable and wearable optics (e.g. AR/VR glasses (Augmented Reality/Virtual Reality)), as well as in a variety of other electronic consumer products comprising displays and/or lightweight imaging systems, including head up displays (HUD), as for example in the automotive industry.

This section is intended to introduce the reader to various aspects of art, which may be related to various aspects of the present disclosure that are described and/or claimed below. This discussion is believed to be helpful in providing the reader with background information to facilitate a better understanding of the various aspects of the systems and methods described herein. Accordingly, it should be understood that these statements are to be read in this light, and not as admissions of prior art.

Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

In such AR/VR glasses, various types of refractive and diffractive lenses and beam-forming components are used to guide the light from a micro-display or a projector towards the human eye, allowing forming a virtual image that is superimposed with an image of the physical world seen with a naked eye (in case of AR glasses) or captured by a camera (in case of VR glasses).

Some of kinds of AR/VR glasses utilize optical waveguides wherein light propagates into the optical waveguide by TIR (for Total Internal Reflection) only over a limited range of internal angles. The FoV (for Field of View) of the waveguide depends on the material of the waveguide.

The FoV of a waveguide may be expressed as the maximum span of $$\theta_1^+ - \theta_1^-$$

which propagates into the waveguide by TIR. In some cases, as illustrated by FIG. 2, the biggest angular span that can be coupled into the waveguide can be expressed by two rays: the critical ray $$\left(\theta_1^C \text{ in } FIG.\ 2\right)$$

having incident angle $$\theta_1^C$$

and the grazing ray $$\left(\theta_1^C \text{ in } FIG.\ 2\right)$$

having incident angle $$\theta_1^G.$$

The critical ray is the light ray that just diffracts into the waveguide at the critical angle $$\theta_2^C$$

defined by sin $$\theta_2^C = \frac{1}{n_2(\lambda)}$$

where $n_2$ is the refractive index of the waveguide's material and λ the wavelength of the incident light. Above the critical angle $$\theta_2^C,$$

total internal reflection (TIR) occurs. The grazing ray is the ray having an input angle that diffracts into the waveguide at grazing incidence, which may be $$\theta_2^G = 90°.$$

The theoretical FoV of a waveguide presented above is for a single mode system where one single diffraction mode is used to carry the image: either +1 or −1 diffraction mode.

The field of view in some systems based on optical waveguides is limited by the angular bandwidth of a glass plate. If we diffract one mode into the glass plate, the FoV is given as a function of the index of refraction of the material of the glass plate. The FoV of a waveguide of refractive index $n_2$ is given by:

$$\Delta\theta_1 = 2\sin^{-1}\left(\frac{n_2 - 1}{2}\right).$$

FIG. 3 shows a graph for reasonable ranges of $n_2$. For $n_2$=1.5 the total field of view for a single mode system is rather limited to $\Delta\theta_1$=28.96 degrees. It can be seen that 60 degrees FoV is a practical limit for some types of wave guides because it is not generally feasible to use materials of refractive index above 2.0.

SUMMARY

References in the specification to "one embodiment," "an embodiment," "an example embodiment," and the like indicate that the embodiment described may include a particular feature, structure, or characteristic; but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

An optical system according to some embodiments comprises a waveguide substrate and a diffractive coupler associated with the waveguide substrate. The diffractive coupler comprises at least two diffraction gratings, which may have different associated grating periods. Each of the diffraction gratings includes a first layer of grating elements and a second layer of grating elements. The first and second layers of grating elements are arranged in different planes. The first and second layers of grating elements have the same grating period, being the grating period associated with the respective diffraction grating. The grating elements of the second layer have a lateral offset with respect to the grating elements of the first layer.

In some embodiments, the at least two diffraction gratings include a first diffraction grating overlaying the waveguide substrate and a second diffraction grating overlaying the first diffraction grating.

In some embodiments, the waveguide substrate has a first surface and a second surface substantially opposite the first surface; and the at least two diffraction gratings are embedded in the waveguide substrate between the first surface and the second surface.

In some embodiments, the waveguide substrate has a first surface and a second surface substantially opposite the first surface, and the at least two diffraction gratings include a first diffraction grating (DG2) on the first surface and a second diffraction grating (DG1) on the second surface.

In some embodiments, the waveguide substrate has a refractive index and grating elements of the at least two diffraction gratings have a refractive index greater than the refractive index of the waveguide substrate.

Some embodiments further comprise a phase-modifying layer between the first and second layers of grating elements of at least one of the diffraction gratings.

Some embodiments further comprise a stop layer between the first and second layers of grating elements of at least one of the diffraction gratings.

Some embodiments further comprise a stop layer between the waveguide substrate and at least one of the diffraction gratings.

In some embodiments, the grating elements of the at least two diffraction gratings have a substantially rectangular cross-section.

In some embodiments, the grating elements of at least one of the diffraction gratings have a prismatic cross-section.

In some embodiments, the first diffraction grating is a transmissive diffraction grating and the second diffraction grating is a reflective diffraction grating. Some such embodiments further include a metallized surface over the second diffraction grating.

In some embodiments, the grating elements in any one of the layers of grating elements are not in contact with grating elements any other of the layers of grating elements.

In some embodiments, the coupler is asymmetric.

A waveguide display according to some embodiments comprises an image generator and an optical system as described herein.

A method according to some embodiments comprises generating an image and coupling the image into a waveguide, the waveguide comprising a waveguide substrate; a diffractive coupler associated with the waveguide substrate, the diffractive coupler comprising at least two diffraction gratings having different associated grating periods; wherein each of the diffraction gratings includes a first layer of grating elements and a second layer of grating elements, the first and second layers of grating elements being arranged in different planes, the first and second layers of grating elements each having the grating period associated with the respective diffraction grating, and the grating elements of the second layer having a lateral offset with respect to the grating elements of the first layer.

BRIEF DESCRIPTION OF THE DRAWINGS

FIG. 8A shows the performance with blue light (460 nm wavelength), FIG. 8B shows the performance with green light (530 nm wavelength), and FIG. 8C shows the performance with red light (620 nm wavelength).

FIG. 15A illustrates the performance with blue light (460 nm), in which case R1 represents in-coupled light. FIG. 15B illustrates the performance with green light (530 nm), in which case R1 represents in-coupled light. FIG. 15C illustrates the performance with red light (620 nm), in which case R1 and T1 represent in-coupled light.

FIG. 16A illustrates performance with blue light (460 nm), in which case R1 represents in-coupled light. FIG. 16B illustrates performance with green light (530 nm), in which case R1 represents in-coupled light. FIG. 16C illustrates performance with red light (620 nm), in which case R1 and T1 represent in-coupled light.

FIG. 19A illustrates transmittance of order +1 at different values of $d_r$. FIG. 19B illustrates reflectance and transmittance of different orders with $d_r=-5$ nm.

FIG. 21A illustrates results for blue light, $\lambda=460$ nm. FIG. 21B illustrates results for green light, $\lambda=530$ nm. FIG. 21C illustrates results for red light, $\lambda=620$ nm.

FIG. 23A illustrates the results for $\lambda=625$ nm. FIG. 23B illustrates the results for $\lambda=530$ nm.

In FIG. 24A, $H_{L1}=H_{L2}=0$ nm. In FIG. 24B, $H_{L2}=0$ nm, $d_r=20$ nm. In FIG. 24C, $H_{L1}=0$ nm, $d_r=20$ nm.

FIG. 25A shows the results for $\lambda=625$ nm. FIG. 25B shows the results for $\lambda=530$ nm.

DETAILED DESCRIPTION

Figure 1A:
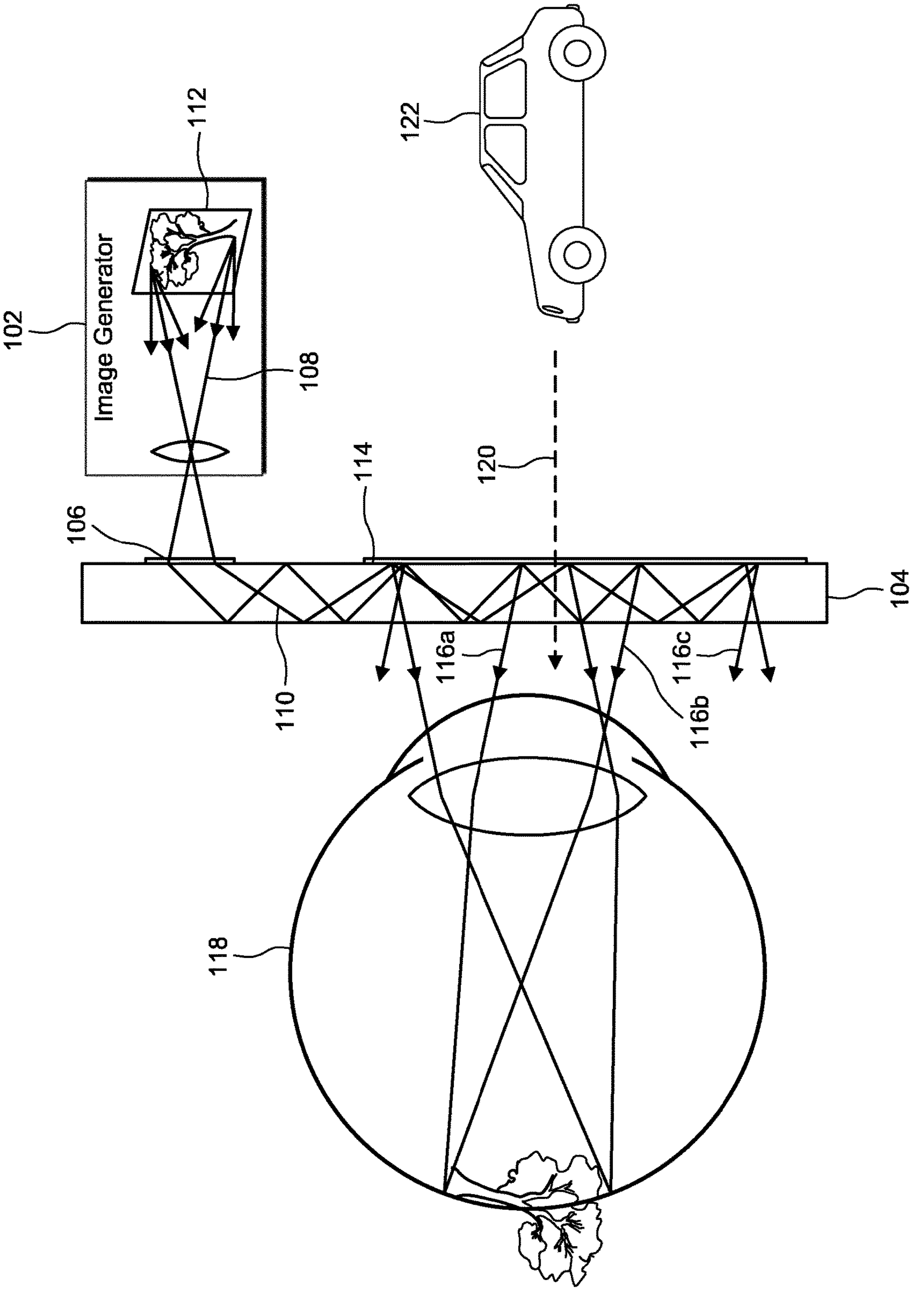
FIG. 1A is a cross-sectional schematic view of a waveguide display.

Described herein are waveguide display systems and methods. An example waveguide display device is illustrated in FIG. 1A. FIG. 1A is a schematic cross-sectional side view of a waveguide display device in operation. An image is projected by an image generator 102. The image generator 102 may use one or more of various techniques for projecting an image. For example, the image generator 102 may be a laser beam scanning (LBS) projector, a liquid crystal display (LCD), a light-emitting diode (LED) display (including an organic LED (OLED) or micro LED (μLED) display), a digital light processor (DLP), a liquid crystal on silicon (LCoS) display, or other type of image generator or light engine.

Light representing an image 112 generated by the image generator 102 is coupled into a waveguide 104 by a diffractive in-coupler 106. The in-coupler 106 diffracts the light representing the image 112 into one or more diffractive orders. For example, light ray 108, which is one of the light rays representing a portion of the bottom of the image, is diffracted by the in-coupler 106, and one of the diffracted orders 110 (e.g. the second order) is at an angle that is capable of being propagated through the waveguide 104 by total internal reflection.

At least a portion of the light 110 that has been coupled into the waveguide 104 by the diffractive in-coupler 106 is coupled out of the waveguide by a diffractive out-coupler 114. At least some of the light coupled out of the waveguide 104 replicates the incident angle of light coupled into the waveguide. For example, in the illustration, out-coupled light rays 116*a*, 116*b*, and 116*c* replicate the angle of the in-coupled light ray 108. Because light exiting the out-coupler replicates the directions of light that entered the in-coupler, the waveguide substantially replicates the original image 112. A user's eye 118 can focus on the replicated image.

In the example of FIG. 1A, the out-coupler 114 out-couples only a portion of the light with each reflection allowing a single input beam (such as beam 108) to generate multiple parallel output beams (such as beams 116*a*, 116*b*, and 116*c*). In this way, at least some of the light originating from each portion of the image is likely to reach the user's eye even if the eye is not perfectly aligned with the center of the out-coupler. For example, if the eye 118 were to move downward, beam 116*c* may enter the eye even if beams 116*a* and 116*b* do not, so the user can still perceive the bottom of the image 112 despite the shift in position. The out-coupler 114 thus operates in part as an exit pupil expander in the vertical direction. The waveguide may also include one or more additional exit pupil expanders (not shown in FIG. 1A) to expand the exit pupil in the horizontal direction.

In some embodiments, the waveguide 104 is at least partly transparent with respect to light originating outside the waveguide display. For example, at least some of the light 120 from real-world objects (such as object 122) traverses the waveguide 104, allowing the user to see the real-world objects while using the waveguide display. As light 120 from real-world objects also goes through the diffraction grating 114, there will be multiple diffraction orders and hence multiple images. To minimize the visibility of multiple images, it is desirable for the diffraction order zero (no deviation by 114) to have a great diffraction efficiency for light 120 and order zero, while higher diffraction orders are lower in energy. Thus, in addition to expanding and out-coupling the virtual image, the out-coupler 114 is preferably configured to let through the zero order of the real image. In such embodiments, images displayed by the waveguide display may appear to be superimposed on the real world.

Some waveguide displays includes more than one waveguide layer. Each waveguide layer may be configured to preferentially convey light with a particular range of wavelengths and/or incident angles from the image generator to the viewer.

Figure 1B:
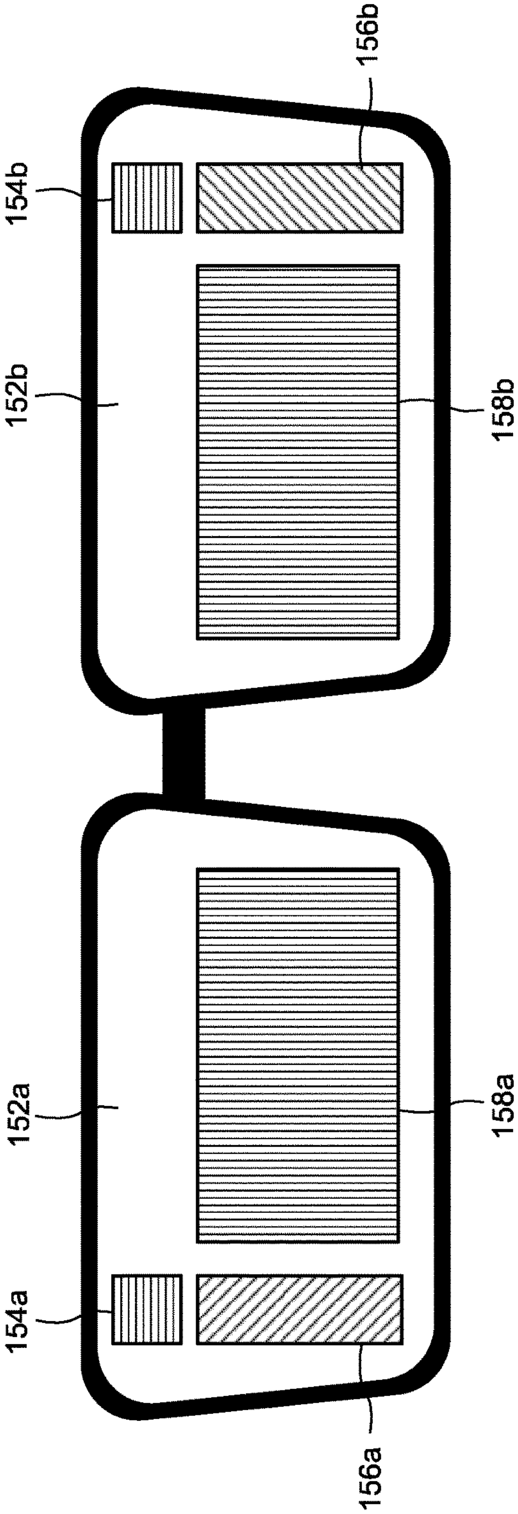
FIG. 1B is a schematic illustration of a binocular waveguide display with a first layout of diffractive optical components.
Figure 1C:
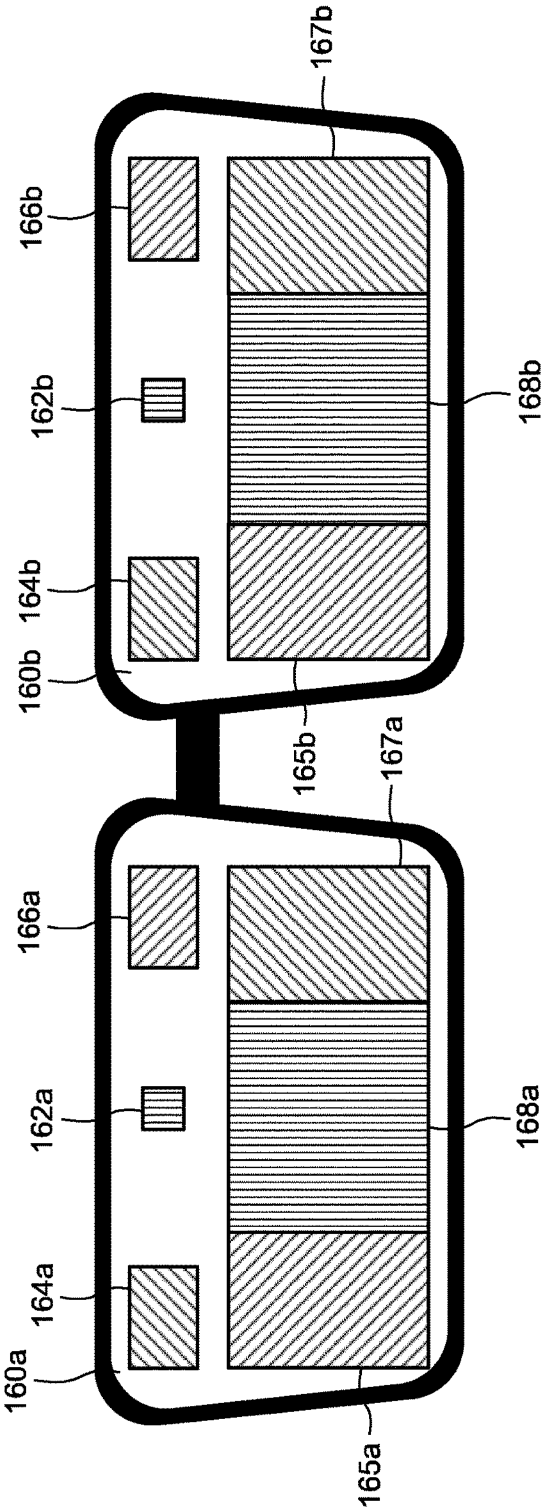
FIG. 1C is a schematic illustration of a binocular waveguide display with a second layout of diffractive optical components.

As illustrated in FIGS. 1B and 1C, waveguide displays having in-couplers, out-couplers, and pupil expanders may have various different configurations. An example layout of one binocular waveguide display is illustrated in FIG. 1B. In the example of FIG. 1B, the display includes waveguides 152*a*, 152*b* for the left and right eyes, respectively. The waveguides include in-couplers 154*a,b*, pupil expanders 156*a,b*, and components 158*a,b*, which operate as both out-couplers and horizontal pupil expanders. The pupil expanders 156*a,b* are arranged along an optical path between the in-coupler and the out-coupler. An image generator (not shown) may be provided for each eye and arranged to project light representing an image on the respective in-coupler.

An layout of another binocular waveguide display is illustrated in FIG. 1C. In the display of FIG. 1C, the display includes waveguides 160*a*, 160*b* for the left and right eyes, respectively. The waveguides include in-couplers 162*a,b*. Light from different portions of an image may be coupled by the in-couplers 162*a,b* to different directions within the waveguides. In-coupled light traveling toward the left passes through pupil expanders 164*a,b* and 165*a,b*, while in-coupled light traveling toward the right passes through pupil expanders 166*a,b* and 167*a,b*. Having passed through the pupil expanders, light is coupled out of the waveguides using out-couplers 168*a,b* to substantially replicate an image provided at the in-couplers 162*a,b*.

In different embodiments, different features of the waveguide displays may be provided on different surfaces of the waveguides. For example (as in the configuration of FIG. 1A), the in-coupler and the out-coupler may both be arranged on the anterior surface of the waveguide (away from the user's eye). In other embodiments, the in-coupler and/or the out-coupler may be on a posterior surface of the waveguide (toward the user's eye). The in-coupler and out-coupler may be on opposite surfaces of the waveguide. In some embodiments, one or more of an in-coupler, an out-coupler, and a pupil expander, may be present on both surfaces of the waveguide. The image generator may be arranged toward the anterior surface or toward the posterior surface of the waveguide. The in-coupler is not necessarily on the same side of the waveguide as the image generator. Any pupil expanders in a waveguide may be arranged on the anterior surface, on the posterior surface, or on both surfaces of the waveguide. In displays with more than one waveguide layer, different layers may have different configurations of in-coupler, out-coupler, and pupil expander.

Figure 1E:
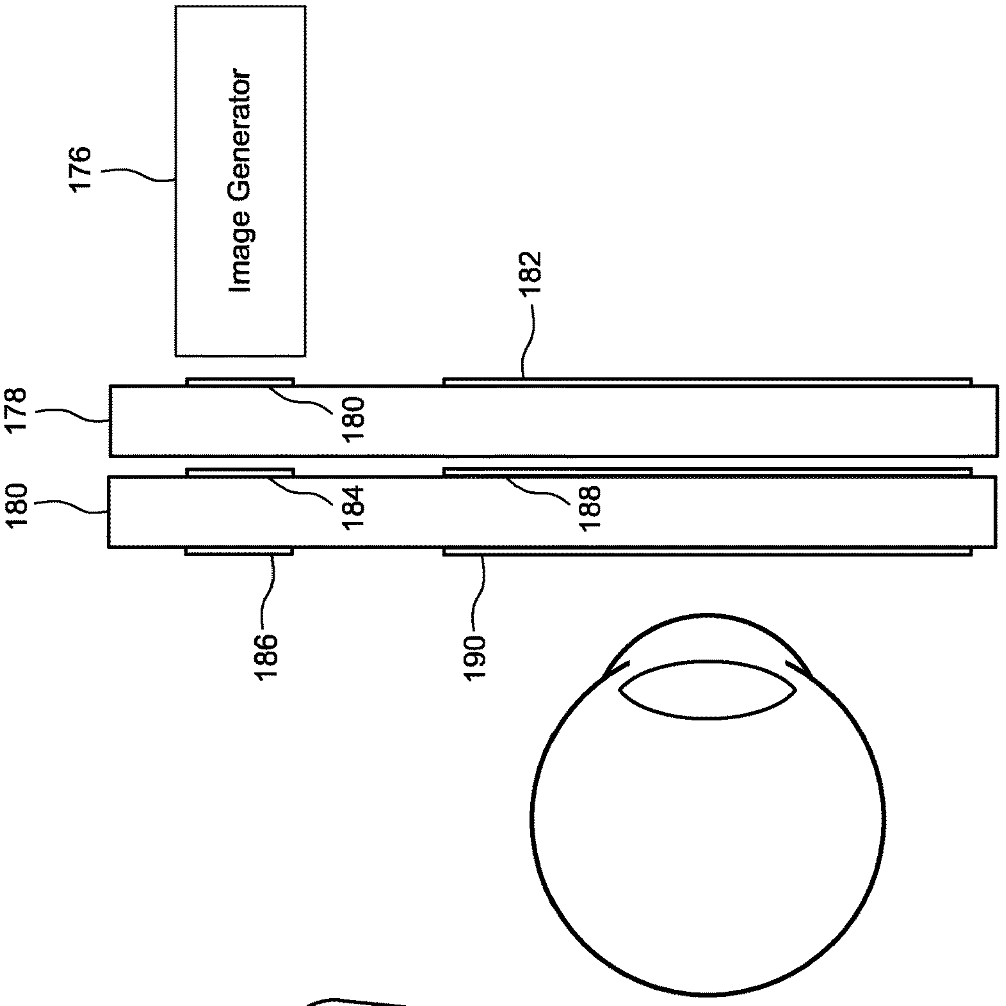
FIG. 1E is a cross-sectional schematic view of a double-waveguide display.
Figure 1D:
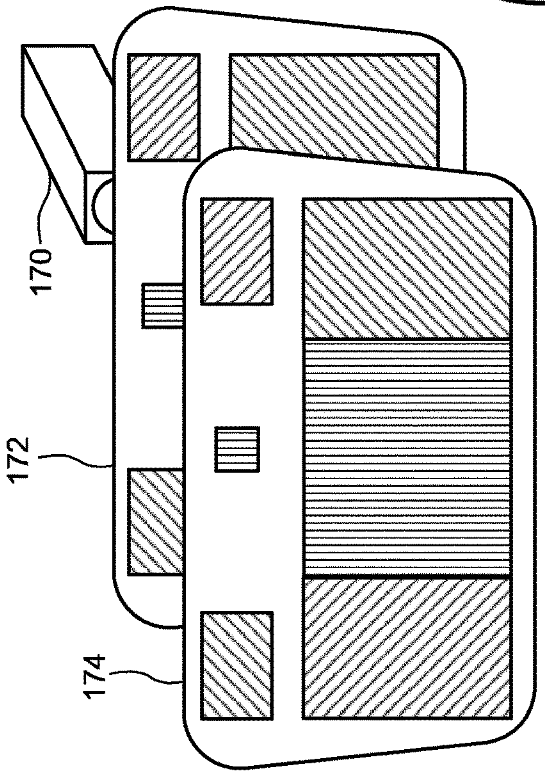
FIG. 1D is a schematic exploded view of a double-waveguide display.
Figure 2:
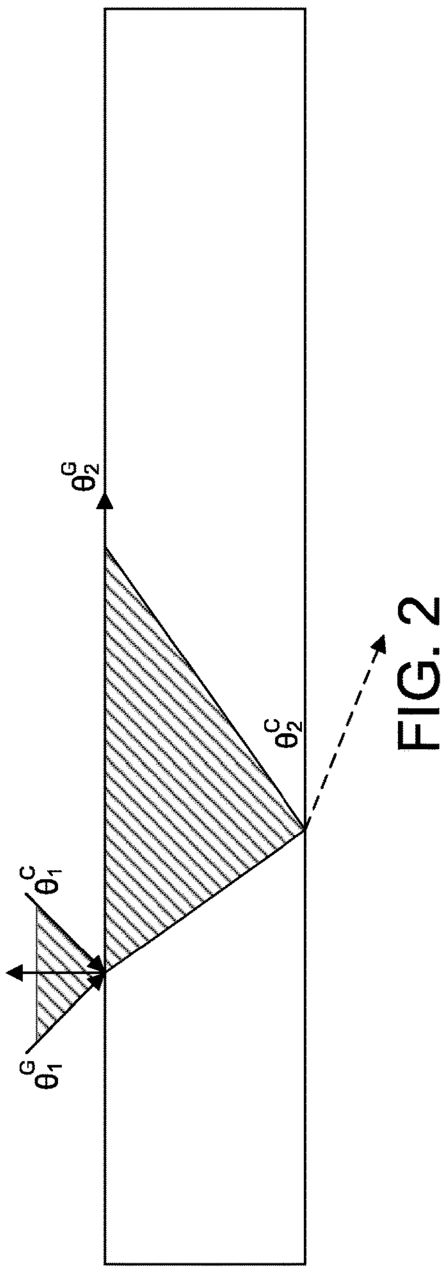
FIG. 2 is a schematic illustration of a single mode system where a single diffraction mode is used to carry the image using either the +1 or the −1 diffraction mode.
Figure 3:
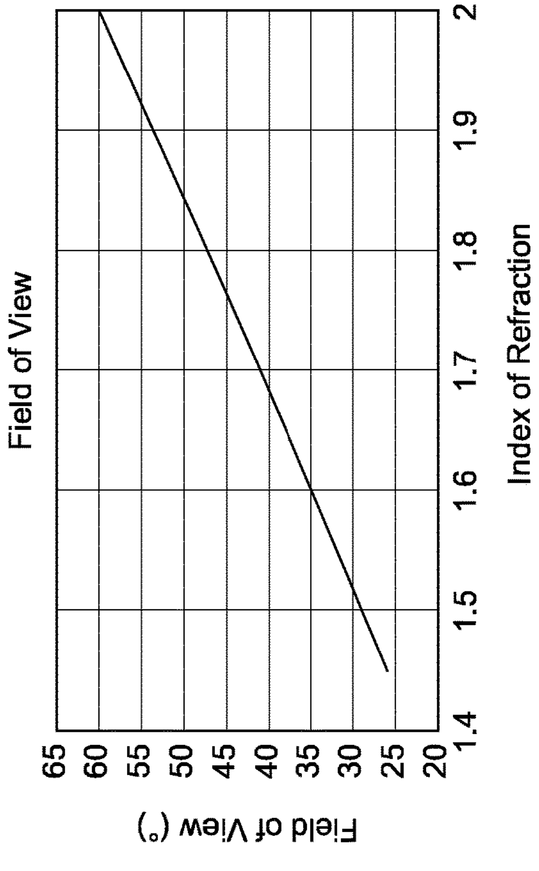
FIG. 3 is an example graph of a wave guide's field of view as a function of the refractive index of its material.

FIG. 1D is a schematic exploded view of a double waveguide display, including an image generator 170, a first waveguide ($WG_1$) 172, and a second waveguide ($WG_2$) 174. FIG. 1E is a schematic side-view of a double waveguide display, including an image generator 176, a first waveguide ($WG_1$) 178, and a second waveguide ($WG_2$) 180. The first waveguide includes a first transmissive diffractive in-coupler (DG1) 180 and a first diffractive out-coupler (DG6) 182. The second waveguide has a second transmissive diffractive in-coupler (DG2) 184, a reflective diffractive in-coupler (DG3) 186, a second diffractive out-coupler (DG4) 188, and a third diffractive out-coupler (DG5) 190. Different displays may use different arrangements of optical components (such as different arrangements of pupil expanders) on the first and second waveguides.

While FIGS. 1A-1E illustrate the use of waveguides in a near-eye display, the same principles may be used in other display technologies, such as head up displays for automotive or other uses.

Example embodiments described herein include diffractive couplers associated with a waveguide substrate. The diffractive couplers may be used as in-couplers or out-couplers. They may be used in waveguide display systems as described above or in other optical systems. In some embodiments, the diffractive couplers include at least two diffraction gratings with different grating periods in which each of the diffraction gratings includes a first layer of grating elements and a second layer of grating elements. The first and second layers of grating elements within a diffraction grating may be arranged in different planes. The grating elements in the first and second layers may have the same grating period, which is characteristic of or associated with the diffraction grating. The grating elements of the second layer may have a lateral offset from the grating elements of the first layer such that the grating elements of the second layer are arranged asymmetrically with respect to the grating elements of the first layer, as viewed in a plane perpendicular to the grating lines.

In some embodiments, a diffractive coupler uses two diffraction gratings, each of which includes two layer of grating elements. Such diffraction gratings with two layers of grating elements may be referred to herein as two-layer gratings, even in cases where they include one or more additional layers (such as stop layers, phase modifying layers, and the like) that do not include grating elements. The two diffraction gratings may be arranged in different positions with respect to the surfaces of the waveguide substrate.

In some embodiments, both of the two-layer diffraction gratings are located along one surface of the waveguide substrate, with a first diffraction grating (DG2) overlaying the waveguide substrate and a second diffraction grating (DG1) overlaying the first diffraction grating. In some such embodiments, the two two-layer diffraction gratings work together as a meta-surface or meta-grating.

In some embodiments, both of the two-layer diffraction gratings are embedded in the waveguide substrate between the surfaces of the waveguide substrate. In some such embodiments, the two two-layer diffraction gratings work together as a meta-surface or meta-grating.

In some embodiments, the two-layer diffraction gratings are positioned on opposite surfaces of the waveguide substrate.

1. Embodiments with Transmissive Meta-Surface Coupler for RGB Displays

Example embodiments provide a full RGB single waveguide system based on a single-mode transmissive meta-surface. An example meta-surface may provide substantially the same angular distribution of the in-coupled light inside the waveguide for three colors. In some embodiments, metallization of the grating surface is not required. In some embodiments, a waveguide using a combination of two transmissive gratings can be transparent for the straight light and can be used for out-coupling purposes. In some embodiments, the fabrication process will not be affected by the exact shape and size of the plates placed between the constitutive parts of the waveguide. Some embodiments are configured to get on-axis (symmetrical) and of-axis (asymmetrical) in-coupling for the desired field of view of the device. In some embodiments, the configuration is selected to create transmissive meta-surface in-couplers based on combination of different types of diffraction gratings providing non-symmetrical response (for example, slanted, blazed, binary, multilevel, step-like and double-material gratings).

Example embodiments include an optical full RGB system with just one waveguide that can be used for in-coupling light into the optical device and/or out coupling light from the optical device. Such an optical device can be used as a waveguide for AR/VR glasses for instance. Reducing the number of waveguides while keeping the field of view allowed by the index of the guide allows for reduction in weight and size and simplification of the system. To couple light into the waveguide and provide good color uniformity, diffracted non-zero order light preferably has high intensity across a wide angular range.

A diffraction grating configured to achieve good grating efficiency in a diffraction order other than the zero order can provide light deviation functions in the far-field zone. Some embodiments use double-material microlenses deviating and focusing the incident light in the near-field zone for the purpose of a targeted light distribution in the far-field zone.

Example embodiments provide a single waveguide single mode full-color system for in-coupling light into an optical device. Some embodiments provide high diffraction uniformity and good efficiency for the first diffractive order. Some embodiments provide a good level of gathering of diffracted rays for different colors without the metallization of the components of the system. A meta-surface used in some embodiments provides similar angular distribution of the in-coupled light inside the waveguide for three colors. Example systems may be configured for on-axis and off-axis in-coupling of incident light.

Figure 4:
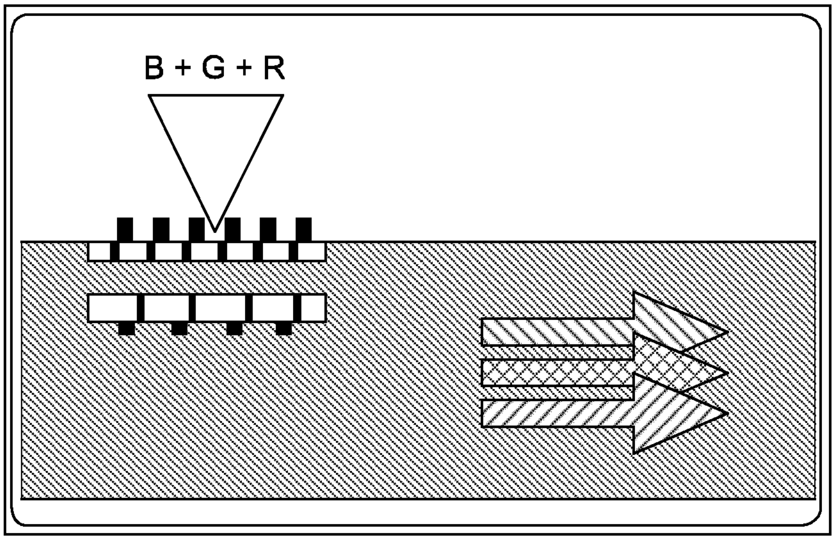
FIG. 4 is a schematic cross-sectional side view of an in-coupler portion of a waveguide with a transmissive meta-surface for use with red, green, and blue light.

FIG. 4 is a schematic cross-sectional side view of an in-coupler portion of a waveguide with a transmissive meta-surface for use with red, green, and blue light.

Figure 5:
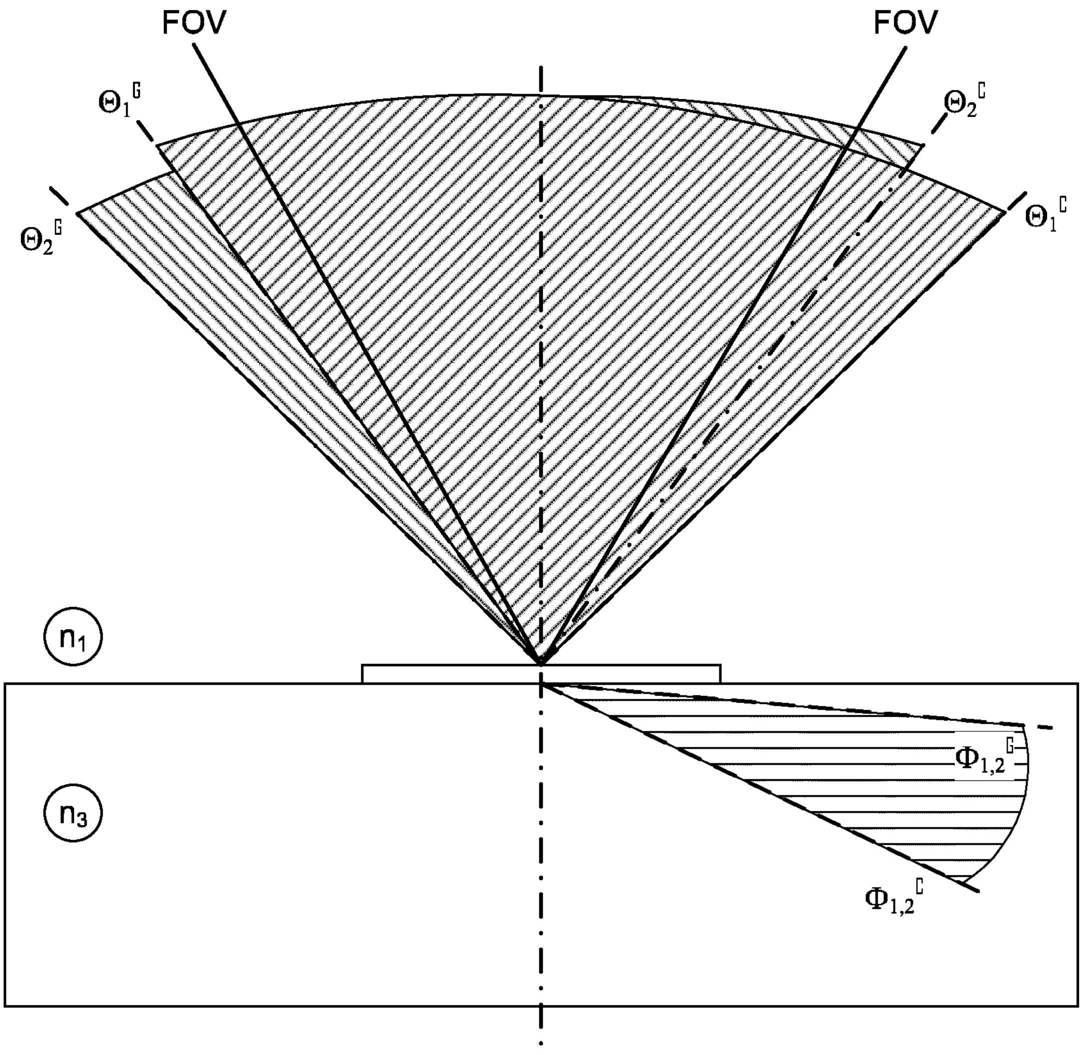
FIG. 5 is a schematic cross-sectional side view of a single-waveguide in-coupling system illustrating angles of incident and diffracted light for the case when an incident light is in-coupled by two transmissive diffraction gratings representing a meta-surface on the top of the waveguide.

FIG. 5 is a schematic cross-sectional side view of a single-waveguide in-coupling system illustrating angles of incident and diffracted light for the case when an incident light is in-coupled by two transmissive diffraction gratings representing a meta-surface on the top of the waveguide. Angles whose names begin with letter θ are located in the air. Angles whose names begin with ϕ are located in the waveguides and measure the angle of rays that have been diffracted. Superscript C indicates a critical ray, either in air or in the waveguide, and superscript G indicates a grazing ray.

Example embodiments employ diffraction of the incident light by a meta-surface where the meta-surface includes two transmissive diffraction gratings. At least a portion of the diffracted light is in-coupled into the waveguide. In some embodiments, the combination of diffraction gratings provides high-uniformity and high-performance in-coupling for three colors.

FIG. 5 illustrates the functionality of a meta-surface according to some embodiments for the case of a symmetrical field of view. For one wavelength, the angular range $[\theta^{G}_{1}; \theta^{C}_{1}]$ is diffracted inside the waveguide into the angular ranges $[\phi^{C}_{1}; \phi^{G}_{1}]$ by the top transmissive diffraction grating of the example meta-surface. The field of view of a waveguide presented above is for a single mode system where one single diffraction mode is used to carry the image: either +1 or −1 diffraction mode (or >±1 diffraction mode depending on the system topology).

For an example configuration/orientation (for example, see FIGS. 7A-7C below) of the first transmissive meta-surface for the angular range $[\theta^{G}_{1}; \theta^{C}_{1}]$ (here $-\theta^{C}_{1}=\theta^{G}_{1}$ for on-axis in-coupling and $|\theta^{C}_{1}|\neq|\theta^{G}_{1}|$ for off-axis in-coupling) for the positive transmitted diffraction mode the diffracted image will propagate toward the right into the waveguide. For the case of the blue color wavelength, light will be in-coupled by the top transmissive diffraction grating. For the case of the other wavelengths, light will be partially in-coupled by the top transmissive diffraction grating, and a portion of the light will go through the first diffraction grating and will be diffracted by the second transmissive diffraction grating which is from the bottom of the meta-surface composition in this example. The corresponding angular range inside the waveguide is $[\phi^{C}_{2}; \phi^{G}_{2}]$. To provide a wide in-coupled field of view, the bottom transmissive diffraction grating in this embodiment is able to in-couple the angular range $[\theta^{G}_{2}; \theta^{C}_{2}]$ for the light with the longest incoming wavelength (e.g., the red color for an RGB system), where $\theta^{G}_{2}=\theta^{C}_{1R}-D\Theta$, $\theta^{C}_{1R}$ is the maximal incident angle in-coupled by the first grating at the red color wavelength $(\theta^{C}_{1,red})$, where Dq is an angular overlapping.

For the bottom diffraction grating, for the angular range $[\theta^G_2; \theta^C_2]$ the positive transmitted mode of diffracted image will propagate toward the right into the waveguide.

Constitutive parts of the example meta-surface may be different diffraction gratings in that they may have different periods calculated for the proper wavelength and may have different size and material of the elements. The geometrical structure of the elements may be configured to emphasize edge-waves, and they may be of the same shape or different shape. Using the elements of a different shape allows in some embodiments for an additional degree of freedom providing the possibility to improve the performance of the system.

In an embodiment in which a single waveguide is used to convey three colors, the parameters of the in-coupler may be configured as follows.

For the transmissive diffraction grating DG1 (with the period $d_1$, at the top of the meta-surface), the period of the diffraction grating may be calculated to in-couple blue color wavelengths in the angular range covering necessary FoV of the device for these color, assuming that for blue color in the case of a symmetrical field of view $$\Theta^C_{1,blue} \approx -\Theta^G_{1,blue},$$

and in the case of a non-symmetrical field of view, $$|\Theta^C_{1,blue}| \neq |\Theta^G_{1,blue}|.$$

To provide better uniformity of an in-coupled light, it is desirable for the corresponding characteristics of the waveguide to provide higher theoretically possible field of view $\Delta\theta_1$ in comparison with desired field of view $\Delta\theta_2$ ($\Delta\theta_1=\Delta\theta_2+\gamma_M+\gamma_m$). In an example, the required desired field of view is equal to $\Delta\theta_2=\theta_M-\theta_m$ ($\theta_m=-\theta_M$ for on-axis in-coupling and $|\theta_m|\neq|\theta_M|$ for off-axis in-coupling).The diffraction grating may then be configured to get high diffraction efficiency of corresponding orders $M_{1T}$ in the desired angular range at blue color wavelengths. The angular range $[\theta^C_1; \theta^G_1]$ diffracts inside of the waveguide into the angular range $[\phi^C_1; \phi^G_1]$. To determine the period of DG1 the diffraction grating equations may be used:

$$n_{3B}\sin\Phi^C_{1,blue} + n_1\sin\Theta^C_{1,blue} = \frac{M_{1T}\lambda_B}{d_1} \quad (1.1)$$

$$n_{3B}\sin\Phi^G_{1,blue} + n_1\sin\Theta^G_{1,blue} = \frac{M_{1T}\lambda_B}{d_1}$$

Here sin $$\Phi^C_{1,blue} = \frac{1}{n_{3B}},$$

$M_{1T}$ corresponds to the diffraction order of the first diffraction grating in the meta-surface. According to an embodiment of the present disclosure, $$\Phi^G_{1,blue}$$

is chosen to approximately equal to 65°-90°. To calculate the pitch of the first diffraction grating, the following formula may be used:

$$d_1 = \frac{M_{1T}\lambda_B}{n_{3B} + n_1\sin\Theta^G_{1,blue}} \quad (1.2)$$

where $$|\Theta^G_{1,blue}| = |\theta_m + \gamma_m|.$$

At the wavelength corresponding to the green color we will observe the shift of an angular distribution toward the higher angles of an incidence. Similar effects will be observed at the wavelength corresponding to the red color. Increasing the wavelength, we obtain an additional shift of an angular distribution toward the higher angles of an incidence. For all three colors, all angles below $\theta^G_1$ transmit through the reflective diffraction grating (it corresponds to the 0 transmitted order $T_0$) with a very high efficiency. This portion of incident image will be also diffracted by transmissive grating DG2, and after it can be combined with the portion of image transmitted by the first grating DG1.

Parameters of the second transmissive diffraction grating DG2 (with the period $d_2$, bottom of MS composition) may be determined as follows. In some embodiments, the period of transmissive diffraction grating DG2 is calculated for a red color wavelength and an angular range covering the portion of the field of view which was not in-coupled by the first grating. This diffraction grating may also be configured to get high diffraction efficiency of corresponding orders $M_{2T}$ ($\pm 2^{nd}$ or $\pm 1^{st}$ depending on the topology) in the mentioned angular range at the red color wavelength. The angular range $[\theta^G_2; \theta^C_2]$ diffracts inside of the waveguide into the angular range $[\phi^C_2; \phi^G_2]$. To configure the second transmissive grating in-coupling red color, it is desirable to use a system of diffraction grating equations taking into account angular overlapping ($\Delta\theta$) for the incident rays in-coupled by the first and second transmissive gratings $$\left(\Theta^C_{2,red} \approx \Theta^G_{1,red} + \Delta\theta\right):$$

$$n_{3R}\sin\Phi^G_{1,red} + n_1\sin\Theta^G_{1,red} = \frac{M_{1T}\lambda_R}{d_1} \quad (1.3)$$

$$n_{3R}\sin\Phi^C_{2,red} + n_1\sin\left(\Theta^G_{1,red} + \Delta\theta\right) = \frac{M_{2T}\lambda_R}{d_2}$$

Here $M_{2T}$ corresponds to the diffraction order of the second diffraction grating of the meta-surface. According to an embodiment of the present disclosure, $$\Phi^G_{1,red}$$

and $$\Phi^{G}_{2,red}$$

are chosen approximately equal to 65°-90°. Finally, we get $$d_2 \approx \frac{M_{2T}\lambda_R}{1 + n_1 \sin(\Theta^{G}_{1,red} + \Delta\theta)}, \quad (1.4)$$

$$\text{where } \Theta^{G}_{1} \approx \sin^{-1}\left(\left(-n_{3R}\sin\Phi^{G}_{1,red} + \frac{M_{1T}\lambda_R}{d_1}\right)/n_1\right).$$

It may be noted that the same type of configuration may also be performed in a case of double waveguide solution. To in-couple all three colors according to example embodiments, two transmissive gratings with proposed periods are positioned on the top of the waveguide.

Figure 6:
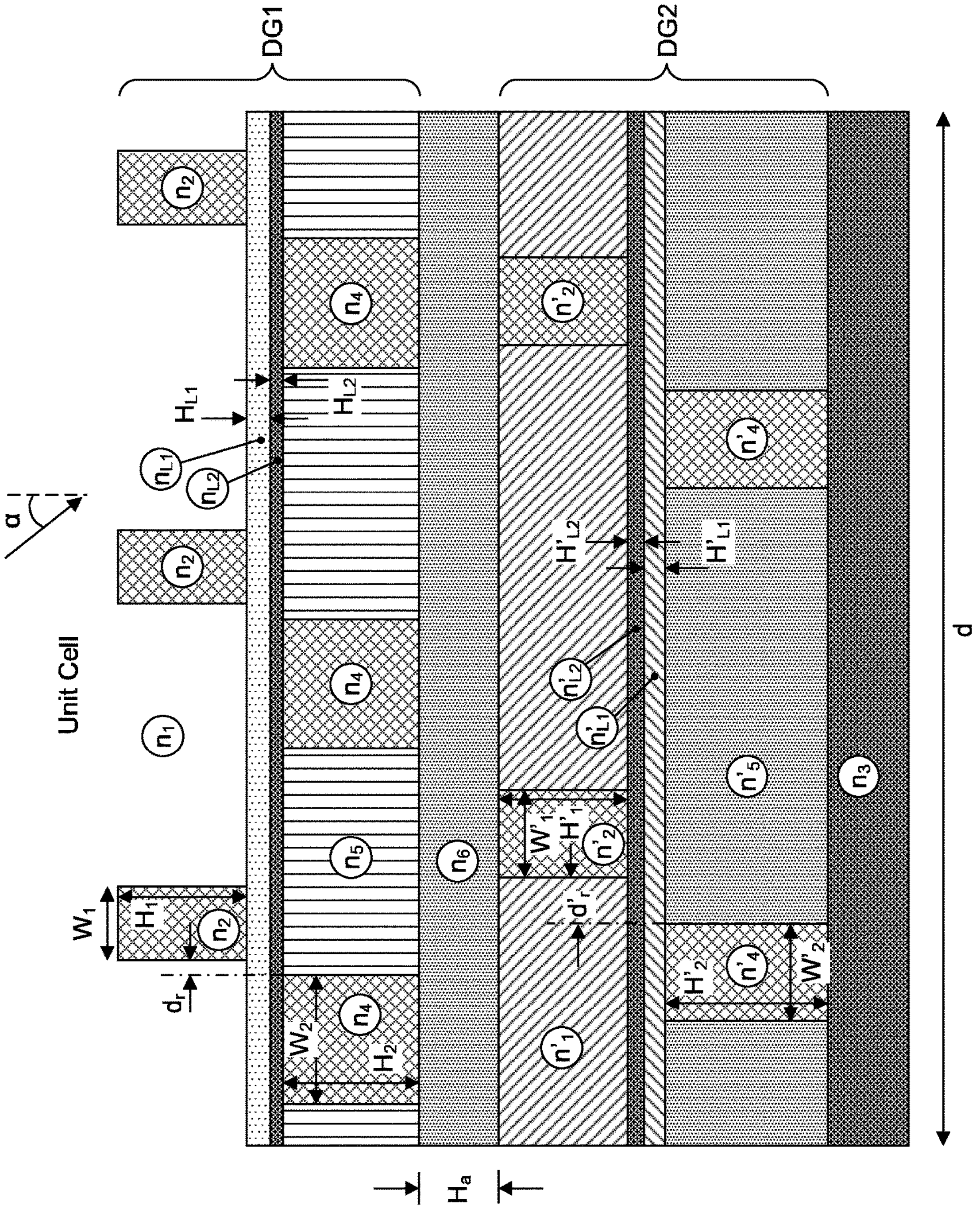
FIG. 6 is an enlarged schematic cross-sectional view of a unit cell of an example meta-surface on the top of the waveguide according to some embodiments.

As an example, consider a transmissive meta-surface with the unit cell presented in FIG. 6. FIG. 6 is an enlarged schematic cross-sectional view of a unit cell of the meta-surface on the top of the waveguide, the cross-section being taken in a plane perpendicular to the grating lines.

This cross-sectional view may correspond to the high refractive index ($n_2$ and $n_4$, where $n_2$ could be equal to $n_4$) elements of the diffraction grating DG1, $w_1$ and $h_1$ are width and height of the high refractive index elements outside the substrate in a host medium with refractive index $n_1$, $w_2$ and $h_2$ are width and height of the high refractive index elements inside the layer with the refractive index $n_5$. Parameter $d_r$ may be used to characterize the lateral offset between elements in the top and bottom layers of DG1. It corresponds to the distance between the right vertical edge of the bottom element and left vertical edge of the top element. For a negative $d_r$, the top element is shifted into the left regarding the vertical line corresponding to the position of the right vertical edge of the bottom element. For a positive $d_r$, the top element is shifted into the right.

Another diffraction grating DG2 in the meta-surface contains the high refractive index ($n'_2$ and $n'_4$, where $n'_2$ could be equal to $n'_4$, and $n'_2$ and $n'_4$ could be equal to $n_2$ and $n_4$) elements, $w'_1$ and $h'_1$ are width and height of the high refractive index elements in a medium with refractive index $n'_1$, $w'_2$ and $h'_2$ are width and height of the high refractive index elements inside the layer with the refractive index $n'_5$. Parameter $d'_r$ may be used to characterize the lateral offset between elements in the top and bottom layers of DG2. It corresponds to the distance between the right vertical edge of the bottom element and left vertical edge of the top element. For a negative $d'_r$, the top element is shifted into the left. For a positive $d'_r$, it is shifted toward the right. In this example, the meta-surface is placed on the homogeneous dielectric plate with a refractive index $n_3$ ($n_{2,4}$ and $n'_{2,4}>n_3$ and $n_3$ is the refractive index of the waveguide material). The space between two gratings is filled up by the material with refractive index $n_6$. In this example, the distance between the two gratings is equal to $H_a$.

To improve the uniformity of transmitted diffraction orders and additionally increase the transmittivity of in-coupled diffraction order, some embodiments use phase modifying layers with the thickness $H_{L2}$ and $H'_{L1}$ and refractive indexes $n_{L2}$ and $n'_{L1}$ placed between the high refractive index elements of the gratings. To simplify the fabrication process, some embodiments include so-called stop layers between this thin layer and top elements of the gratings. In this example, $n_{L1}$ and $n'_{L2}$ are the stop layer material refractive indexes, and $H_{L1}$ and $H'_{L2}$ are the thicknesses of these layers.

To estimate the effectiveness of the full system, a simulation was conducted of the meta-surface with a unit cell comprising three elements of diffraction grating DG1 and two elements of diffraction grating DG2. In the example, the period of the meta-surface is equal to $d=3d_1=2d_2$. In a case where the period of the diffraction grating DG1 is selected to in-couple diffraction order $M_{1T}$ and the period of transmissive diffraction grating DG2 is selected to in-couple diffraction order $M_{2T}$, the period of the resulting meta-surface is defined to in-couple transmitted order $M_{1T}{}^*=3M_{1T}$ and transmitted order $M_{2T}{}^*=2M_{2T}$. It should be noted that to modify the field of view of the proposed device, the pitch of the meta-surface may be modified, or a different number of elements in the unit cell may be provided for the diffraction gratings. To calculate the period of the meta-surface, it may be assumed that the biggest angular span that can be coupled propagates into the waveguide by total internal reflection (TIR). A linearly polarized plane wave is incident on the meta-surface system from the top in a plane perpendicular to the meta-surface. We note that example embodiments may be used with TE and TM polarizations. But to improve efficiency, the system may be configured taking into account the polarization of an incident wave.

Considering a more general case, depending on the in-coupled wavelengths we can create a transmissive meta-surface with a unit cell comprising n elements of diffraction grating DG1 with refractive indexes $n_2$ and $n_4$ and m elements of diffraction grating DG2 with refractive index $n'_2$ and $n'_4$. In this case, the period of the meta-surface is equal to $d=nd_1=md_2$. If the period of DG1 is defined to in-couple diffraction order $M_1$ and the period of DG2 is defined to in-couple diffraction order $M_{2T}$, the period of new MS is defined to in-couple transmitted order $M_{1T}{}^*=nM_{1T}$ and transmitted order $M_{2T}{}^*=mM_{2T}$.

The mutual positioning of the elements of the two diffraction gratings in relation to one another inside the pitch is not expected to substantially affect the system performance. At the same time, the mutual orientation of the elements in different layers of each grating plays an role to in-couple all three colors into the waveguide. For an example transmissive meta-surface solution, the orientation of the elements of DG1 and DG2 will be the same.

In some embodiments, the materials and size of the constitutive parts are configured in order to manage the position, direction, phase and amplitude of the edge waves diffracted by the vertical edges of the high refractive index element. In some embodiments, the elements of the diffraction gratings may have vertical edges parallel to the z-axis and top/bottom surfaces parallel to the xy-plane, which corresponds to the base angle equal to 90°. In other embodiments, prismatic structures (with base angles other than 90°) can also be used. Variation of the base angle value provides additional degree of freedom in the control of the edge wave radiation. The diffraction gratings are made up of a periodic one-dimensional array of the unit cells.

Configuring the constitutive parts of a meta-surface to in-couple first diffraction orders ($M_{1T}=M_{2T}=1$) results in a meta-surface for which the third transmitted order $T_3$ ($M_{1T}{}^*=3$) and second transmitted order $T_2$ ($M_{2T}{}^*=2$) will be in-coupled into the waveguide. We consider here a single diffraction grating system with non-symmetric basic geometries of the elements. The simulated distribution of the diffracted light inside the waveguide is presented in FIG. 7. To prevent undesirable diffraction of the orders $T_2$ and $T_3$, we take into account the lateral size of the meta-surface and calculate properly the thicknesses of the waveguide plate.

In an example embodiment, the period of transmissive diffraction grating DG1 is configured to in-couple blue color wavelengths in the angular range covering the desired field of view of the device for this color, assuming that for blue color the incoming rays with grazing incidence angle are close to the lower boundary of the desired field of view $$(\Theta^G_{1,blue} \text{ is close to } \theta_m).$$

The diffraction grating is configured to get high diffraction efficiency of corresponding orders $M_{1T}$ ($\pm 2^{nd}$ or $\pm 1^{st}$ depending on the topology) in the mentioned angular range at blue color wavelength. From FIG. 7A, corresponding to the blue color, the angular range $[\theta^G_{1,blue}; \theta^C_{1,blue}]$ diffracts inside of the waveguide into the angular range $[\phi^C_{1,blue}; \phi^G_{1,blue}]$. At the wavelength corresponding to the green color (see FIG. 7B) we will observe the shift of an angular distribution toward the higher incidence angles.

The angular range below $\theta^G_{1,green}$ (in this example, $\theta^G_{1,green}$ is negative) transmits through the first diffraction grating DG1 with the period $d_1$ with a very high efficiency. This portion of an incident image will be diffracted by the second transmissive grating DG2. If for angular range above $\theta^G_{1,green}$ the transmittivity $T_0$ is also high, it also can be diffracted by the transmissive grating (corresponding range of diffracted angles depends on the parameters of transmissive grating and cannot be bigger than $\theta^C_{2,green}$) and after it can be combined with the portion of an image diffracted by the first grating.

Similar functionality will be observed at the wavelength corresponding to the red color. Increasing the wavelength, we obtain an additional shift of an angular distribution toward the higher angles of an incidence. As demonstrated in FIG. 7C, at the red color wavelength the angular range $[\theta^G_{1,red}; \theta^C_{1,red}]$ diffracts inside of the waveguide into the angular range $[\phi^C_{1,red}; \phi^G_{1,red}]$. As in the case of green color, the angular range below $\theta^G_{1,red}$ transmits through the DG1 (it corresponds to the 0 transmitted order $T_0$) with a very high efficiency. This portion of incident image will be also diffracted by transmissive grating DG2. If for angular ranges above $\theta^G_{1,red}$ the transmittivity $T_0$ is also high, it also can be diffracted by the DG2 (range of diffracted angles depends on the parameters of diffraction grating DG2 and cannot be bigger than $\theta^C_{2,red}$) and after it can be combined with the portion of image transmitted by the diffraction grating DG1.

Figure 7A:
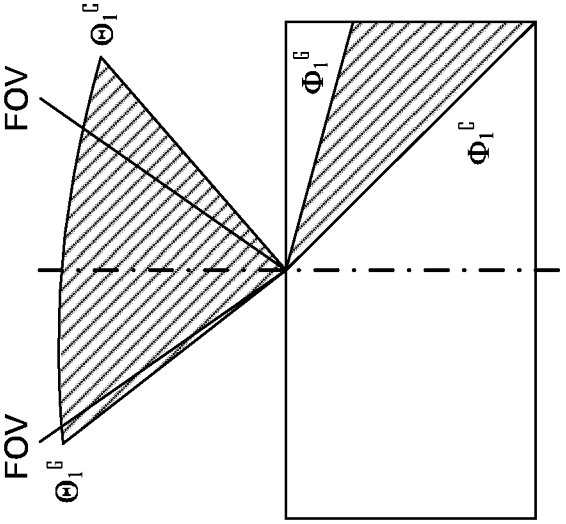
FIGS. 7A-7C illustrate a schematic side view of a single waveguide system with symmetrical field of view for three different colors: blue (FIG. 7A), green (FIG. 7B) and red (FIG. 7C).
Figure 7B:
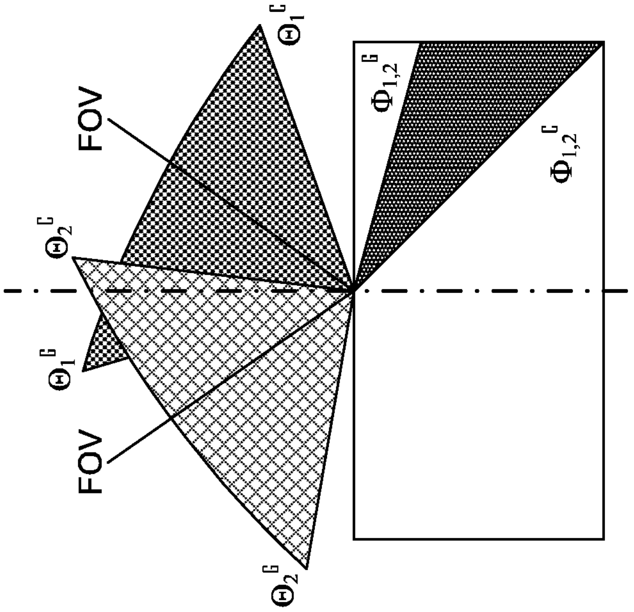
Figure 7C:
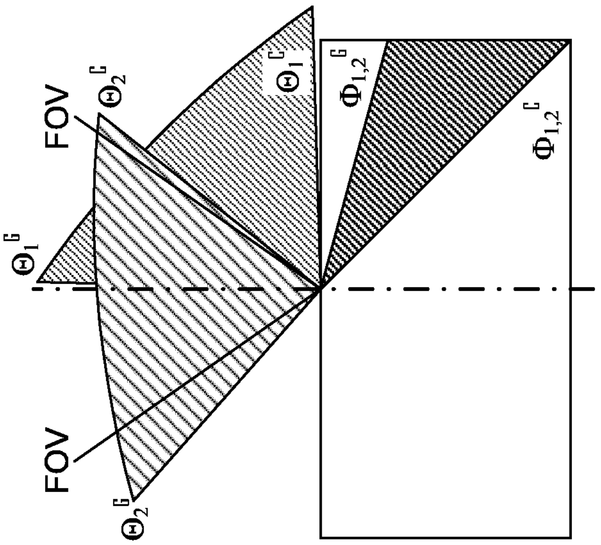

FIGS. 7A-7C illustrate a schematic side view of a single waveguide system with symmetrical field of view for three different colors: blue (FIG. 7A), green (FIG. 7B) and red (FIG. 7C).

In an example embodiment, the period of transmissive diffraction grating DG2 is calculated for a red color wavelength and an angular range covering the portion of the field of view which was not in-coupled by the first grating or an angular range covering full desired field of view of the device. For an example embodiment we take a proper refractive index of the waveguide to cover full desired field of view. This diffraction grating is also configured to get high diffraction efficiency of corresponding orders $M_{2T}$ ($\pm 2^{nd}$ or $\pm 1^{st}$ depending on the topology) in the mentioned angular range at red color wavelength. From FIG. 7C corresponding to the red color, the angular range $[\theta^G_{2,red}; \theta^C_{2,red}]$ diffract inside of the waveguide into the angular range $[\phi^C_{2,red}; \phi^G_{2,red}]$. For an example embodiment we obtain that $\theta^C_{2,red} \approx \theta_M$.

At a wavelength corresponding to the green color we will observe the shift of an angular distribution toward the lower angles of an incidence leading to the angular overlapping of the light portion transmitted by DG1 and DG2 and corresponding second and third diffraction orders. Finally, we obtain the range of the angles for which we have the response for both diffraction orders (angular overlapping of the characteristics).

The next table (Table 1.1) shows example practical parameters and calculated values used in some embodiments according to the previously solved set of equations for two diffraction gratings at three different wavelengths and $n_3$ corresponding to a high index wafer.

In Table 1.1, selected parameters of the example system are marked with a dagger (†). Other parameters are calculated from the selected parameters. To determine the lower boundary for the angular range we use $$\Phi_1^G \approx \Phi_2^G \approx 90°$$

and angles corresponding to the $$\Phi_1^G \approx \Phi_2^G \approx 75°$$

are presented in parentheses.

To calculate the periods for diffraction gratings configured to in-couple first diffraction order ($M_{1T,2T}=1$), we use equations 1.2 and 1.4. Alternative embodiments may use another configuration providing high second order response ($M_{1T,2T}=2$) by increasing the grating pitches by a factor of two. In the example of Table 1.1, d=980 nm, $M_{1T}*=3$, and $M_{2T}*=2$.

TABLE 1.1

| | λ = 460 nm | λ = 530 nm | λ = 620 nm |
|---|---|---|---|
| DG1 ($M_{1T}$ = 1) | | $d_1 = \frac{d}{3} \approx 326.67$ nm | |
| $\Theta_1^G$ | −21.72° (−18°) † | −8.6° (5.1°) | 7.55° (11.05°) |
| $\Phi_1^G$ | 90° (75°) † | 90° (75°) † | 90° (75°) † |
| $\Theta_1^C$ | 24.1° | 38.5° | 63° |
| DG2 ($M_{2T}$ = 1) | | $d_2 = \frac{d}{2} \approx 490$ nm | |
| $\Theta_2^G$ | −57.08° (−51.15°) | −43.64° (−39.03°) | −30° (26.17°) |
| $\Phi_2^G$ | 90° (75°) † | 90° (75°) † | 90° (75°) † |
| $\Theta_2^C$ | 3.51° | 4.68° | 15.4° † |

In the example below, the desired symmetrical field of view is equal to $\Delta\theta_2=30°$. Some angles are overlapped to avoid black bands for some colors. Such a system may achieve the desired field of view using just one waveguide. But if the index of refraction of the waveguide is increased, it is possible to improve the uniformity of transmitted orders choosing the angular ranges with more uniform distribution for each diffractive grating.

In FIGS. 7A-7C, the operation of an system using colors is schematically depicted. The possible values of the angles are presented in Table 1.1. As an input to the waveguide, there is an RGB image with the three colors are superimposed. But in the schematic illustrations of FIGS. 7A-7C, the colors are shown disjointed in order emphasize the difference in behavior of each color.

The schematics illustrate the angular space for each color (starting from the blue color). For the blue color (FIG. 7A) the coupled portion of light corresponds to the third transmitted order. For green and red colors (FIGS. 7B, 7C), the illustration shows the portion of light coupled by this waveguide corresponding to the third and second transmitted orders of the meta-surface. Below are presented a set of numerical simulations for an example transmissive meta-surface (see FIGS. 8A-8C) with a high refractive index configured to in-couple 2nd and 3rd transmissive diffraction orders for TE polarization.

The presented data were obtained using the COMSOL Multiphysics software. The simulations assume that $n_1$ is the refractive index of host medium and $n_1=1$ (air). The simulated system uses $TiO_2$ as the material of the elements of DG1 ($n_2=n_4$, $n_2$ and $n_4$ correspond to refractive index of $TiO_2$) and aluminum arsenide (AlAs) as the material of the elements of DG2 ($n'_2=n'_4$, $n'_2$ and $n'_4$ correspond to the refractive index of AlAs). The example uses $SiO_2$ as the host medium for the half of the elements of DG1 and DG2 ($n_5$ and $n'_1$ correspond to refractive index of $SiO_2$) and sapphire ($Al_2O_3$) as the material of the substrate, stop layers, layer between the gratings and host medium of the half of the elements of DG2 ($n_3=n'_5=n_6=n_{L1}$, $n_3$, $n'_5$, $n_6$ and $n_{L1}$ correspond to refractive index of $Al_2O_3$). For the system described below we use just one stop layer in DG1.

The presented numerical simulations take into account the dispersion of materials, and for three different colors we have the following values of the refractive indexes for the mentioned materials:

TABLE 1.2

| | λ = 460 nm | λ = 530 nm | λ = 620 nm |
|---|---|---|---|
| Sapphire ($Al_2O_3$) | 1.7783 | 1.7719 | 1.7666 |
| $TiO_2$ | 2.7878 | 2.6702 | 2.5915 |
| AlAs | 3.4739 + i0.014210 | 3.2735 + i0.0042277 | 3.1396 + i0.0011544 |
| Si | 4.5766 + i0.12819 | 4.1602 + i0.052853 | 3.9058 + i0.021982 |
| $SiO_2$ | 1.4648 | 1.4608 | 1.4574 |

FIG. 8 presents the total response of the full meta-surface system. The system is configured for full RGB images using an in-coupling meta-surface with a desired field of view of 30°.

The transmissive diffraction grating DG1 configured for the blue color to couple the third order transmitted by the full meta-surface system has a period $d_1$ (see Table 1.1) and $TiO_2$ elements with $w_1=80$ nm, $h_1=100$ nm, $w_2=100$ nm, $h_2=100$ nm. In an example, this grating has a stop layer with the thickness $H_{L1}=5$ nm. The transmittance and reflectance of this transmissive diffraction grating for blue and green color wavelengths with the waveguide material below the grating are presented in FIGS. 8A and 8B.

The transmissive diffraction grating DG2 configured for the red color has a period $d_2$ (see Table 1.1) and the following parameters of the AlAs elements: $w'_1=60$ nm, $h'_1=180$ nm, $w'_2=80$ nm, $h'_2=200$ nm. The transmittance and reflectance of this transmissive diffraction grating placed between the two waveguide layers (incidence angles correspond to the incidence from the waveguide material) for the red color wavelength are presented in FIG. 8C. In the meta-surface composition, this grating converts the portion of the red light transmitted by the first diffraction grating (0 transmitted order, $T_0$) into the second diffracted orders transmitted by the full meta-surface system which will be coupled by the waveguide.

For the presented simulations, the distance between the elements of gratings $H_a$ was equal to 110 nm and was filled up by the material of the waveguide. The distance between the elements of diffraction gratings DG1 and DG2 has been found to affect the performance of the system. It is explained by the modification of the phase of the light transmitted through the first grating DG1.

Figure 8A:
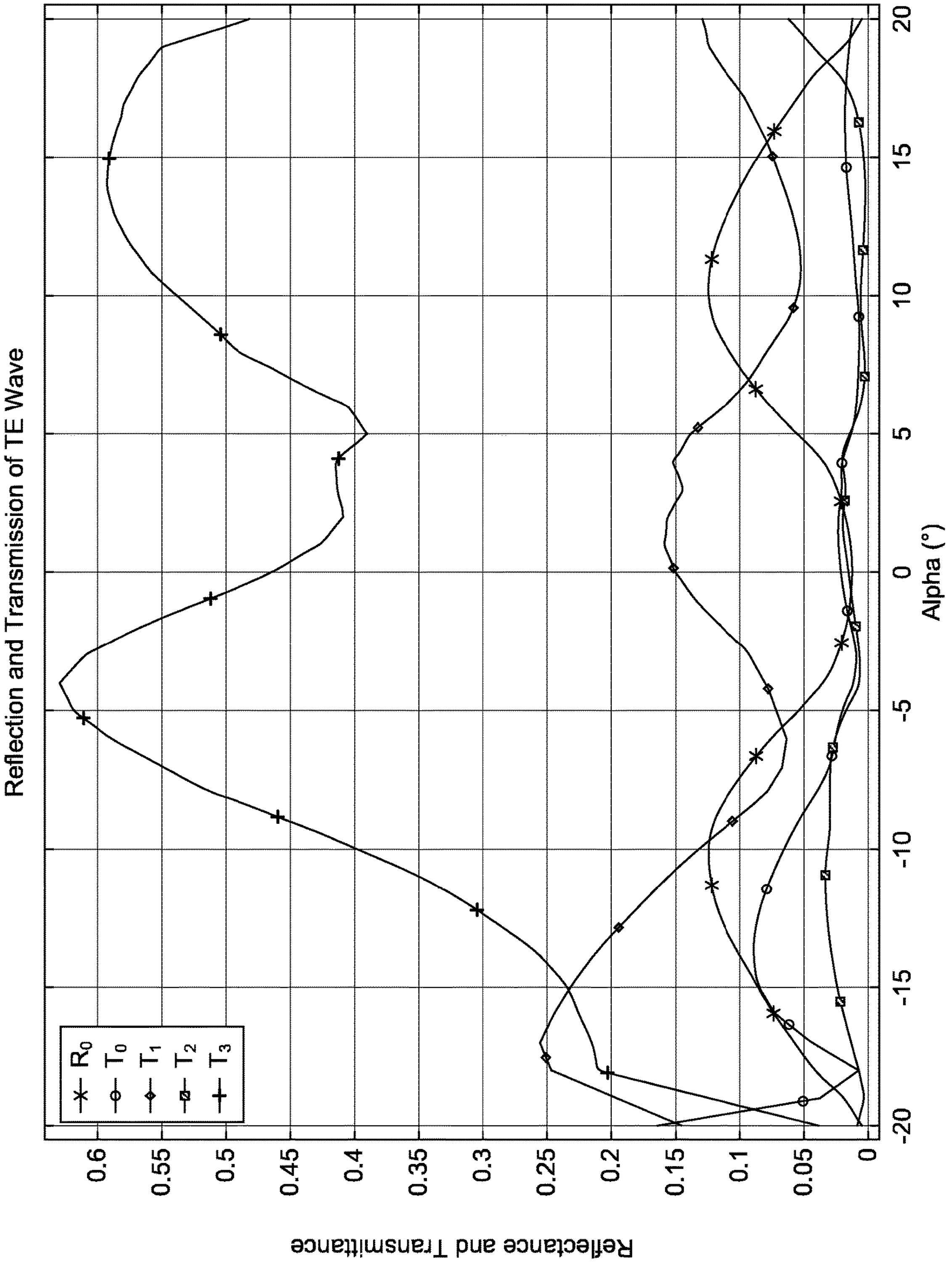
FIGS. 8A-8C illustrate simulated diffraction performance of the $TiO_2$/AlAs transmissive meta-surface using the unit cell depicted in FIG. 6 for an example set of parameters.
Figure 8B:
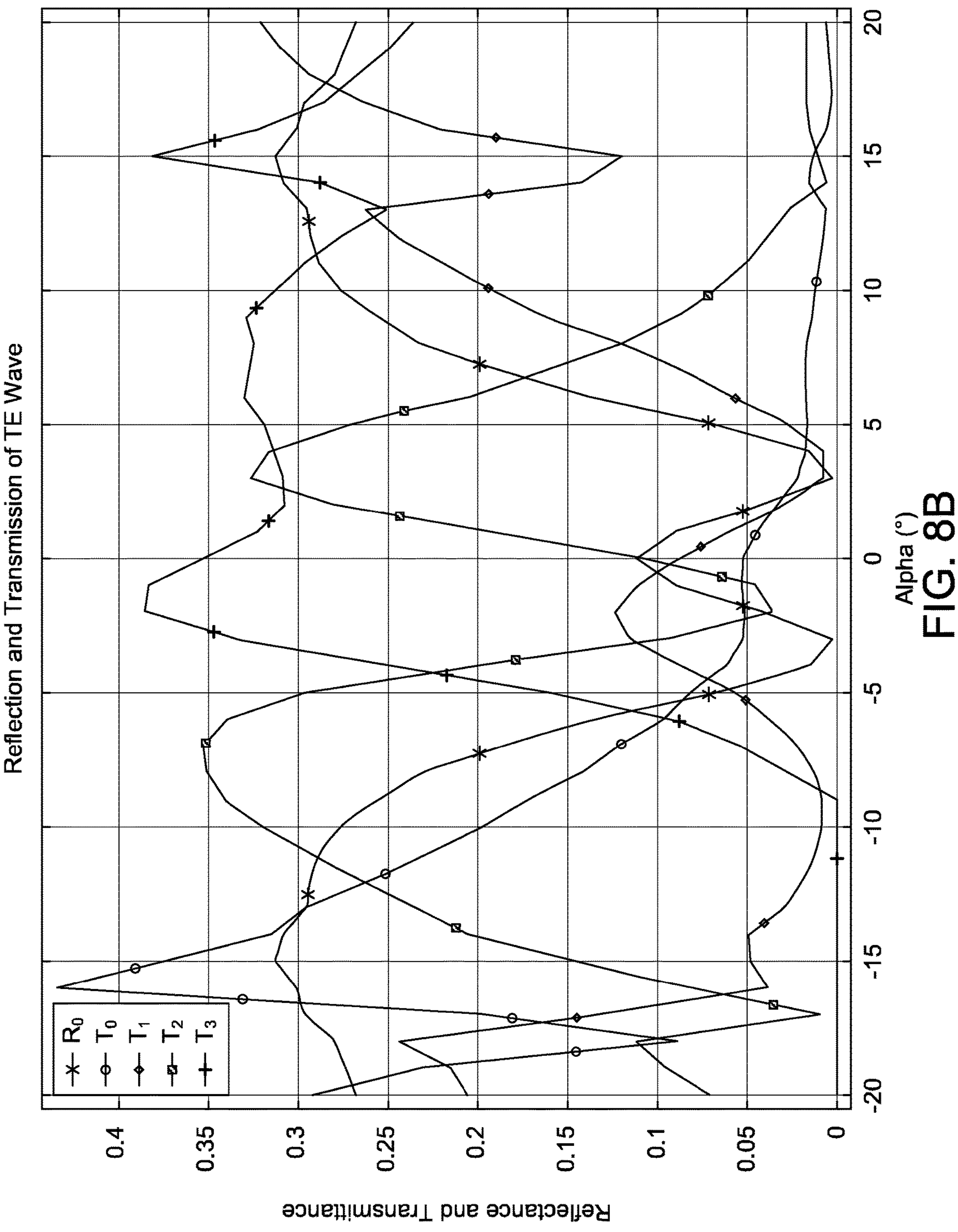
Figure 8C:
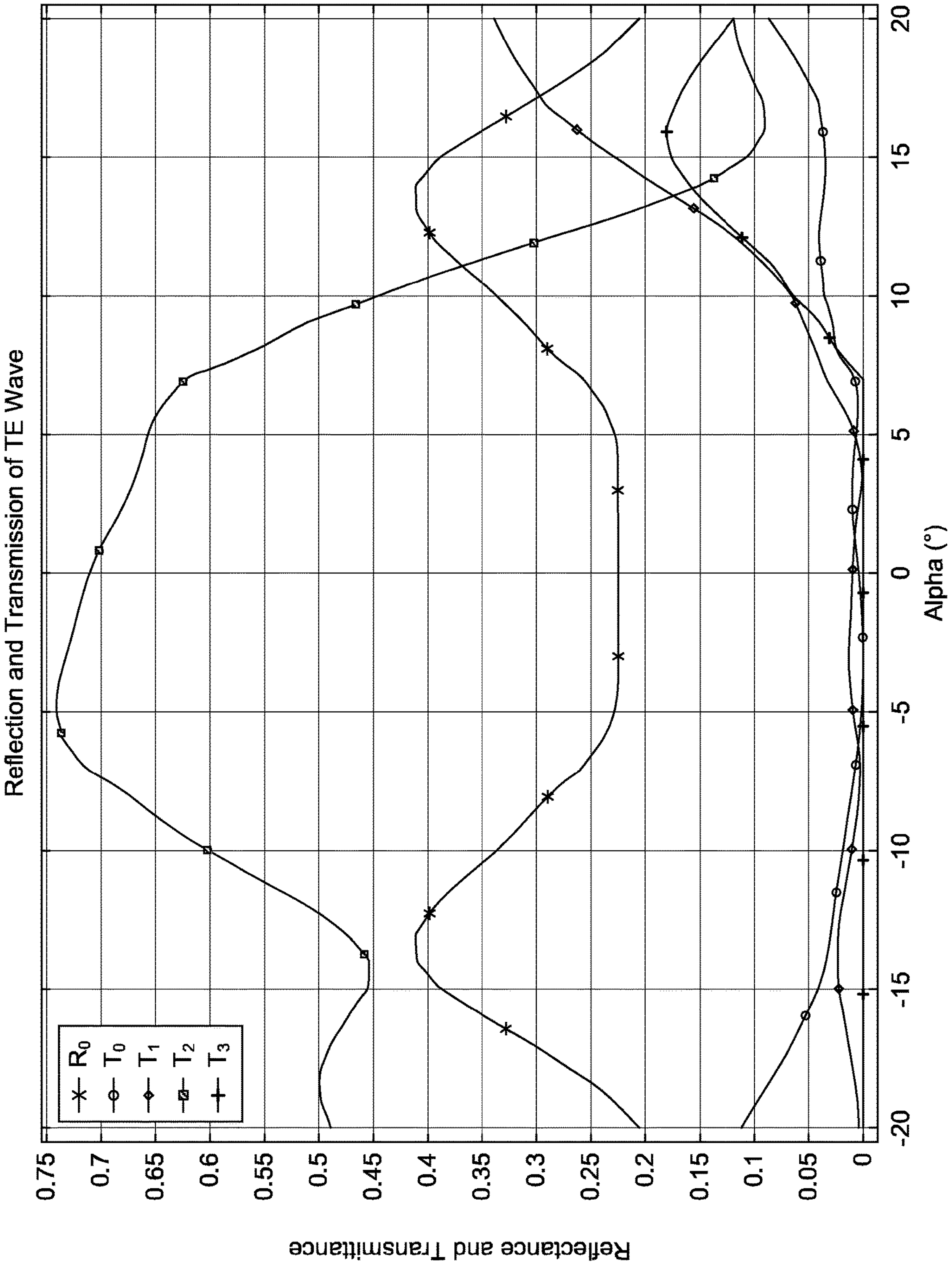

FIGS. 8A-8C illustrate simulated diffraction performance of the $TiO_2$/AlAs transmissive meta-surface using the unit cell depicted in FIG. 6 with the following parameters: d=980 nm, $w_1=80$ nm, $w_2=100$ nm, $h_1=h_2=100$ nm, $H_{L1}=5$ nm, $H_{L2}=0$ nm, $w'_1=60$ nm, $w'_2=80$ nm, $h'_1=180$ nm, $h'_2=200$ nm, $H'_{L1}=0$ nm, $H'_{L2}=0$ nm, $d_r=-30$ nm, $d'_r=10$ nm, $H_a=110$ nm. Sapphire is the material of a waveguide. The field of view extends between −15° and +15° for a total field of view of 30°. For the simulation, $n_1=1$ (air), $n_2=n_4$ and this refractive index corresponds to $TiO_2$, $n'_2=n'_4$ and this refractive index corresponds to AlAs, $n_5=n'_1$ and it is $SiO_2$ material, $n_3=n_{L1}=n'_5=n_6$ and it is the material of a waveguide ($Al_2O_3$).

FIG. 8A shows the performance with blue light (460 nm wavelength), with in-coupled light corresponding to the line T2. FIG. 8B shows the performance with green light (530 nm wavelength), with in-coupled light corresponding to the lines T2 and T3. FIG. 8C shows the performance with red light (620 nm wavelength), with in-coupled light corresponding to the line T2.

In example embodiments, it is desirable to select a substrate/waveguide with a high refractive index.

With consideration given to the desired in-coupled field of view and the refractive index of the waveguide, it is desirable to select the materials for the elements of the diffraction gratings to generate edge waves that enhance the coupling of the desired diffractive order.

In some embodiments, a meta-surface is selected to have a larger number of elements per unit cell.

Example embodiments may allow the use of a single waveguide with a desired field of view capable of coupling a full-color RGB image. To do this, some embodiments use a meta-surface that combines two transmissive diffraction gratings, each of which may be a two-layer grating, on the top of the waveguide. Example embodiments provide similar angular distributions of the in-coupled light inside the waveguide for three colors.

2. Embodiments with Embedded RGB Single Mode Metagrating

Some embodiments provide a full RGB single waveguide system based on single mode asymmetric diffraction gratings. Example embodiments employ a metagrating inside the waveguide, allowing for coupling of diffracted rays for different colors. Some embodiments are implemented without metallization of the metagrating surface. Embodiments that use a combination of transmissive and reflective gratings can be transparent for straight light and can be also used for out-coupling purposes. Because the grating is embedded into the waveguide, this metagrating is protected from mechanical damage and degradation. Embodiments can be configured to get on-axis (symmetrical) and off-axis (asymmetrical) in-coupling for the desired field of view of the device. In some embodiments, the system is configured as a single waveguide metagrating with in-couplers based on a combination of different types of diffraction gratings providing a non-symmetrical response (for example, slanted, blazed, binary, multilevel, step-like and double-material gratings).

A diffraction grating configured to achieve high grating efficiency in a diffraction order other than the zero order can provide light deviation functions in the far-field zone. Example embodiments employ double-material microlenses for deviating and focusing the incident light in the near-field zone for the purpose of a targeted light distribution in the far-field zone.

Example embodiments provide a single waveguide single mode full-color system for in-coupling light into the optical device. Such a property to deviate light by single component will advantageously be used in diffraction gratings with non-symmetrical distribution of an intensity ($T_j \neq T_{-j}$, $R_j \neq R_{-j}$, . . . , where j is the diffraction order) leading to good grating efficiency for the desired diffraction order. Example embodiments provide high diffraction uniformity and efficiency of first order and simplify the fabrication process. Example embodiments may provide good gathering of diffracted rays for different colors. In some embodiments, no metallization of the components of the metagrating is performed. Example embodiments may be configured for on-axis and off-axis in-coupling of incident light.

Figure 9:
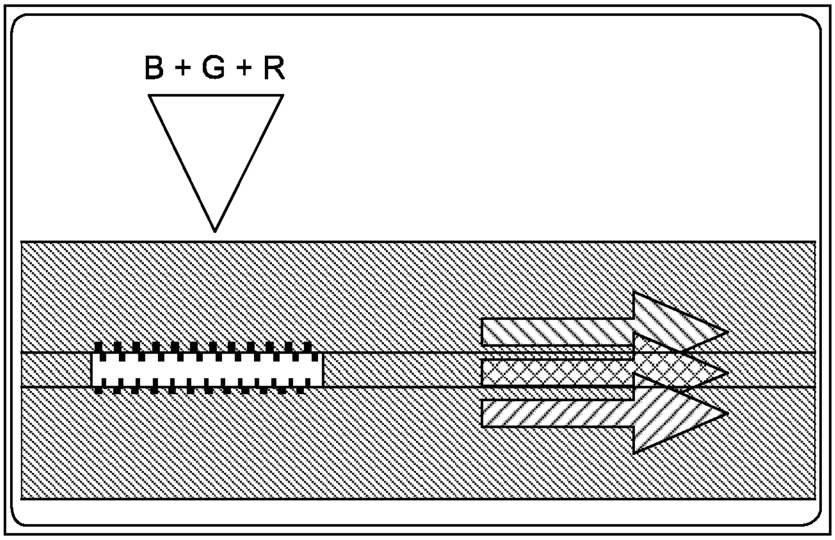
FIG. 9 is a schematic side view of an example waveguide of a full RGB system with a metagrating inside the waveguide.

FIG. 9 is a schematic side view of an example waveguide of a full RGB system with a metagrating inside the waveguide.

Figure 10:
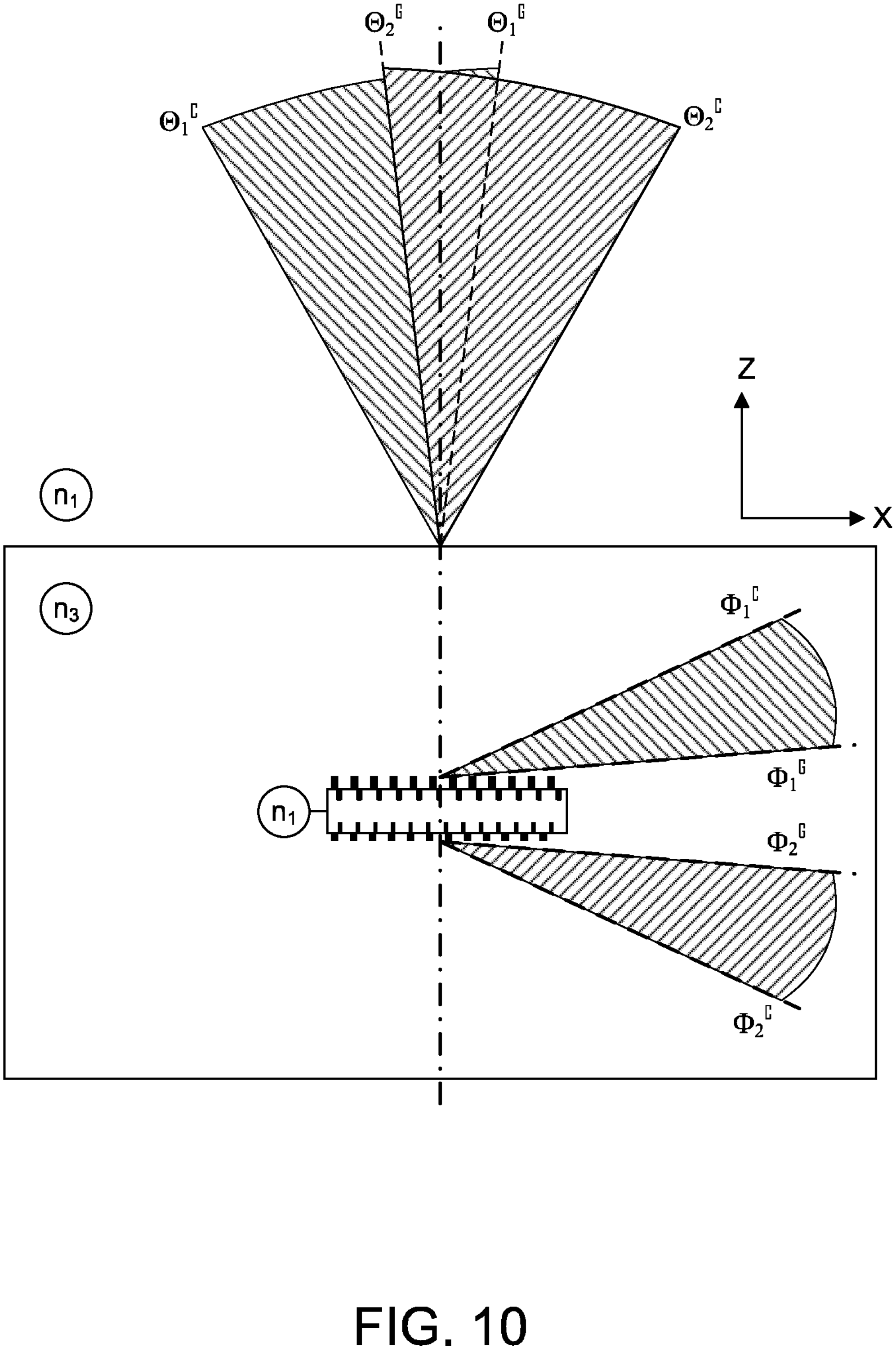
FIG. 10 is a schematic side view of a single-waveguide in-coupling system illustrating angles of incident and diffracted light for the case when an incident light is in-coupled by reflective or transmissive diffraction gratings representing a metagrating in-coupler inside the waveguide.

FIG. 10 is a schematic side view of a single-waveguide in-coupling system illustrating angles of incident and diffracted light for the case when an incident light is in-coupled by reflective or transmissive diffraction gratings representing a metagrating in-coupler inside the waveguide. Angles denoted using θ are located in the air. Angles denoted using ϕ are located in the waveguides and measure the angle of rays that have been diffracted. Superscript C indicates a critical ray, either in air or in the waveguide. Superscript G indicates a grazing ray.

Example embodiments (e.g. FIG. 9) operate using diffraction of the incident light by the metagrating, wherein the metagrating comprises reflective and transmissive diffraction gratings, and in-coupling it into the waveguide. A combination of diffraction gratings provides high-uniformity and high-performance in-coupling for three colors.

FIG. 10 illustrates the functionality of the proposed metagrating for the case of a symmetrical field of view. For one wavelength the angular range $[\theta^C_1; \theta^G_1]$ is diffracted (reflected) inside the waveguide into the angular ranges $[\phi^C_1; \phi^G_1]$ by the top reflective diffraction grating of the example metagrating composition. The field of view in the example of FIG. 10 is for a single mode system where one single diffraction mode is used to carry the image: either +1 or −1 diffraction mode (or >±1 diffraction mode depending on the system topology).

For the top reflective grating for the angular range $[\theta^C_1; \theta^G_1]$, where $\theta^C_1$ could be equal $-\theta^G_1$ to get a symmetrical in-coupling angular range (on-axis incoupling) relatively to the vertical axis z (the angular range also can be non-symmetrical depending on the system requirements), for the positive diffraction mode the diffracted image will propagate toward the right into the waveguide.

For the case of another wavelength, incident light will be partially in-coupled by the top reflective diffraction grating, and a portion of the light will go through the first diffraction grating and will be diffracted by the second transmissive diffraction grating, which is toward the bottom of the metagrating in this example. The corresponding angular range inside the waveguide is $[\phi^C_2; \phi^G_2]$. To improve the in-coupled field of view, the bottom transmissive diffraction grating is operative in some embodiments to in-couple the angular range $[\theta^G_2; \theta^C_2]$ for the light with maximal wavelength (red color for RGB system), where $\theta^G_2=\theta^G_{1,red}-\Delta\Theta$, and $\theta^G_{1,red}$ is the maximal incident angle in-coupled by the first grating at the red color wavelength and ΔΘ is an angular overlapping.

For the bottom diffraction grating, for the angular range $[\theta^G_2; \theta^C_2]$, the positive transmitted mode of diffracted image will propagate toward the right into the waveguide.

Constitutive parts of an example metagrating are different diffraction gratings in that they could have different periods calculated for the proper wavelength and may have different size and material of the elements, but the geometrical structure that emphasizes the edge-waves can be of the same shape. Using the elements of a different shape may allow for an additional degree of freedom providing the possibility to improve the performance of the system.

In some embodiments, to provide a single waveguide device operative to in-couple all three colors, the system may be configured as follows.

The first reflective diffraction grating DG1 (with the period $d_1$, top of metagrating composition) may be configured as follows. The period of reflective diffraction grating may be configured to in-couple blue color wavelengths in the angular range covering the desired field of view of the device for these colors, assuming that for blue color in the case of a symmetrical field of view $$\Theta^C_{1,blue} \approx -\Theta^G_{1,blue},$$

and in the case of non-symmetrical field of view $$|\Theta^C_{1,blue}| \neq |\Theta^G_{1,blue}|.$$

To provide better uniformity of in-coupled light, the corresponding characteristics of the waveguide may provide a higher theoretically possible field of view $\Delta\theta_1$ in comparison with the desired field of view $\Delta\theta_2$ ($\Delta\theta_1=\Delta\theta_2+\gamma_M+\gamma_m$), $\gamma_{M,m}$ are the maximal and minimal differences between theoretically possible value of in-coupled incident angle and the required incident angle). Consider a case where, in accordance with the device specification the desired field of view is equal to $\Delta\theta_2=\theta_M-\theta_m$, where angles $\theta_m$ and $\theta_M$ correspond to the lower and upper boundaries of the desired field of view of the proposed device. In the case of symmetrical field of view, $\theta_m=-\theta_M$, and for the non-symmetrical field of view we will take $|\theta_m| \neq |\theta_M|$. The diffraction grating may be configured to get high diffraction efficiency of corresponding orders $M_R$ ($\pm 2^{nd}$ or $\pm 1^{st}$ depending on the topology) in the mentioned angular range at blue color wavelengths. The angular range $[\theta^C_1; \theta^G_1]$ diffracts inside of the waveguide into the angular range $[\phi^C{}_1; \phi^G{}_1]$. To determine the period of DG1, a system of diffraction grating equations may be used.

$$n_{3B}\sin\Phi^C_{1,blue} - n_1\sin\Theta^C_{1,blue} = \frac{M_R\lambda_B}{d_1} \quad (2.1)$$

$$n_{3B}\sin\Phi^G_{1,blue} - n_1\sin\Theta^G_{1,blue} = \frac{M_R\lambda_B}{d_1}$$

We assume that $n_1=1$. Some values are known, e.g. sin $$\Phi^C_{1,blue} = \frac{1}{n_{3B}},$$

wherein $n_{3B}$ is refractive index of the waveguide's material at the wavelengths of blue color, $M_R$ corresponds to the diffraction order of the first diffraction grating in the example metagrating. According to an embodiment of the present disclosure, $$\Phi^G_{1,blue}$$

is chosen to approximately equal to 75°-90°. In a case where $$\Phi^G_{1,blue} \approx 90°$$

and using the equations provided above, the pitch of the first diffraction grating can be configured for a symmetrical field of view:

$$d_1 = \frac{2M_R\lambda_B}{1+n_{3B}} \quad (2.2)$$

For the non-symmetrical field of view with the known minimal value of the incident angle $$\Theta^C_{1,blue},$$

the following formula may be used:

$$d_1 = \frac{M_R\lambda_B}{1 - n_1\sin\Theta^C_{1,blue}} \quad (2.3)$$

Where $$|\Theta^C_{1,blue}| = |\theta_m + \gamma_m|.$$

Figure 11A:
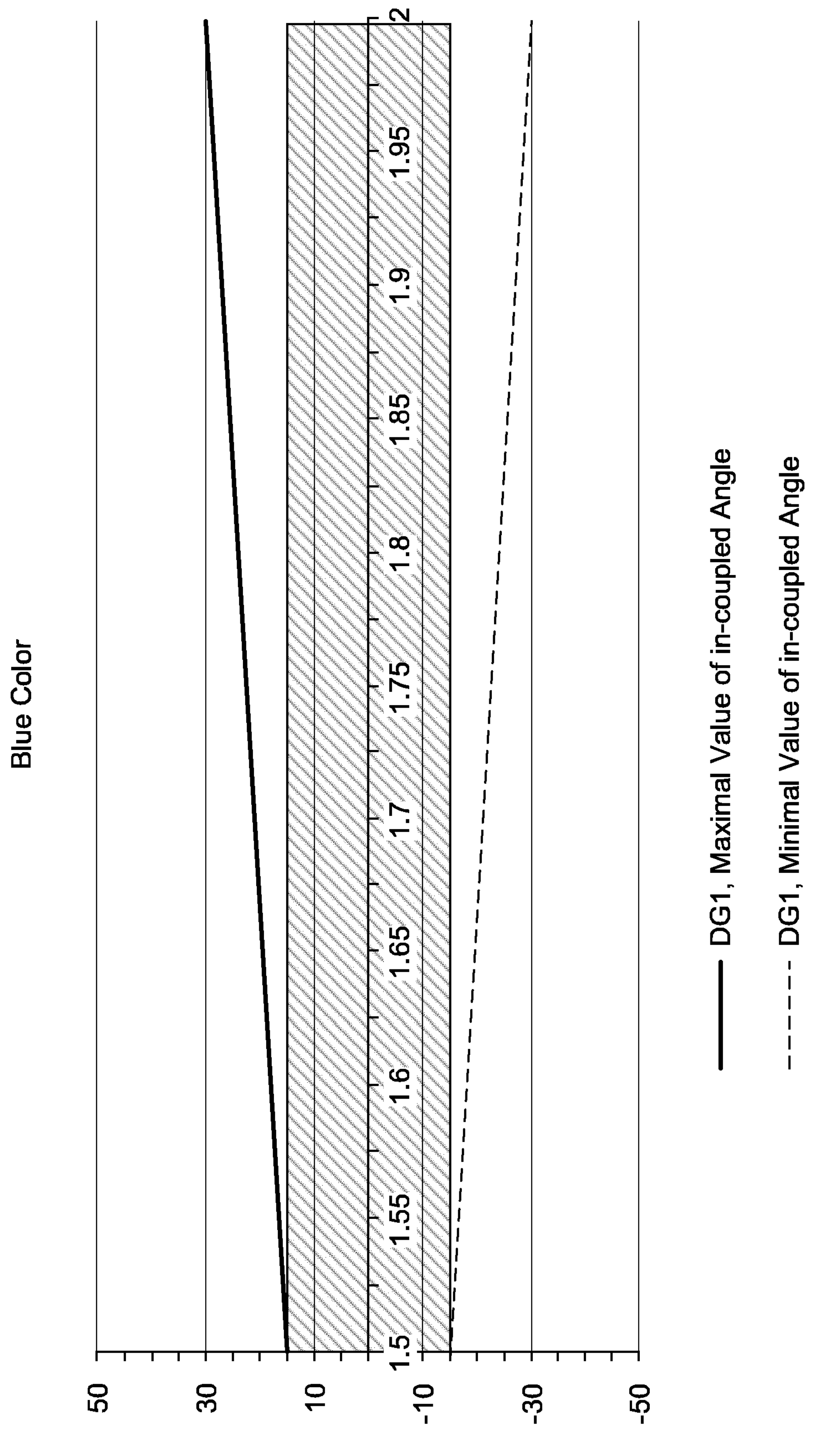
FIGS. 11A-11C illustrate an example RGB single-waveguide in-coupling system's field of view as a function of the refractive index of waveguide material for $\Delta\theta=5°$ for blue light (FIG. 11A), green light (FIG. 11B), and red light (FIG. 11C).
Figure 11B:
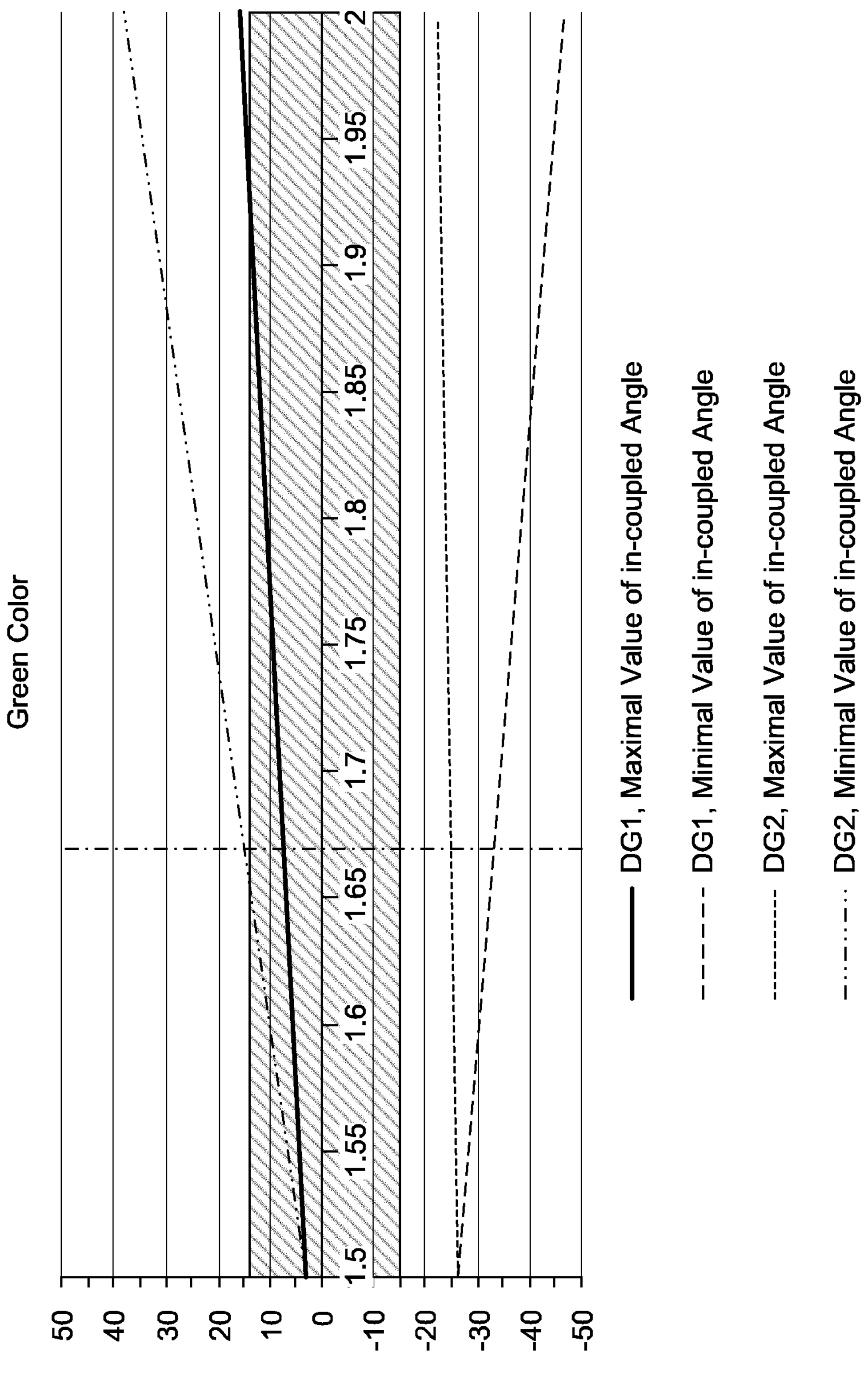
Figure 11C:
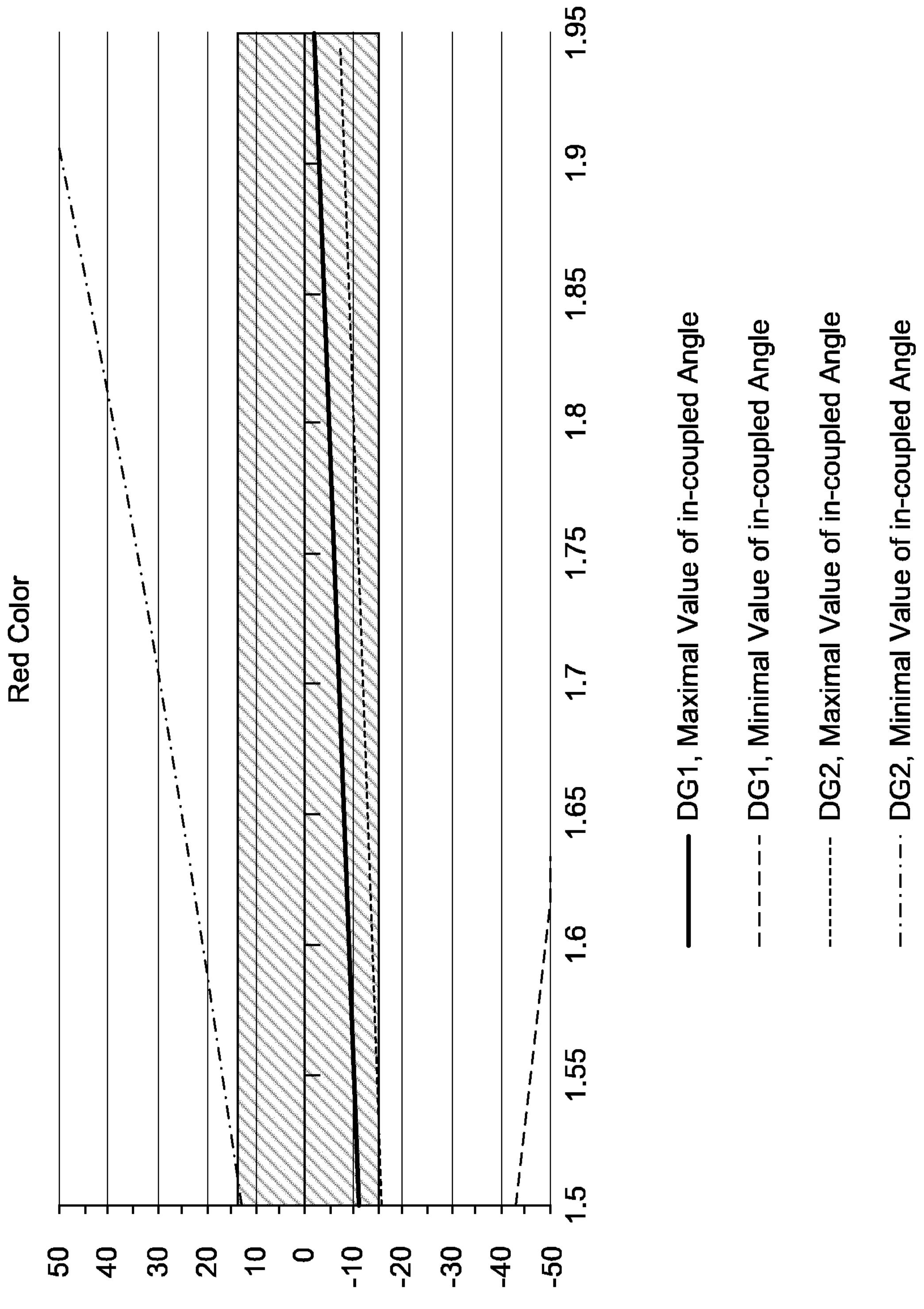

The dependencies of minimal and maximal (theoretically possible) in-coupled incident angles on the refractive index of the waveguide for blue color wavelength and symmetrical field of view is presented in FIGS. 11A-11C. Note that for $$\Phi^G_{1,2}$$

corresponding to 75°, the theoretical field of view will be reduced.

FIGS. 11A-11C illustrate an example RGB single-waveguide in-coupling system's field of view as a function of the refractive index of waveguide material for $\Delta\theta=5°$ for blue light (FIG. 11A), green light (FIG. 11B), and red light (FIG. 11C).

Maximal and minimal values of the angles in-coupled by the diffraction grating DG1 correspond to $\theta^G{}_1$ and $\theta^C{}_1$ respectively. Maximal and minimal values of the angles in-coupled by the diffraction grating DG2 correspond to $\theta^C{}_2$ and $\theta^G{}_2$ respectively. It may be noted that a symmetrical field of view of $\Delta\theta_2=30°$ is achievable.

At the wavelength corresponding to the green color we will observe the shift of an angular distribution toward the lower angles of an incidence. Similar functionality will be observed at the wavelength corresponding to the red color. Increasing the wavelength, we obtain an additional shift of an angular distribution toward the lower angles of an incidence. For all three colors all angles above $\theta^G{}_1$ transmit through the reflective diffraction grating (it corresponds to the 0 transmitted order $T_0$) with a very high efficiency. This portion of incident image will be also diffracted by transmissive grating DG2, and after it can be combined with the portion of image reflected by the first grating DG1.

The second transmissive diffraction grating DG2 (with the period $d_2$, bottom of metagrating composition) may be configured as follows. The period of transmissive diffraction grating DG2 may be configured for red color wavelength and an angular range covering the portion of field of view which was not in-coupled by the first grating. This diffraction grating may also be configured to get high diffraction efficiency of corresponding orders $M_T$ ($\pm 2^{nd}$ or $\pm 1^{st}$ depending on the topology) in the mentioned angular range at red color wavelength. The angular range $[\theta^G{}_2; \theta^C{}_2]$ diffracts inside of the waveguide into the angular range $[\phi^C{}_2; \phi^G{}_2]$. To configure the second transmissive grating in-coupling red color, a system of diffraction grating equations may be applied, taking into account angular overlapping ($\Delta\theta$) for the grazing incident rays in-coupling by the reflective grating and grazing incident rays in-coupling by the transmissive grating $$\left(\Theta^G_{2,red} \approx \Theta^G_{1,red} - \Delta\theta\right):$$

$$n_{3R}\sin\Phi^G_{1,red} - n_1\sin\Theta^G_{1,red} = \frac{M_R\lambda_R}{d_1} \quad (2.4)$$

$$n_{3R}\sin\Phi^G_{2,red} + n_1\sin\left(\Theta^G_{1,red} - \Delta\theta\right) = \frac{M_T\lambda_R}{d_2}$$

In this example, $n_1=1$, $n_{3R}$ is refractive indexes of the waveguide's material at the wavelengths of red color, and $M_T$ corresponds to the diffraction order of the second diffraction grating of metagrating solution. According to an embodiment of the present disclosure, $$\Phi^G_1$$

and $$\Phi_2^G$$

are chosen approximately equal to 75°-90°. Assuming that $$\Phi_1^G \approx \Phi_2^G \approx 90°,$$

we get $$d_2 \approx \frac{M_T \lambda_R}{n_{3R} + n_1 \sin(\Theta_{1,red}^G - \Delta\theta)} \quad (2.5)$$

$$\text{where } \Theta_{1,red}^G \approx \sin^{-1}\left(\left(n_{3R} - \frac{M_R \lambda_R}{d_1}\right)/n_1\right).$$

As the result of an analysis of FIGS. 11A-11C we can conclude that for proposed type of configuration with $\Delta\theta=5°$ to in-couple a field of view of $\Delta\theta_2=30°$ it is desirable to use a waveguide with refractive index $n_3>1.67$.

For another example of a metagrating in-coupler, the configuration may be performed as follows.

For the first reflective diffraction grating DG1 (with the period $d_1$, top of metagrating composition), the period of the reflective diffraction grating DG1 may be calculated to in-couple blue and green color wavelengths in the angular range covering the desired field of view of the device for these two colors, assuming that for blue color the incoming rays with critical angle of an incidence are in the vicinity of the lower boundary of the field of view $$(\Theta_{1,blue}^C \approx \theta_m)$$

and for green color the incoming grazing rays are in the vicinity of upper boundary of the field of view $$(\Theta_{1,green}^C \approx \theta_M).$$

The diffraction grating may be configured to get high diffraction efficiency of corresponding orders $M_R$ ($\pm 2^{nd}$ or $\pm 1^{st}$ depending on the topology) in the mentioned angular range at blue and green color wavelengths. From FIG. 12A corresponding to the blue color, the angular range $[\theta^C_{1,blue}; \theta^G_{1,blue}]$ diffracts inside of the waveguide into the angular range $[\phi^C_{1,blue}; \phi^G_{1,blue}]$. At the wavelength corresponding to the green color we will observe the shift of an angular distribution. But to in-couple the light with the wavelength corresponding to the blue and green colors incident at the desirable angles we may use a system of diffraction grating equations.

$$n_{3B}\sin\Phi_{1,blue}^C - n_1\sin\theta_m = \frac{M_R\lambda_B}{d_1} \quad (2.6)$$

$$n_{3G}\sin\Phi_{1,green}^G - n_1\sin\theta_M = \frac{M_R\lambda_G}{d_1}$$

Here $n_{3G}$ is refractive index of the waveguide's material at the wavelengths of the green color. Angles $\theta_m$ and $\theta_M$ correspond to the lower and upper boundaries of the field of view of the example device. Using the equations provided above we can select the pitch of first diffraction grating and estimate a minimal refractive index of the waveguide at green color wavelength for in-coupling both colors.

$$d_1 = \frac{M_R\lambda_B}{1 - n_1\sin(\theta_m + \gamma_m)} \quad (2.7)$$

$$n_{3G} \approx \frac{M_R\lambda_G}{d_1} + n_1\sin\theta_M$$

Here the value $$\Phi_{1,green}^G \approx 90°$$

is used.

Figure 12A:
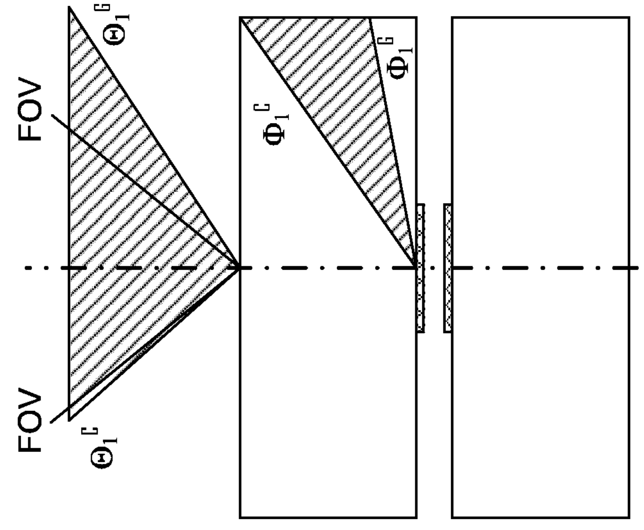
FIGS. 12A-12C are schematic side views of a single waveguide system with a symmetrical field of view for three different colors: blue (FIG. 12A), green (FIG. 12B), and red (FIG. 12C).
Figure 12B:
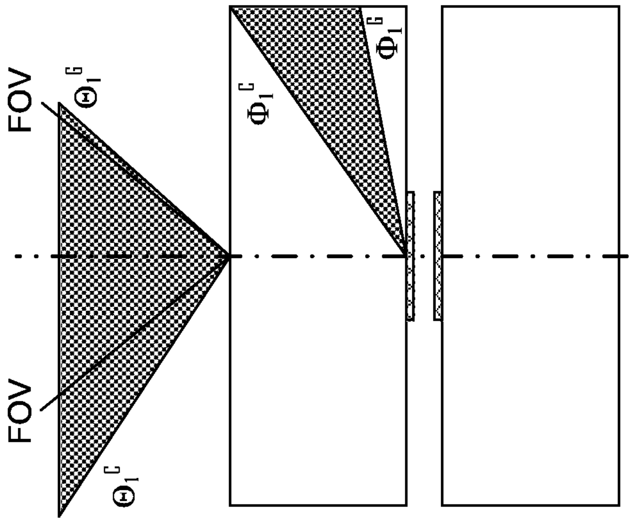
Figure 12C:
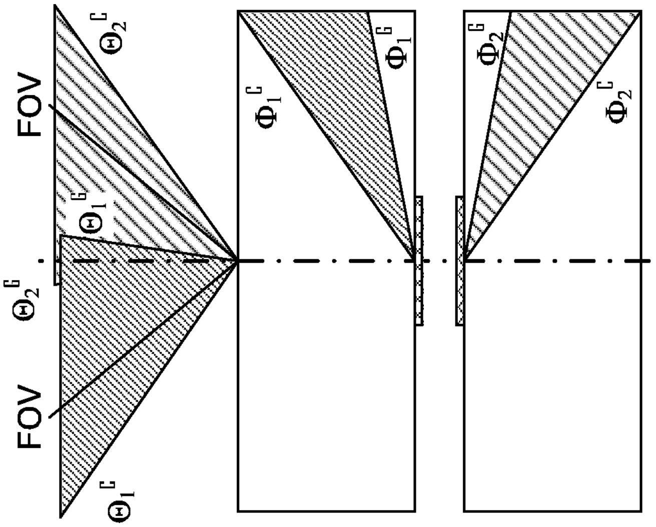

FIGS. 12A-12C are schematic side view of a single waveguide system with symmetrical field of view for three different colors: blue (FIG. 12A), green (FIG. 12B), and red (FIG. 12C).

At the wavelength corresponding to the green color we will observe the shift of an angular distribution toward the lower angles of an incidence. As seen in FIG. 12B, at green color wavelength the angular range $[\theta^C_{1,green}; \theta^G_{1,green}]$ diffracts inside of the waveguide into the angular range $[\phi^C_{1,green}; \phi^G_{1,green}]$.

Similar functionality will be observed at the wavelength corresponding to the red color. Increasing the wavelength, we obtain an additional shift of an angular distribution toward the lower angles of an incidence. As seen in FIG. 12C, at the red color wavelength the angular ranges $[\theta^C_{1,red}; \theta^G_{1,red}]$ diffracts inside of the waveguide into the angular range $[\phi^C_{1,red}; \phi^G_{1,red}]$. Angles above $\theta^G_{1,red}$ transmit through the reflective diffraction grating (it corresponds to the 0 transmitted order $T_0$) with a high efficiency. This portion of incident image will be also diffracted by transmissive grating DG2, and after it can be combined with the portion of image reflected by the first grating DG1.

The transmissive diffraction grating DG2 (with the period $d_2$, bottom of metagrating composition) may be configured as follows. The period of transmissive diffraction grating DG2 may be configured for red color wavelength and an angular range covering the portion of field of view which was not in-coupled by diffraction grating DG1 (see Eq. 2.5). This diffraction grating may also be configured to get high diffraction efficiency of corresponding orders $M_T$ ($\pm 2^{nd}$ or $\pm 1^{st}$ depending on the topology) in the mentioned angular range at red color wavelength. From FIG. 12C corresponding to the red color, the angular range $[\theta^G_{2,red}; \theta^C_{2,red}]$ diffracts inside of the waveguide into the angular range $[\phi^C_{2,red}; \phi^G_{2,red}]$.

Figure 13:
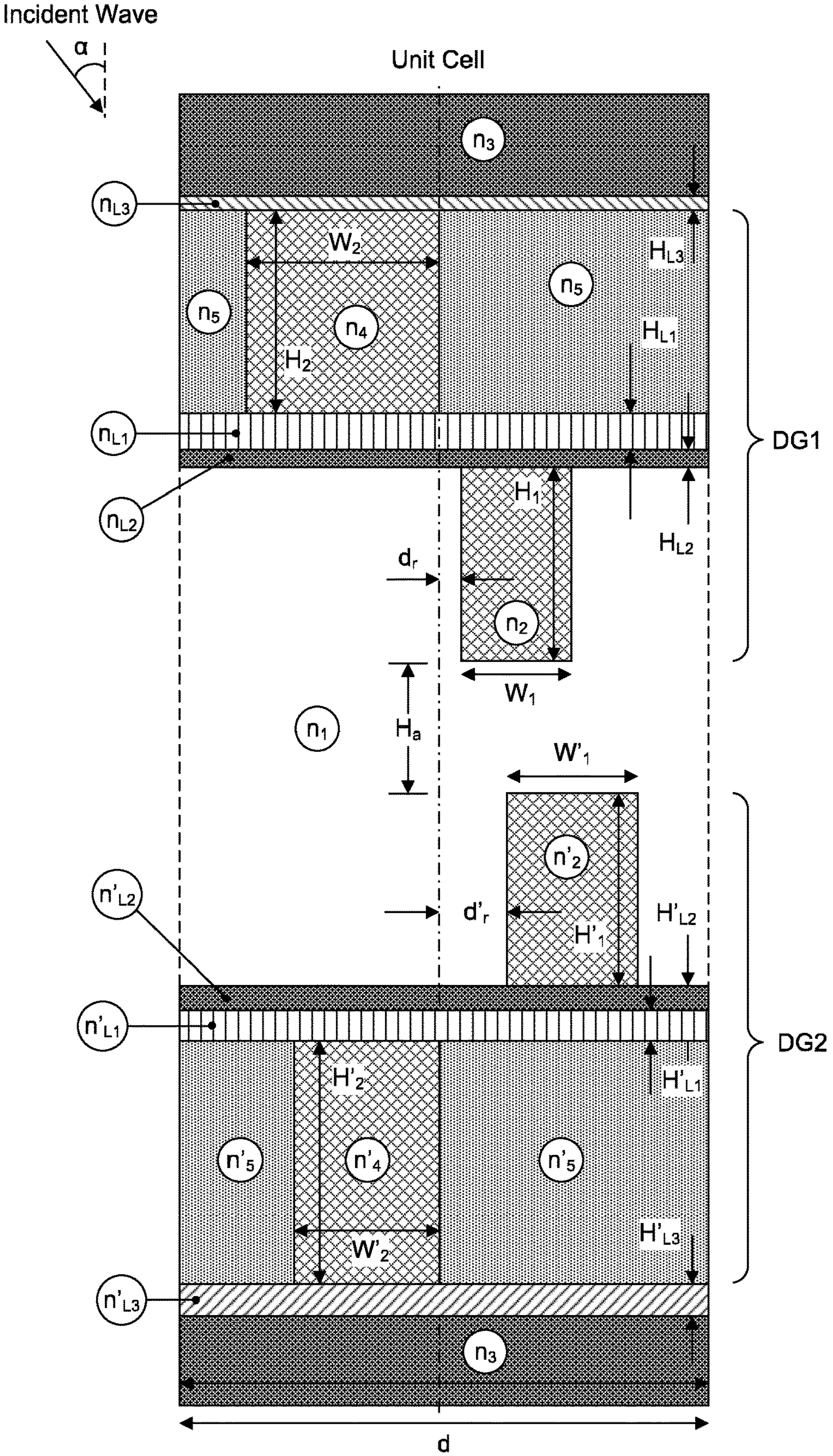
FIG. 13 is an enlarged cross-sectional side view of a unit cell of a metagrating according to some embodiments.

An example topology of the unit cell of a metagrating according to some embodiments is illustrated in FIG. 13. This cross-section view may correspond to the high refractive index ($n_2$ and $n_4$, where $n_2$ could be equal to $n_4$) elements from the bottom of a homogeneous dielectric plate with a refractive index $n_3$ ($n_{2,4}>n_3$), $w_1$ and $h_1$ are width and height of the high refractive index elements outside the substrate, $w_2$ and $h_2$ are width and height of the high refractive index elements inside the layer with the refractive index $n_5$.

Parameter $d_r$ describes the mutual position (e.g. the lateral offset) of the elements in the top layer and the bottom layer of DG1. It corresponds to the distance between the right vertical edge of the top element and left vertical edge of the bottom element. For a negative $d_r$, the bottom element is shifted into the left with respect to the vertical line corresponding to the position of the right vertical edge of the top element. For a positive $d_r$, the bottom element is shifted into the right.

The second part of the example metagrating contains the high refractive index ($n'_2$ and $n'_4$, where $n'_2$ could be equal to $n'_4$, and $n'_2$ and $n'_4$ could be equal to $n_2$ and $n_4$) elements on the top of a homogeneous dielectric plate with a refractive index $n_3$ ($n'_{2,4}>n_3$), $w'_1$ and $h'_1$ are width and height of the high refractive index elements outside the substrate, $w'_2$ and $h'_2$ are width and height of the high refractive index elements inside the layer with the refractive index $n'_5$. Parameter $d'_r$ describes the mutual position of the elements in the top layer and elements in the bottom layer of the grating. It corresponds to the distance between the right vertical edge of the bottom element and left vertical edge of the top element of DG2. For a negative $d'_r$, the top element is shifted into the left with respect to the vertical line corresponding to the position of the right vertical edge of the bottom element. For a positive $d'_r$, the top element is shifted into the right.

To improve the uniformity of reflected and transmitted diffraction orders and additionally increase the efficiency of the in-coupled diffraction orders, some embodiments use phase modifying layers with the thickness $H_{L1}$ and $H'_{L1}$ and refractive indexes $n_{L1}$ and $n'_{L1}$ placed between the high refractive index elements of the gratings. To simplify the fabrication process, some embodiments use stop layers between this thin layer and top elements of the gratings and also between the grating and substrate. In some embodiments, $n_{L2,L3}$ and $n'_{L2,L3}$ are the stop layer material refractive indexes and $H_{L2,L3}$ and $H'_{L2,L3}$ are the thicknesses of these layers. To get the unit cell of an example diffraction metagrating, we combine two plates, one with diffraction grating DG1 and one with diffraction grating DG2. The distance between the plates/substrates may be represented as $H_1+H'_1+H_a$, where $H_a$ is the distance between the elements (see FIG. 13). This distance between the elements of two gratings and substrates may be filled by a material with low refractive index $n_1$ ($n_1<n_3$). This medium can be air or another material.

Provided below are results of simulating the metagrating with the unit cell that includes an element of a reflective diffraction grating and an element of transmissive diffraction grating. It will be demonstrated below in the description of an example configuration that to in-couple all three colors the gratings may be combined with substantially equal periods. For example, the period of the metagrating may be equal to $d=d_1=d_2$. If the period of the reflective diffraction grating is defined to in-couple diffraction order $M_R$ and the period of the transmissive diffraction grating is defined to in-couple diffraction order $M_T$, the period of new metagrating is defined to in-couple reflected order $M_R^*=M_R$ and transmitted order $M_T^*=M_T$. It should be noted that to modify the field of view of an example device, the pitch of the metagrating may be modified and/or the number of the elements in the unit cell for both diffraction gratings may be increased. To select the period of metagrating, consider the biggest angular span that can be in-coupled to propagate into the waveguide by total internal reflection (TIR). A linearly polarized plane wave is incident on the metagrating system from the top in a plane perpendicular to the metagrating. Example embodiments may use TE and/or TM polarizations. But to improve efficiency, the system may be configured taking into account the polarization of an incident wave.

FIG. 13 is an enlarged cross-sectional side view of a unit cell of a metagrating according to some embodiments.

Considering a more general case, depending on the in-coupled wavelengths, the metagrating unit cell can be configured with n elements of reflective diffraction grating with refractive indexes $n_2$ and $n_4$ and m elements of transmissive grating with refractive index $n'_2$ and $n'_4$. In this case the period of the metagrating is equal to $d=nd_1=md_2$. If the period of reflective diffraction grating is defined to in-couple diffraction order $M_R$ and the period of transmissive diffraction grating is defined to in-couple diffraction order $M_T$, the period of new metagrating is defined to in-couple reflected order $M_R^*=nM_R$ and transmitted order $M_T^*=mM_T$.

The mutual positioning of the elements of the two diffraction gratings in relation to one another inside the pitch is not expected to affect the system performance. However, the mutual orientation of the elements of the gratings plays a role in the in-coupling of all three colors into the waveguide. If the orientation of the elements of first reflective grating coincides with the orientation of the transmissive grating, the green color may not be in-coupled into the waveguide with high intensity. For example, it has been found that coupling of green light is improved when both $d_r$ and $d_r'$ are positive (shifted to the right in FIG. 13).

In some embodiments, it is not necessary to have a precise alignment of diffraction gratings DG1 and DG2.

In example embodiments, the materials and size of the constitutive parts may be configured in order to manage the position, direction, phase and amplitude of edge waves diffracted by the vertical edges of the high refractive index element. In some embodiments, the elements of diffraction gratings have vertical edges parallel to z-axis and top/bottom surfaces parallel to xy-plane, which corresponds to the base angle equal to 90°. However, in other embodiments prismatic structures (with base angles other than 90°) can also be used. Variation of the base angle value provides additional degree of freedom in the control of the edge wave radiation. To create the diffraction grating, we take a periodic array of the unit cells.

Configuring the reflective and transmissive parts of a metagrating to in-couple first diffraction orders ($M_R=M_T=1$) results in a metagrating for which the first reflected order $R_1$ ($M_R^*=1$) and 1st transmitted order $T_1$ ($M_T^*=1$) will be in-coupled into the waveguide. Example embodiments include a single diffraction grating system with non-symmetric basic geometries of the elements. The distribution of the diffracted light inside the waveguide is illustrated schematically in FIG. 14.

To provide the total reflection of the diffracted light only by the external (horizontal) walls of the waveguide, some embodiments include layers with the thickness $H_1+H'_1+H_a$ and with refractive index $n_3$ between the plates with the diffraction gratings on both sides of the gratings. Some embodiments use a glue with the same refractive index $n_3$ to prevent the reflection by the boundaries of these layers. To prevent undesirable diffraction of reflected $R_1$ and transmitted $T_1$ orders, it is desirable to consider the lateral size of the metagrating and the width of the plates as well as the thicknesses of the first and second plate, with reflection and transmission gratings.

Figure 14:
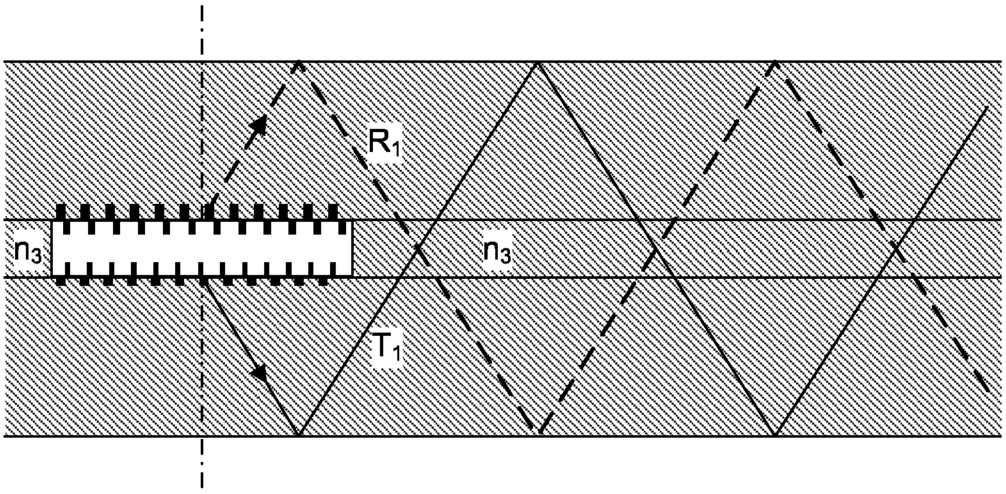
FIG. 14 is a schematic side view illustrating geometry and performance of an example metagrating. In this example, the first reflected order $R_1$ ($M_R^*=1$) and first transmitted order $T_1$ ($M_T^*=1$) will be in-coupled into the waveguide.

FIG. 14 is a schematic side view illustrating geometry and performance of an example metagrating. In this example, the first reflected order $R_1$ ($M_R$*=1) and first transmitted order $T_1$ ($M_T$*=1) will be in-coupled into the waveguide.

Table 2.1 shows some example parameters and calculated values according to the previously solved set of equations for two diffraction gratings at three different wavelengths and $n_3$ corresponding to a high index wafer. Using Eq. 2.7 we have obtained that for $\Delta\theta_2$=30° it is desirable to have $n_3$>1.736.

In Table 2.1, selected parameters of the example system are indicated with a dagger (†). Other parameters are calculated from the selected parameters. To determine the lower boundary for the angular range, values of $$\Phi_1^G \approx \Phi_2^G \approx 90°$$

are used. Angles corresponding to the $$\Phi_1^G \approx \Phi_2^G \approx 75°$$

are presented in brackets.

To select the periods of diffraction gratings configured to in-couple first diffraction order ($M_{R,T}$=1), Eqs. 2.5 and 2.7 are used. In alternative embodiments using the second order response ($M_{R,T}$=2), the pitches of the gratings may be increased by a factor of two.

TABLE 2.1

| | λ = 460 nm | λ = 530 nm | λ = 620 nm |
|---|---|---|---|
| DG1 ($M_R$ = 1) | | $d_1$ = 358.69 nm | |
| $\Theta_1^G$ | 28.52° (24.68°)/ 15.74° (13.73°) * | 16.4° (12.85°) †/ 9.23° (7.26°) * | 1.8° (1.63°)/ −1.03° (−0.93°) * |
| $\Phi_1^G$ | 90°(75°) † | 90°(75°) † | 90°(75°) † |
| $\Theta_1^C$ | −16.41° †/−9.23° * | −28.53°/−15.75° * | −46.76°/−24.45° * |
| DG2 ($M_T$ = 1) | | $d_2$ = 358.69 nm | |
| $\Theta_2^G$ | — | −16.4° (−12.85°)/ −9.23° (−7.26°) * | −1.8° (−1.63°)/ 1.03° (0.93°) * |
| $\Phi_2^G$ | — | 90°(75°) † | 90°(75°) † |
| $\Theta_2^C$ | — | 28.53°/15.75° * | 46.76°/24.45° * |

Table 2.1 illustrates practical parameters and calculated values for on-axis in-coupling in an embodiment in which d=358.69 nm, $M_R$*=1, and $M_T$*=1. Values indicated with a dagger (†) are input parameters. Other values are computed values based on described equations. Values indicated with an asterisk (*) correspond to the angles of incidence in a material of the waveguide.

In some embodiments, the desired symmetrical field of view is equal to $\Delta\theta_2$=30°. Some angles are overlapped to avoid the black bands for some colors. Such a system may achieve the desired field of view using just one waveguide. In embodiments in which the index of refraction of the waveguide is increased, it is possible to improve the uniformity of transmitted orders by choosing the angular ranges with more uniform distribution for each diffractive grating.

As shown in FIGS. 12A-12C, where we have schematically depicted a system using colors, as an input there is an RGB image with three colors that are superimposed. In FIGS. 12A-12C, the colors are shown separately in order emphasize the difference in behavior of each color. The schematics explain the angular space for each color (starting from blue color). For blue (FIG. 12A) and green (FIG. 12B) colors, the coupled portion of light corresponds to the first reflected order. For the red color (FIG. 12C), we show the portion of light coupled by this waveguide corresponding to the first reflected and first transmitted orders of the example metagrating.

Below we present results of numerical simulations for the metagrating (see FIGS. 15A-15C) with a high refractive index configures to in-couple the first reflective diffraction order and first transmissive diffraction order for TE polarization.

The presented data were obtained using the COMSOL Multiphysics software. The simulated system has been configured using $TiO_2$ as the material of the elements of DG1 and DG2 and sapphire ($Al_2O_3$) as the material of the substrate and stop layers. For the simulated embodiment, half of the elements of DG1 and DG2 are embedded in a homogeneous dielectric host medium with a refractive index $n_5$=$n'_5$. For example, the host medium may be $SiO_2$ material. The presented numerical simulations take into account the dispersion of materials, and the values of the refractive indexes of the mentioned materials for three different colors are presented in Table 2.2.

The presented numerical simulations take into account the dispersion of materials, and for three different colors we have the following values of the refractive indexes for the mentioned materials:

TABLE 2.2

| | I = 460 nm | I = 530 nm | I = 620 nm |
|---|---|---|---|
| Sapphire ($Al_2O_3$) | 1.7783 | 1.7719 | 1.7666 |
| $TiO_2$ | 2.7878 | 2.6702 | 2.5915 |
| AlAs | 3.4739 + i0.014210 | 3.2735 + i0.0042277 | 3.1396 + i0.0011544 |
| Si | 4.5766 + i0.12819 | 4.1602 + i0.052853 | 3.9058 + i0.021982 |
| $SiO_2$ | 1.4648 | 1.4608 | 1.4574 |

In the simulated example, the first reflective grating DG1 is configured for the blue color to in-couple the first order reflected by the full metagrating system having a period $d_1$ (see Table 2.1) and $TiO_2$ elements with $w_1$=$w_2$=80 nm; $h_1$=90 nm, $h_2$=80 nm. The second transmissive grating DG2 configured for the red color has a period $d_2$ (see Table 2.1) and $TiO_2$ elements with parameters $w_1$=$w_2$=120 nm; $h_1$=$h_2$=160 nm. This grating converts the portion of the red light transmitted by the first diffraction grating (0 transmitted order, $T_0$) into the first diffracted orders transmitted by full metagrating system which will be coupled by the waveguide. To increase the in-coupled field of view for the example configuration, DG2 may also be used to in-couple a portion of green color.

For the presented simulations the distance between the elements of gratings $h_a$ was equal to 170 nm and was filled by air.

Figure 15A:
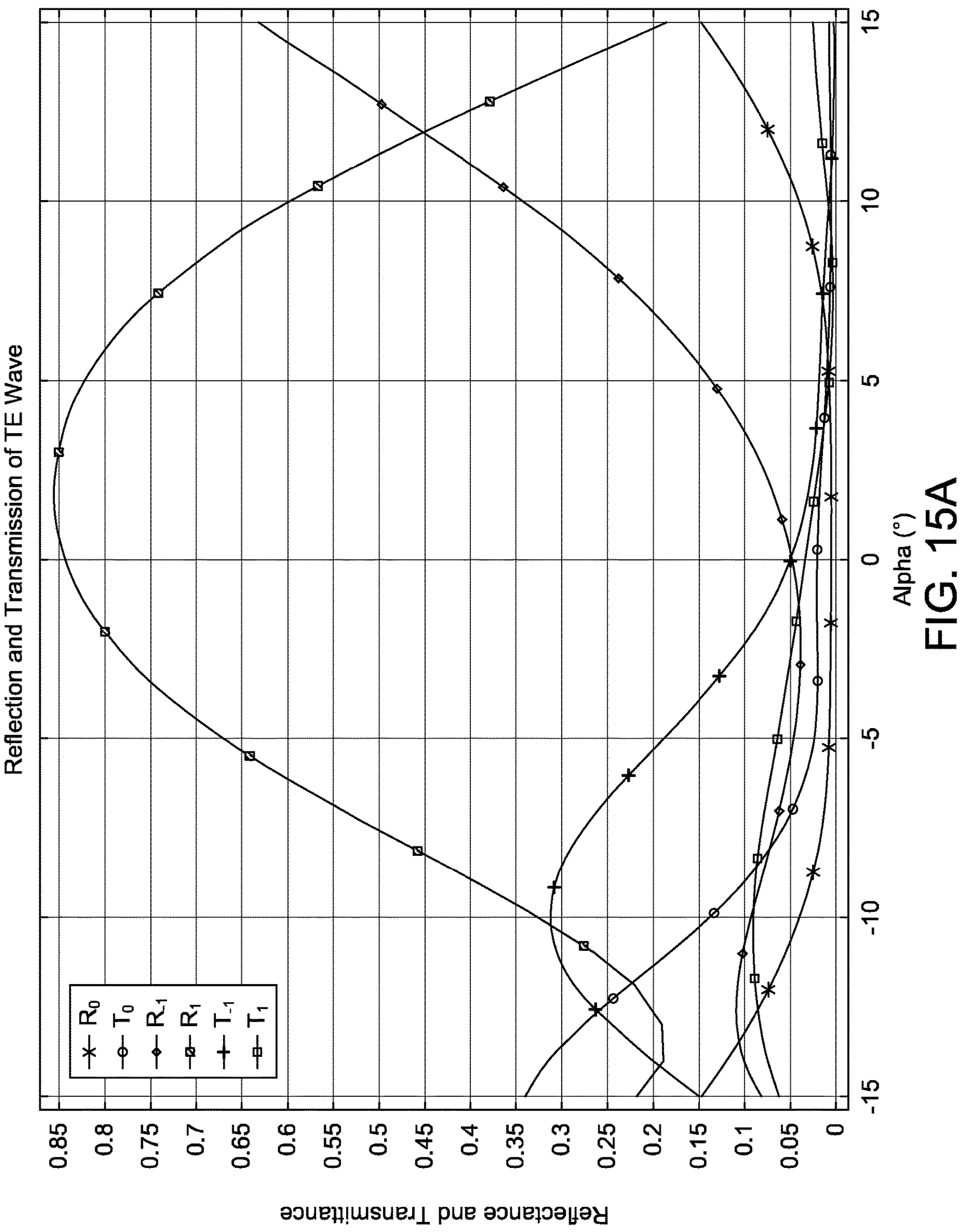
FIGS. 15A-15C illustrate diffraction performance of a $TiO_2$ metagrating (the unit cell is depicted in FIG. 13) with the following parameters: $w_1=w_2=80$ nm, $h_1=90$ nm, $h_2=80$ nm, $w'_1=w'_2=120$ nm, $h'_1=h'_2=160$ nm, $H'_{L2}=H_{L2}=5$ nm, $d'_r=30$ nm, $H_a=170$ nm.
Figure 15B:
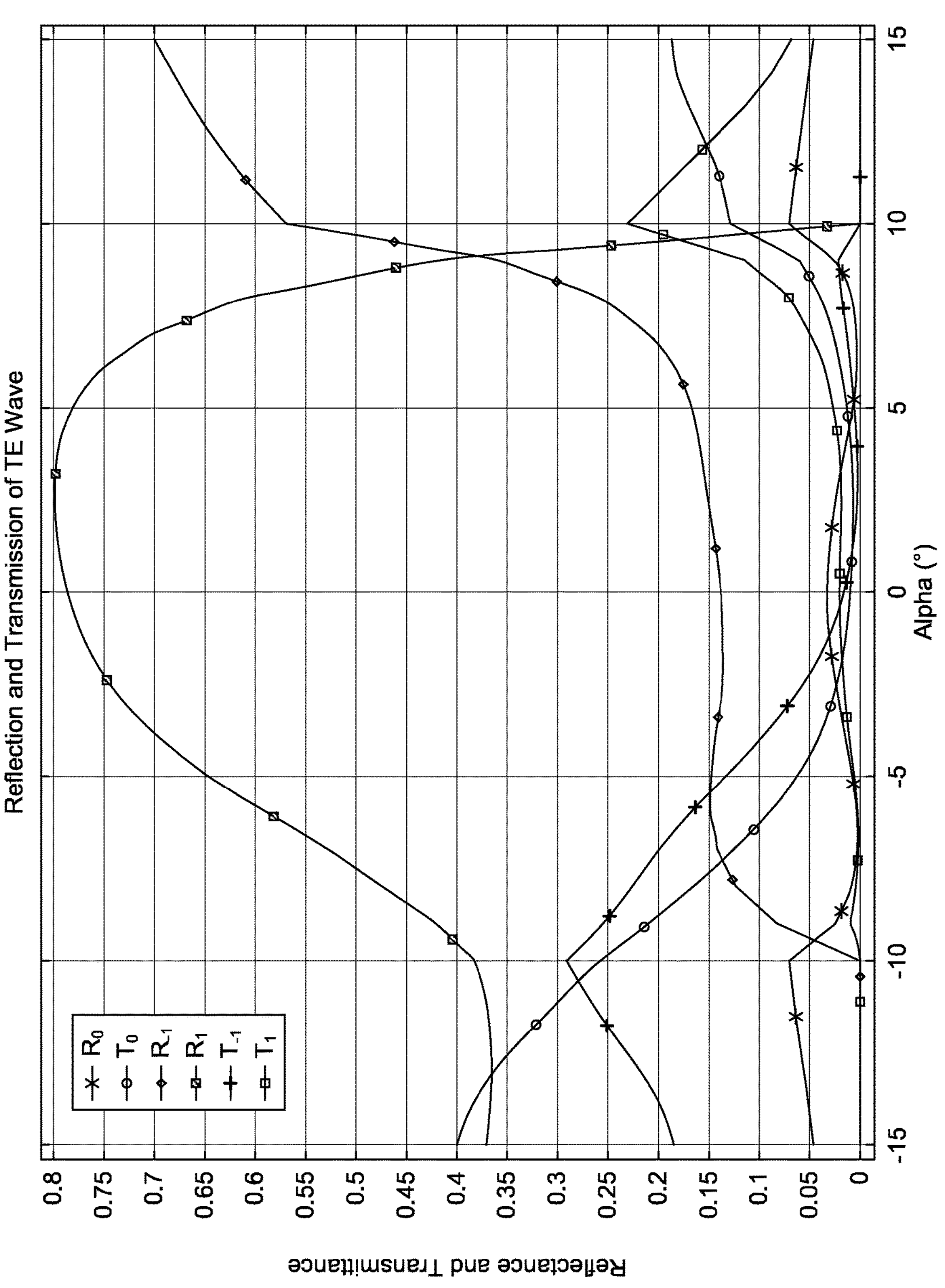
Figure 15C:
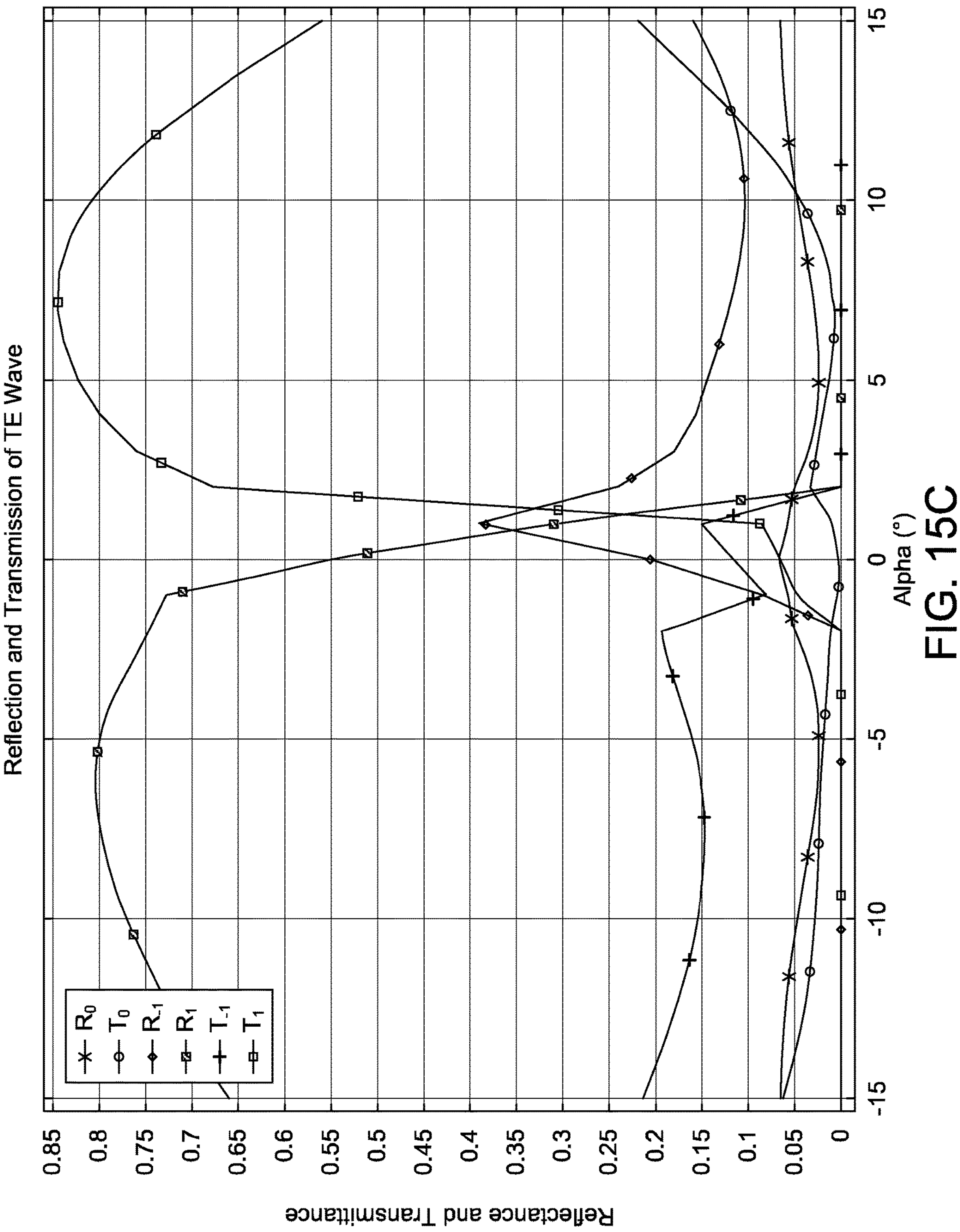

Note that the angle range presented in FIGS. 15A-15C corresponds to the incidence from the medium with refractive index $n_3$. Using Snell's law, one can calculate the range corresponding to the medium $n_1$.

FIGS. 15A-15C illustrate diffraction performance of a $TiO_2$ metagrating (the unit cell is depicted in FIG. 13) with the following parameters: $w_1=w_2=80$ nm, $h_1=90$ nm, $h_2=80$ nm, $w'_1=w'_2=120$ nm, $h'_1=h'_2=160$ nm, $H'_{L2}=H_{L2}=5$ nm, $d'_r=30$ nm, $H_a=170$ nm. FIG. 15A illustrates the performance with blue light (460 nm), FIG. 15B illustrates the performance with green light (530 nm), and FIG. 15C illustrates the performance with red light (620 nm). Sapphire is the material of a waveguide. The required angular ranges in-coupled by the system are shaded. The incidence angles correspond to the incidence from the medium with refractive index $n_3$.

To demonstrate use of example embodiments for off-axis in-coupling we present the set of numerical simulations for an example metagrating (see FIGS. 16A-16C) with high refractive index configured to in-couple the first reflective diffraction order and first transmissive diffraction order for TE polarization.

Table 2.3 shows some practical parameters and calculated values for off-axis in-coupling. In Table 2.3, input parameters of the proposed system are marked by a dagger (†). Other parameters may be calculated based on the input parameters. To determine the lower boundary for the angular range, the calculations assume that $$\Phi_1^G \approx \Phi_2^G \approx 90°.$$

Angles corresponding to $$\Phi_1^G \approx \Phi_2^G \approx 75°$$

are presented in brackets.

To calculate the periods for diffraction gratings configured to in-couple first diffraction order ($M_{1,2}=1$), Eqs. 2.5 and 2.7 may be used with the assumption that $\gamma_m=2°$, $\theta_m=-10°$, $\theta_M=20°$ ($\Delta\theta_2=30°$). Correspondingly for the system with the in-coupled $M_{1,2}=2$, the pitches of the gratings may be doubled.

TABLE 2.3

| | λ = 460 nm | λ = 530 nm | λ = 620 nm |
|---|---|---|---|
| DG1 ($M_R$ = 1) | | $d_1$ = 380.82 nm | |
| $\Theta_1{}^G$ | 33.51° (29.48°)/ 18.28° (16.24°) * | 21.61° (17.95°) †/ 12.08° (10.09°) * | 7.58° (4.13°)/ 4.3° (2.34°) * |
| $\Phi_1{}^G$ | 90°(75°) † | 90°(75°) † | 90°(75°) † |
| $\Theta_1{}^C$ | −12° †/−6.78° * | −23.06°/−12.9° * | −38.91°/−20.91° * |
| DG2 ($M_T$ = 1) | | $d_2$ = 380.82 nm | |
| $\Theta_2{}^G$ | — | −20.99° (−17.37°)/ −11.81° (−9.83°) | −7.58° (−4.13°)/ −4.3° (−2.34°) |
| $\Phi_2{}^G$ | — | 90°(75°) † | 90°(75°) † |
| $\Theta_2{}^C$ | — | 23.06°/12.9° | 38.91°/20.91° |

Table 2.3 illustrates parameters and calculated values for off-axis in-coupling for an embodiment in which d=380.82 nm, $M_R$*=1, and $M_T$*=1. Input parameters are marked with a dagger (†); other values are computed values based on the described equations. Values marked with an asterisk (*) correspond to the angles of incidence in a material of the waveguide.

Some angles may be overlapped to avoid the black bands for some colors. For blue and green colors the coupled portion of light corresponds to the first reflected order. For the red color we show the portion of light coupled by this waveguide corresponding to the first reflected and first transmitted orders of the example metagrating.

Example embodiments may be configured using the same materials as in the case presented above. In some embodiments, the first reflective grating DG1 configured for the blue color to in-couple the first order reflected by the full metagrating system has a period $d_1$ (see Table 2.3) and $TiO_2$ elements with $w_1=w_2=80$ nm; $h_1=80$ nm, $h_2=80$ nm. To increase the diffraction uniformity for the light reflected and transmitted through this grating, in this example, $d_r=-10$ nm.

In this example, the second transmissive grating DG2 configured for the red color has a period $d_2$ (see Table 2.3) and the following parameters of the $TiO_2$ elements: $w_1=w_2=140$ nm; $h_1=150$ nm, $h_2=170$ nm. This grating converts the portion of the red light transmitted by the first diffraction grating (0 transmitted order, $T_0$) into the first diffracted orders transmitted by the metagrating which will be coupled by the waveguide. To increase the in-coupled field of view for proposed configuration, DG2 may also be used to in-couple a portion of green color.

In some embodiments, to simplify the fabrication process and control the depth of an etching process, additional stop layers, e.g. with $H_{L2}=H'_{L2}=5$ nm, may be placed between the rows of the elements with high refractive index. In the simulated embodiment, we do not use the additional stop and phase modifying layers with refractive indexes $n_{L1}$, $n'_{L1}$, $n_{L3}$ and $n'_{L3}$ which additionally could improve the uniformity and effectiveness of the response. For the presented simulations the distance between the elements of gratings $H_a$ was equal to 200 nm and was filled by the air. Note that the angle range presented in FIGS. 16A-16C corresponds to the incidence from the medium with refractive index $n_3$.

Figure 16A:
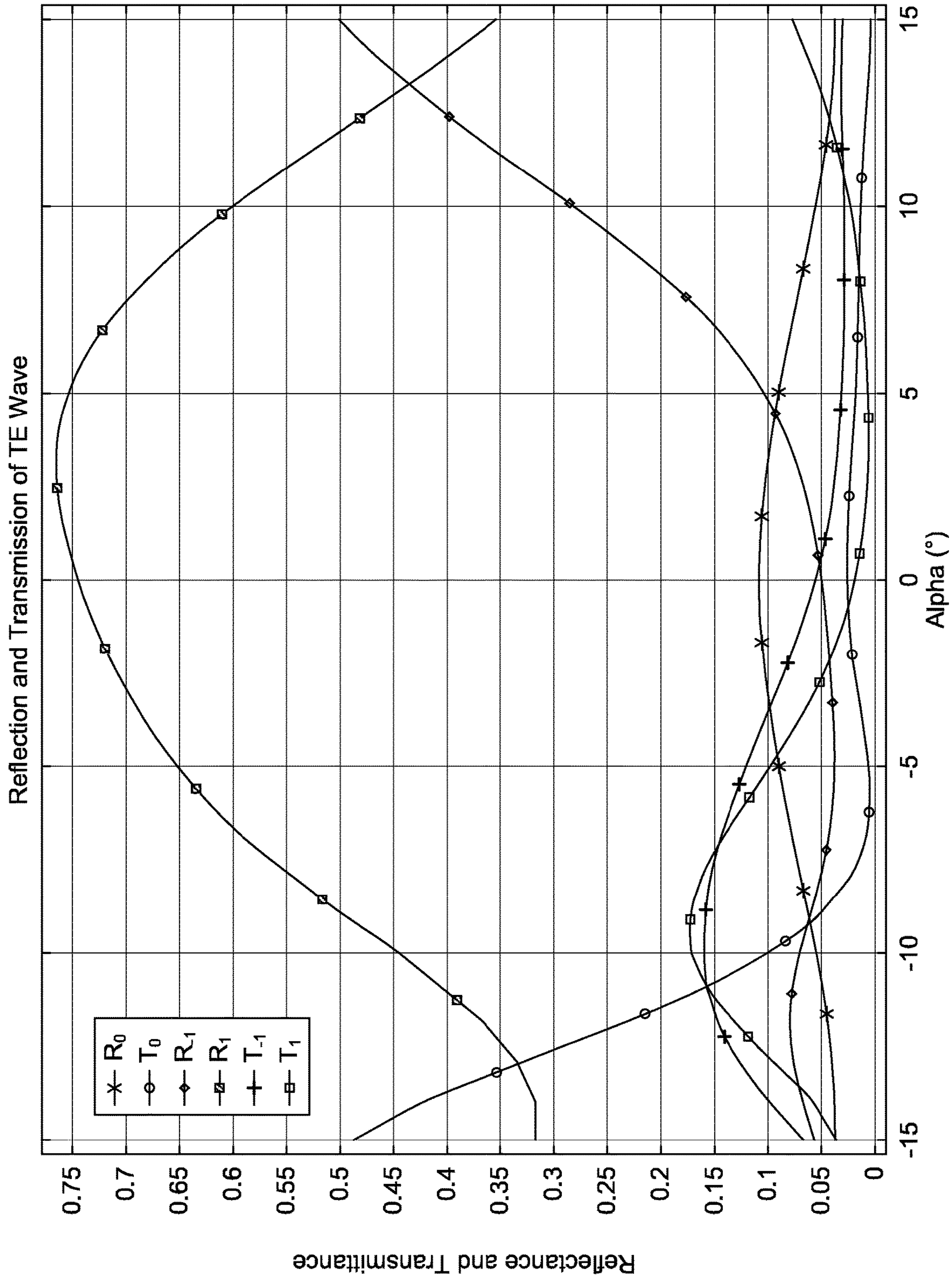
FIGS. 16A-16C illustrate diffraction performance of a $TiO_2$ metagrating (the unit cell is depicted in FIG. 13) with the following parameters: $w_1=w_2=80$ nm, $h_1=h_2=80$ nm, $w'_1=w'_2=140$ nm, $h'_1=150$ nm, $h'_2=170$ nm, $H'_{L2}=H_{L2}=5$ nm, $d_r=-10$ nm, $H_a=200$ nm.
Figure 16B:
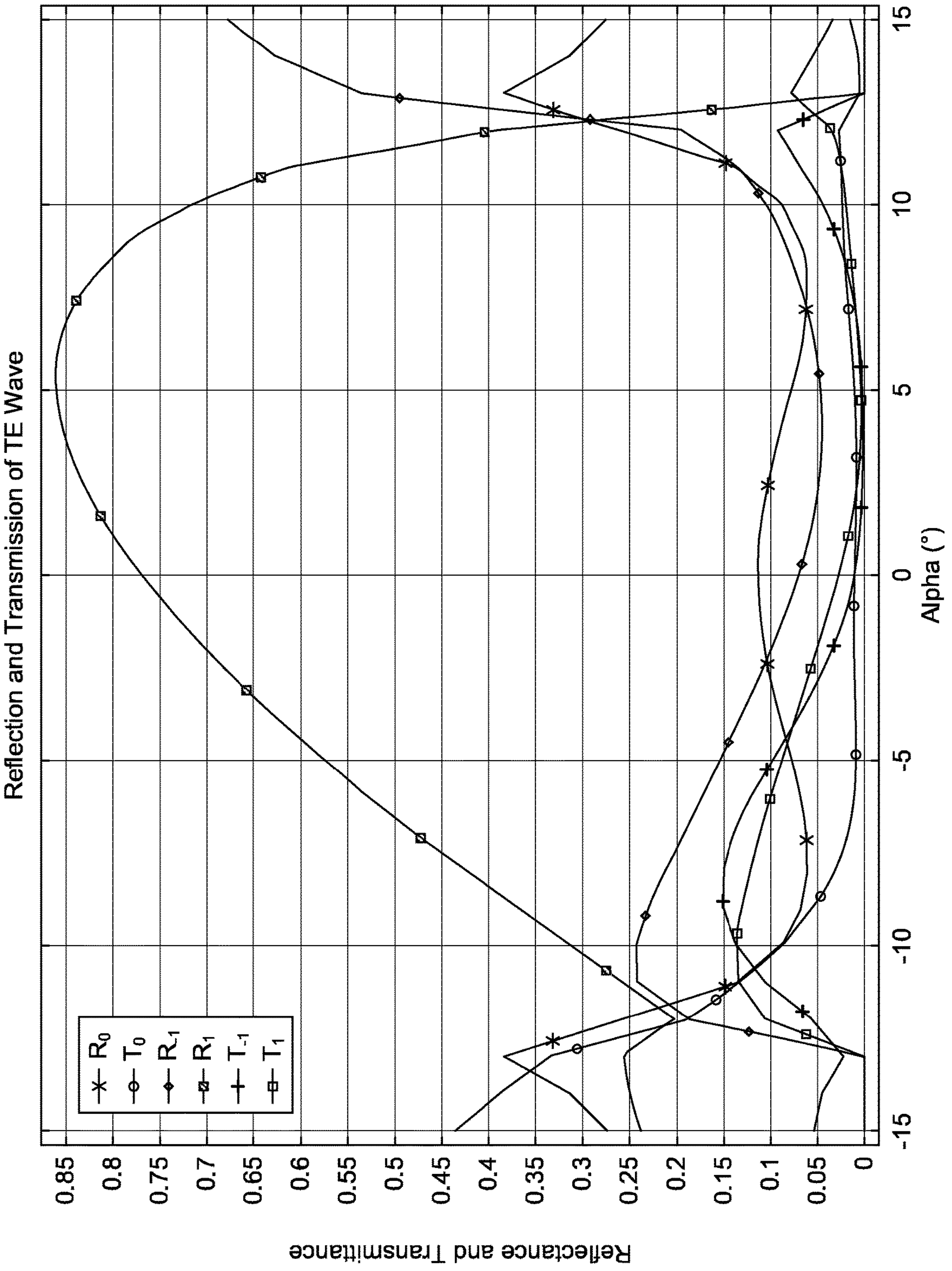
Figure 16C:
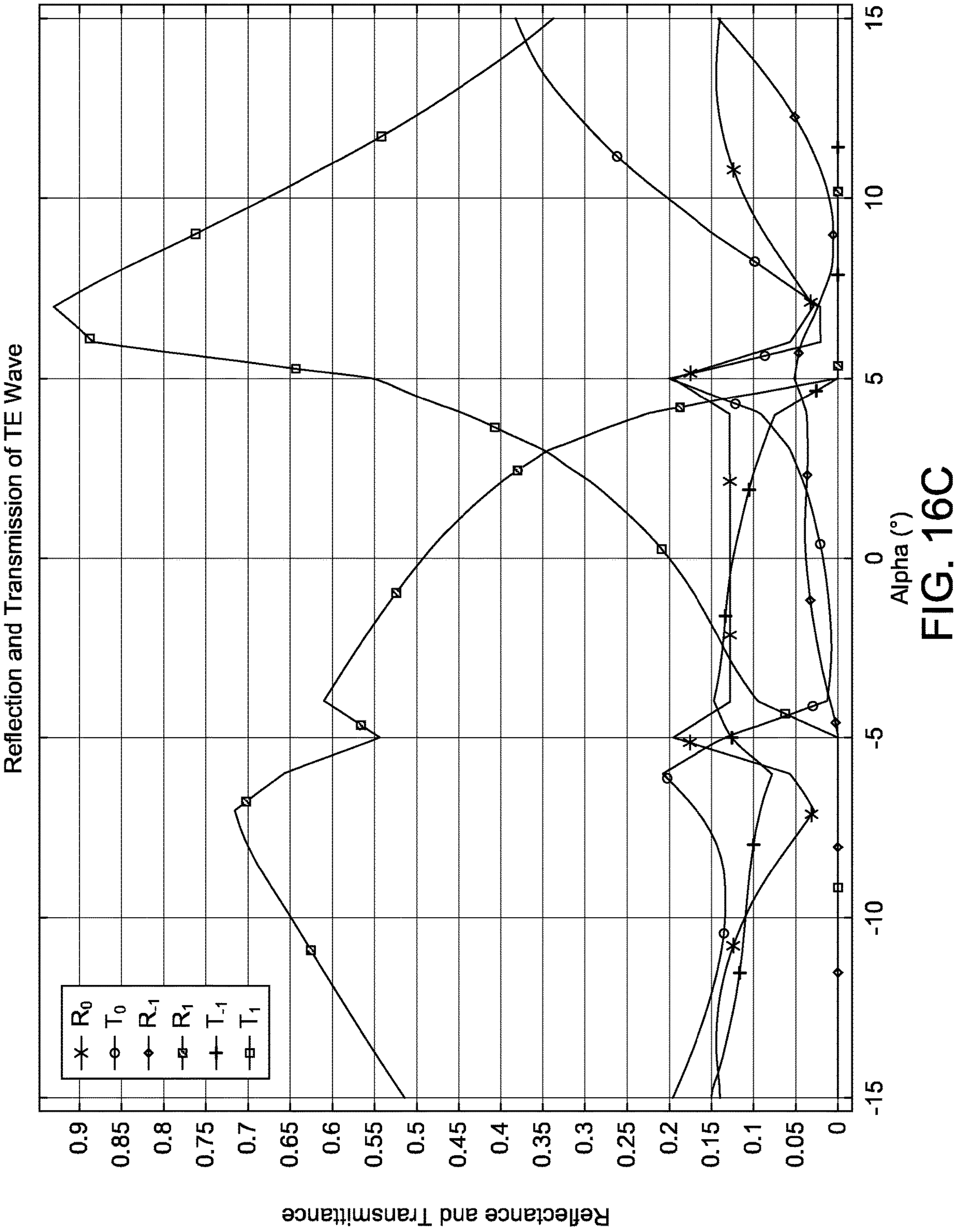

FIGS. 16A-16C illustrate diffraction performance of a $TiO_2$ metagrating (the unit cell is depicted in FIG. 13) with the following parameters: $w_1=w_2=80$ nm, $h_1=h_2=80$ nm, $w'_1=w'_2=140$ nm, $h'_1=150$ nm, $h'_2=170$ nm, $H'_{L2}=H_{L2}=5$ nm, $d_r=-10$ nm, $H_a=200$ nm. FIG. 16A illustrates performance with blue light (460 nm). FIG. 16B illustrates performance with green light (530 nm). FIG. 16C illustrates performance with red light (620 nm). Sapphire is the material of a waveguide. The desired angular ranges in-coupled by the system are between around −5° and around 11°. The incidence angles correspond to the incidence from the medium with refractive index $n_3$.

Figure 17A:
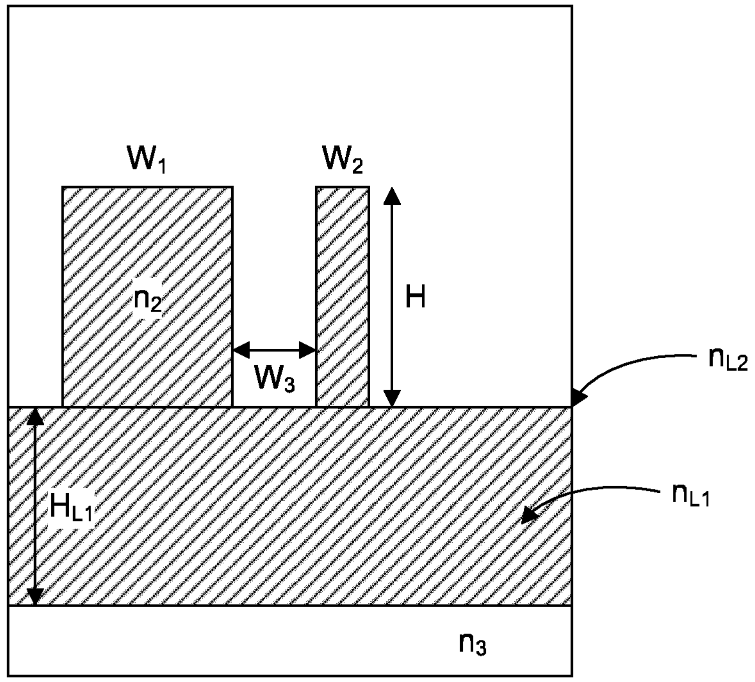
FIG. 17A is a cross-sectional view of an example binary transmissive grating unit cell.

Example embodiments may also combine different types of diffraction gratings with non-symmetrical response (for example, slanted, blazed, binary, multilevel, step-like and double-material gratings). Gratings may be selected with reference to goals of efficiency and uniformity. FIG. 17A illustrates an example of the binary transmissive grating unit cell with a phase modifying layer which may be used in some embodiments for the grating DG2. The computed reflectance and transmittance for TE incidence at λ=625 nm for a grating with the substrate with $n_3=1.7$ and with the period d=463 nm are plotted in FIG. 17B. This embodiment may be configured using $TiO_2$ as the material of the elements of the grating and phase modifying layer ($n_2=n_{L1}$). The maximal intensity for this case is equal to $h_{max}$=73%, and the diffraction uniformity for a 30° field of view is about 92.65%.

Figure 17B:
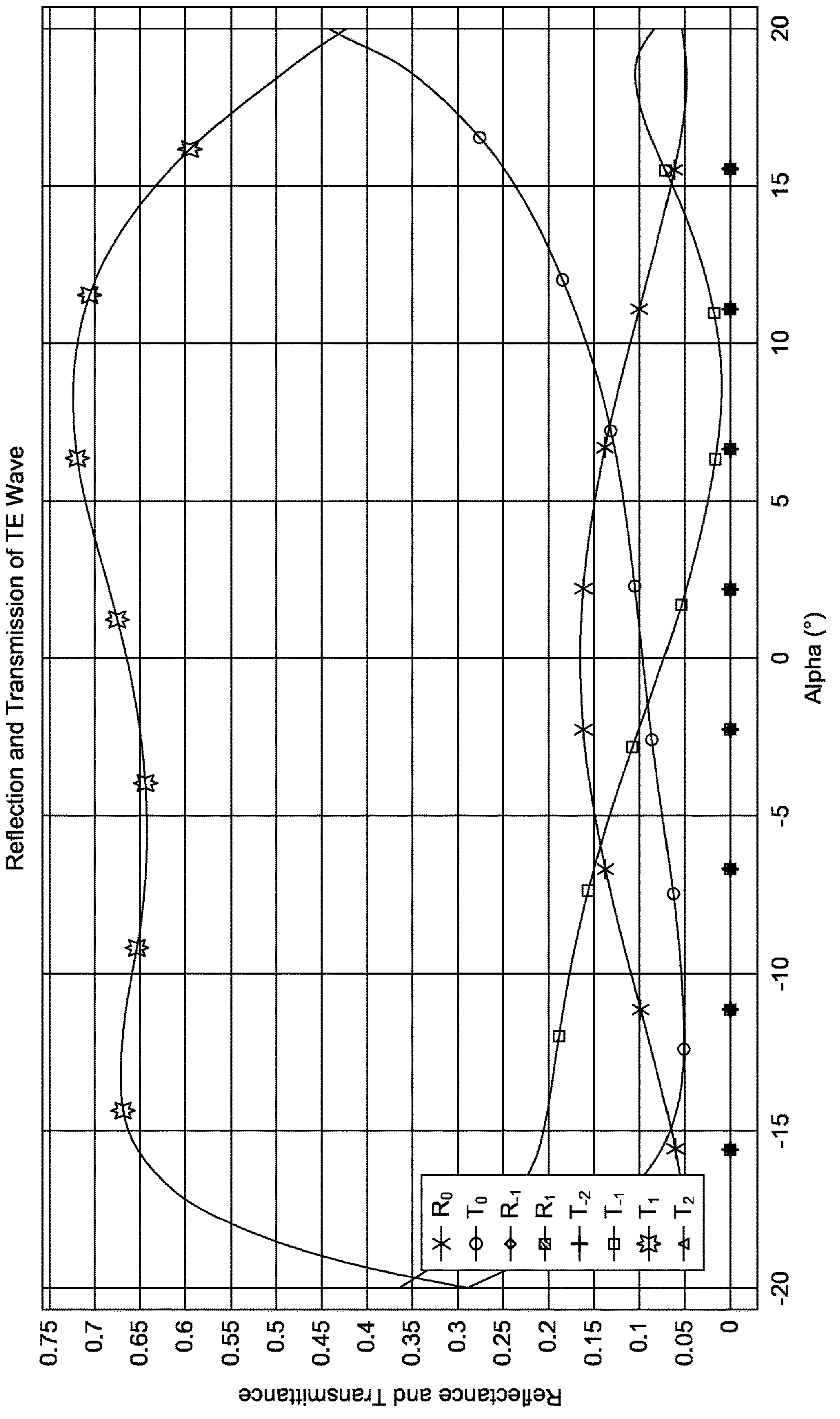
FIG. 17B illustrates reflectance and transmittance vs. angle of electromagnetic wave incidence ($\alpha$) at $\lambda=625$ nm, $n_1=1.0$, $n_2=n_{L1}=2.5884$, $n_3=1.7$, $n_{L2}=1.7663$ for $TiO_2$ transmissive grating using the unit cell of FIG. 17A with the following parameters: $w_1=140$ nm, $w_2=40$ nm, $w_2=80$ nm, $H=180$ nm, $H_{L1}=155$ nm, $H_{L2}=5$ nm.

FIG. 17A is a cross-sectional view of an example binary transmissive grating unit cell. FIG. 17B illustrates reflectance and transmittance vs. angle of electromagnetic wave incidence (α) at λ=625 nm, $n_1$=1.0, $n_2=n_{L1}$=2.5884, $n_3$=1.7, $n_{L2}$=1.7663 for $TiO_2$ transmissive grating using the unit cell of FIG. 17A with the following parameters: $w_1$=140 nm, $w_2$=40 nm, $w_2$=80 nm, H=180 nm, $H_{L1=155}$ nm, $H_{L2}$=5 nm.

Example embodiments use a substrate/waveguide with relatively high refractive index, e.g. a refractive index greater than 1.6. In some embodiments, it is desirable to use a waveguide substrate with a refractive index greater than about 1.67. The dimensions and refractive indices of diffractive elements may be selected to direct edge waves toward desired diffractive orders. A greater number of elements per unit cell may be used to couple light into the desired angular range.

Example embodiments allow the number of waveguides to be reduced to one for a single-mode in-coupler with a desired on-axis and off-axis field of view. To address this problem, some example embodiments use a metagrating system inside the waveguide which will combine the beams diffracted by the reflective grating on the top of metagrating system and transmissive diffraction gratings from the bottom of the system. The mutual positioning of the elements of two diffraction gratings in relation to one another inside the waveguide need not be controlled precisely. The mutual orientation of the elements of the gratings may be configured to in-couple all three colors into the waveguide.

Some embodiments provide a one-waveguide system with a metagrating inside the waveguide. The metagrating may include a transmissive grating and a reflective grating. The reflective grating may be configured to in-couple blue light and/or blue and green light. The transmissive grating may be configured to in-couple red light. Various embodiments may use different types of image generators, such as digital light processors (DLPs) or liquid crystal on silicon (LCOS) displays, among others. Example embodiments may be implemented with or without metallizing the bottom surface of the waveguide.

3. Embodiments with Single Mode Full Color Waveguide Combiner Using Asymmetric Transmissive and Reflective Diffraction Gratings Some embodiments provide an asymmetric topology of high refractive index material transmissive and reflective diffraction gratings. In example embodiments, the topology may increase the diffraction efficiency and diffraction uniformity of the grating. In some embodiments, the use of additional high refractive index thin layers and, in some embodiments, a stop layer between the substrate and elements of diffraction grating may additionally improve the diffraction uniformity of in-coupled light and may simplify the fabrication process.

In some embodiments, asymmetric gratings as described herein may be used in a full RGB single waveguide display system. Example display systems may be configured with a combination of transmissive and reflective asymmetrical gratings for a color single waveguide display. In some embodiments, the example configurations may provide a single waveguide in-coupler based on combination of different type of diffraction gratings providing non-symmetrical response (for example, slanted, blazed, binary, multilevel, step-like and double-material gratings).

A diffraction grating configured for high grating efficiency in a diffraction order other than the zero order can provide light deviation functions in the far-field zone. Example diffraction grating embodiments use double-material microlenses deviating and focusing the incident light in the near-field zone for the purpose of a targeted light distribution in the far-field zone.

Example embodiments provide diffractive components capable of deviating the focused beam in the near and far zone. Such a property to deviate light by single component may advantageously be used in diffraction gratings with non-symmetrical distribution of an intensity ($T_j \neq T_{-j}$, $R_j \neq R_{-j}$, . . . , where j is the diffraction order) leading to high grating efficiency for the desired diffraction order. In example embodiments using elements with widths below a wavelength in the corresponding medium, a strong input corresponds to the orders +1 or −1 for a wide range of incident angles covered in a desired field of view of the device. Some embodiments provide high diffraction uniformity and efficiency of first order diffraction.

Example embodiments further include single waveguide full-color display systems for single mode image propagation. Some such embodiments use the diffraction grating structures as described herein. Some embodiments may combine different types of diffraction gratings with non-symmetrical response.

Example embodiments provide diffractive elements to modulate the phase of diffracted waves. Some such embodiments use the input of edge waves generated inside the elements with higher refractive index and provide an additional wavefront rotation compares to the wavefront in the absence of the diffractive element. Some embodiments provide this functionality using elements with an asymmetrical geometry.

The present disclosure provides a diffraction grating for diffracting light comprising a plurality of grating unit cells with asymmetrical elements. Example embodiments include both transmissive and reflective diffraction gratings.

Some embodiments have been validated numerically via full-wave electromagnetic analysis of a one-dimensional (1D) diffraction grating using high refractive index materials for the elements of diffraction grating and taking into account the losses. In example embodiments, the non-symmetrical shape of the grating may provide for non-symmetrical distribution of an intensity leading to high grating efficiency for the desired diffraction order. In the case of elements with $w_{1,2}<\lambda$ $W\leq\lambda$ the maximal input may correspond to the orders ±1. Transmissive and reflective gratings with optical elements as described herein can demonstrate very high diffraction uniformity for the first diffractive order in a desired field of view of the device.

Example embodiments provide single waveguide full-color system for single mode image propagation for in-coupling light into the optical device using asymmetrical diffraction grating. Such embodiments may provide high efficiency and high diffraction uniformity for in-coupled light.

Figure 18B:
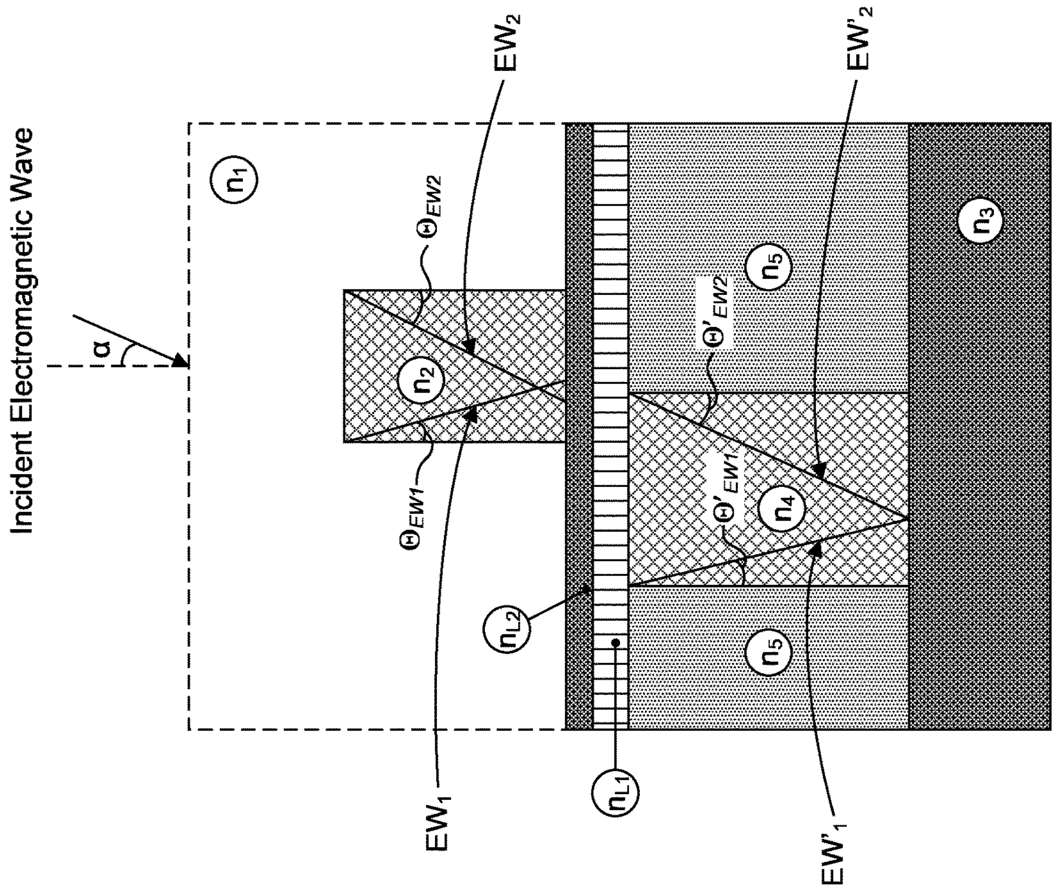
FIGS. 18A-B are cross-sectional views of example transmissive grating unit cells according to some embodiments.
Figure 18A:
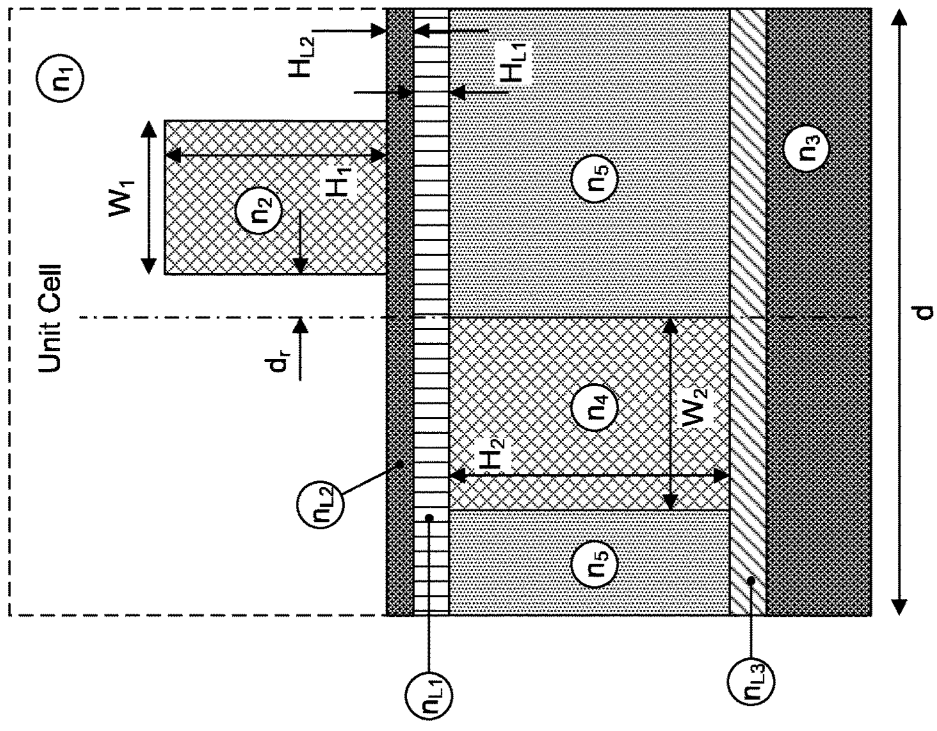

An topology of an asymmetrical element of a diffraction grating unit cell according to some embodiments is illustrated in FIGS. 18A-18B. This cross-sectional view may correspond to the high refractive index ($n_2$ and $n_4$, where $n_2$ could be equal to $n_4$) elements on the top of homogeneous dielectric plate with a refractive index $n_3$ ($n_{2,4}>n_3$), $w_1$ and $h_1$ are width and height of the high refractive index elements outside the substrate in host medium with refractive index $n_1$, $w_2$ and $h_2$ are width and height of the high refractive index elements inside the layer with the refractive index $n_5$ ($n_1$<$n_5$<$n_3$). Parameter $d_r$ describes the mutual position (e.g. the lateral offset) of the elements in the top layer and the bottom layer of the diffraction grating. It corresponds to the distance between the right vertical edge of the bottom element and left vertical edge of the top element. For negative values of $d_r$, the top element is shifted toward the left with respect to the vertical line corresponding to the position of the right vertical edge of the bottom element. For positive values of $d_r$, the top element is shifted toward the right. The period of the diffraction grating is represented by d.

In some use cases, a linearly polarized plane wave illuminates the grating from the top in a plane perpendicular to the grating. In example embodiments, structures are provided with vertical edges parallel to the z-axis and top/bottom surfaces parallel to the xy-plane, which corresponds to a base angle of 90°. In some embodiments, prismatic structures (with base angles other than 90°) can also be used. Variation of the base angle value provides additional degree of freedom in the control of edge wave radiation. To improve the uniformity of transmitted diffraction order and additionally increase the transmittivity of in-coupled diffraction order, some embodiments use a phase modifying layer with thickness $H_{L1}$ and refractive index $n_{L1}$ placed between the high refractive index elements on the top of the layer with refractive index $n_5$ and embedded element with refractive index $n_4$. The utilization of an additional high refractive index layer between the top and bottom elements of diffraction grating modifies the phase of refracted edge wave providing higher transmissivity of an in-coupled order. To simplify the fabrication process, some embodiments include a stop layer between this thin layer and top element of the grating. $n_{L2}$ is the stop layer material refractive index and $H_{L2}$ is the thickness of this layer. To control the etching depth of material with refractive index $n_5$, some embodiments also use a second stop layer with refractive index $n_{L3}$ ($n_{L3}$ could be equal to $n_{L2}$) and the thickness of this layer $H_{L3}$.

The non-symmetrical topology used in some embodiments provides the generation of edge waves, originating from the edges of the system, contributing to the formation of a final wavefront deflected from the direction of refracted wave. The focusing function is schematically represented in FIG. 18B. The characteristics of the generated edge waves and nanojet beams, obtained due to the interference of the edge wave with the refracted plane wave, are affected by the parameters of the corresponding parts of the non-symmetrical system, such as refractive index ratios between the dielectric materials forming the system, dimensions of the elements with higher refractive index, and angle of incidence of an incident wave.

FIGS. 18A-18B are cross-sectional views of example transmissive grating unit cells.

As was described in A. Boriskin, V. Drazic, R. Keating, M. Damghanian, O. Shramkova, L. Blondé, "*Near field focusing by edge diffraction,*" *Opt. Lett.*, 2018, the beam-forming phenomenon is associated with the edge of the system and the nanojet beam radiation angle is linked to Snell's law. So, for the normal incidence of an incident wave, the nanojet beam radiation angle for the vertical edges of the top element of the unit cell can be determined as a function of the ratio between the refractive indexes of the media hosting the element ($n_1$) and material of the element of diffraction grating ($n_2$), and the base angle of the element (in our case we analyse the elements with the vertical edges, the base angle is equal to 90°). For the first element with refractive index $n_2$ the NJ beam radiation angle can be determined using the approximate formula:

$$\Theta_B \approx \frac{90° - \Theta_{TIR}}{2}, \tag{3.1}$$

where $$\Theta_{TIR} = \sin^{-1}\left(\frac{n_1}{n_2}\right)$$

is the critical angle of refraction. For an example embodiment, two opposite edges of the element on the top of the substrate with the width $w_1$ and height $h_1$ will generate two nanojets (the nanojets are similar in the case of normal incidence). The creation of a nanojet beam is the result of constructive interference between the edge wave diffracted by the vertical edge and refracted plane wave. Two edge waves (EW1 and EW2) propagate inside the element with the angle of deviation equal to $\Theta_{EW}=\Theta_{EW1}=\Theta_{EW2}\approx 2\Theta_B$ (see FIG. 18B). The nanojet length and intensity depend on the size of an element, as described in B. Varghese, O. Shramkova, V. Drazic, V. Allié, L. Blondé, "*Influence of an edge height on the diffracted EM field distribution,*" *ICTON* 2019, Angers, France, and on the refractive index ratio $$\frac{n_1}{n_2}.$$

Decreasing the index ratio (correspondingly increasing refractive index $n_2$) may be used to increase the edge wave intensity. Changing the size of the elements and/or angle of electromagnetic wave incidence may result in an internal reflection of the edge wave by the walls inside the elements. Taking into account the angle of edge wave propagation, it may be determined that for high refractive index $n_2$ there is total internal reflection by the walls, allowing the edge wave intensity to be concentrated inside the element. This effect may enhance scattering intensity in a forward direction for the high refractive index elements.

In the case of inclined incidence, the angle of edge wave propagation will be different for two opposite edges:

$$\Theta_{EW1} \approx 2\Theta_{B1} \approx 90° - \theta_{TIR} + \alpha, \tag{3.2}$$
$$\Theta_{EW2} \approx 2\Theta_{B2} \approx 90° - \theta_{TIR} - \alpha,$$

Where $\alpha$ is the angle of electromagnetic wave incidence.

Depending on the angle of electromagnetic wave incidence, the edge waves generated by the first element of an example diffraction grating will partially penetrate into the second element or will be scattered by this element. For the normal incidence, the nanojet beam radiation angle for the vertical edges of the second element of the unit cell can be determined as a function of the ratio between the refractive indexes $n_5$ and material of the element of diffraction grating $n_4$, and the base angle of the element. In an embodiment where the base angle is equal to 90° and for the element with refractive index $n_4$, the nanojet beam radiation angle can be determined using the approximate formula:

$$\Theta'_B \approx \frac{90° - \Theta'_{TIR}}{2}, \quad (3.3)$$

where $$\Theta'_{TIR} = \sin^{-1}\left(\frac{n_5}{n_4}\right)$$

is the critical angle of refraction. In example embodiments, two opposite edges of the second element with the width $w_2$ and height $h_2$ will also generate two nanojets. Finally, two additional edge waves (EW'1 and EW'2) will propagate inside the element with the angle of deviation equal to $\Theta'_{EW}=\Theta'_{EW1}=\Theta'_{EW2}\approx 2\Theta'_B$ (see FIG. 18B). If $n_4=n_2$, the index ratio will be higher than for the first element and correspondingly the intensity of the edge waves generated by this element will be lower. Taking into account the angle of edge wave propagation and refractive indexes of the second element and of the medium hosting this element, we can conclude that for $n_4=n_2$ and relatively high refractive index $n_5$ these edge waves may be partially reflected by the walls of the elements.

In the case of inclined incidence, the angle of edge wave propagation in the second element will be different for the two opposite edges:

$$\Theta'_{EW1} \approx 2\Theta'_{B1} \approx 90° - \theta'_{TIR} + \alpha, \quad (3.4)$$
$$\Theta'_{EW2} \approx 2\Theta'_{B2} \approx 90° - \theta'_{TIR} - \alpha.$$

Such a combination of the nanojet beams, produced near the surface of the waveguide in each unit cell of the grating can efficiently steer incoming light with a substantially uniform efficiency over a wide range of incidence angles.

The input from the edge diffraction phenomenon in the single element of the period into the total response of the diffraction grating can be estimated as follows. The data presented below were obtained using the COMSOL Multiphysics software. The presented analysis of the fields and power distributions inside the so-called elements of the gratings helps us to explain the physics of the phenomenon and to select topologies. The simulated system is illuminated by a linearly-polarized plane wave E={0,1,0}. Below is analysed the field distribution inside single isolated asymmetric element. The material of constitutive parts was chosen to get a good correlation between the diffracted angle inside the waveguide material for the periodic grating with symmetrical field of view at normal incidence and angle $\Theta_B$. $TiO_2$ is used as the material of both elements with refractive indexes $n_2$ and $n_4$.

In some embodiments, the second element is embedded into the $SiO_2$ material ($n_5$ is the refractive index of $SiO_2$). In some embodiments, $n_3=1.7$. As the result we get that $\Theta_B=33.6°$ and at the material with refractive index $n_3$ the angle of nanojet deviation will be equal to 57.5°. Correspondingly $\Theta'_B=27.87°$, and at the material with refractive index $n_3$, the angle of NJ deviation will be equal to 45.38°. For the diffraction grating with d=463 nm at $\alpha=0°$ and $\lambda=625$ nm the corresponding diffracted angle will be equal to 52.57°. So, for the normal incidence, the value of the diffracted angle is the value between the angles of deviation of generated nanojets. Analysing the field distribution inside the single element we can conclude that such asymmetrical topology of the element of the unit cell and proper combination of the materials of constitutive parts will provide the concentration of the power inside the lower element. This power redistribution will affect the phase of scattered wave.

In some embodiments of the unit cell of FIG. 18A, the following parameters may be used: $\lambda=625$ nm, $n_1=1.0$, $n_2=n_4=n_{L1}=2.5884$, $n_3=1.7$, $n_{L2}=1.7663$, $n_5=1.4572$, $w_1=60$ nm, $w_2=120$ nm, $h_1=170$ nm, $h_2=130$ nm, $H_{L3}=0$ nm, $d'_r=-5$ nm, $H_{L1}=H_{L2}=5$ nm.

In some embodiments, the height of the elements of the diffraction grating may be selected as:

$$h_{1,2} < \eta_{1,2}\frac{w_{1,2}\gamma_{1,2}}{2}, \quad (3.5)$$

where $$\gamma_1 = \frac{1}{\tan\Theta_B},\ \gamma_2 = \frac{1}{\tan\Theta'_B}$$

and $\eta_{1,2}$ is an odd number. For $\eta_{1,2}=1$ in a case of normal incidence, generated nanojet beams will not be reflected by the walls of the elements. For $\eta_{1,2}>1$ there is multiple reflection of the nanojet beams by the walls of the elements.

Using these elements to create the diffraction gratings, it is desirable to select the dimensions of the elements to increase the diffraction uniformity for inclined incidence of electromagnetic wave. For the inclined incidence, the angles of deviation of $EW_1$ and $EW_2$ will not be equal and depending on the angle of incidence we can get multiple edge wave reflections by the edges of the element.

Consider the performance of a diffraction grating based on the asymmetric high refractive index material elements according to embodiments described herein. The following calculations consider a case where a linearly polarized plane wave is incident on the grating from the top in a plane perpendicular to the grating. The angles of the beams diffracted in the far field are determined by the period of the grating, wavelength of the incident plane wave and angle of wave incidence and refraction indexes. The angles can be calculated according to the grating equation. Generated edge waves can make a complimentary input into the total response of the periodic array in the case where the generated edge wave has a proper phase and direction, contributing to the formation of a final wavefront deflected from the direction of refracted wave.

The performance of the grating is affected by the polarization of the incident wave and parameters (dimensions, form and material) of the elements. Example diffraction gratings containing asymmetrical elements achieve an asymmetrical distribution of diffracted light intensity. For the simulated case we assume that the first diffraction order is in-coupled into the waveguide. So, it is desirable for the maximal input for a single mode system to correspond to the diffractive order +1.

Figure 19A:
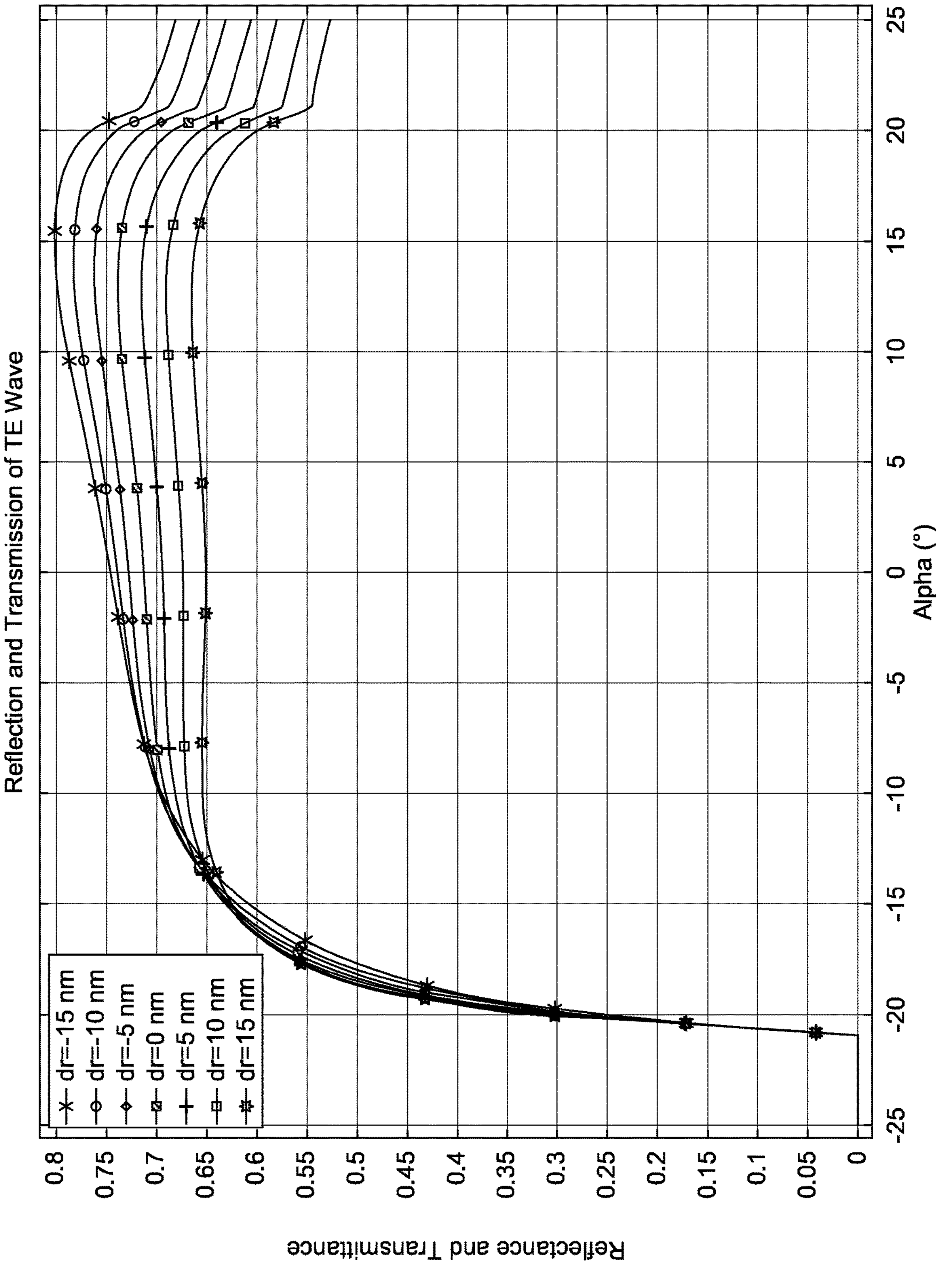
FIGS. 19A-19B illustrate an example of grating performance vs. angle of electromagnetic wave incidence using a unit cell depicted in FIG. 18A.
Figure 19B:
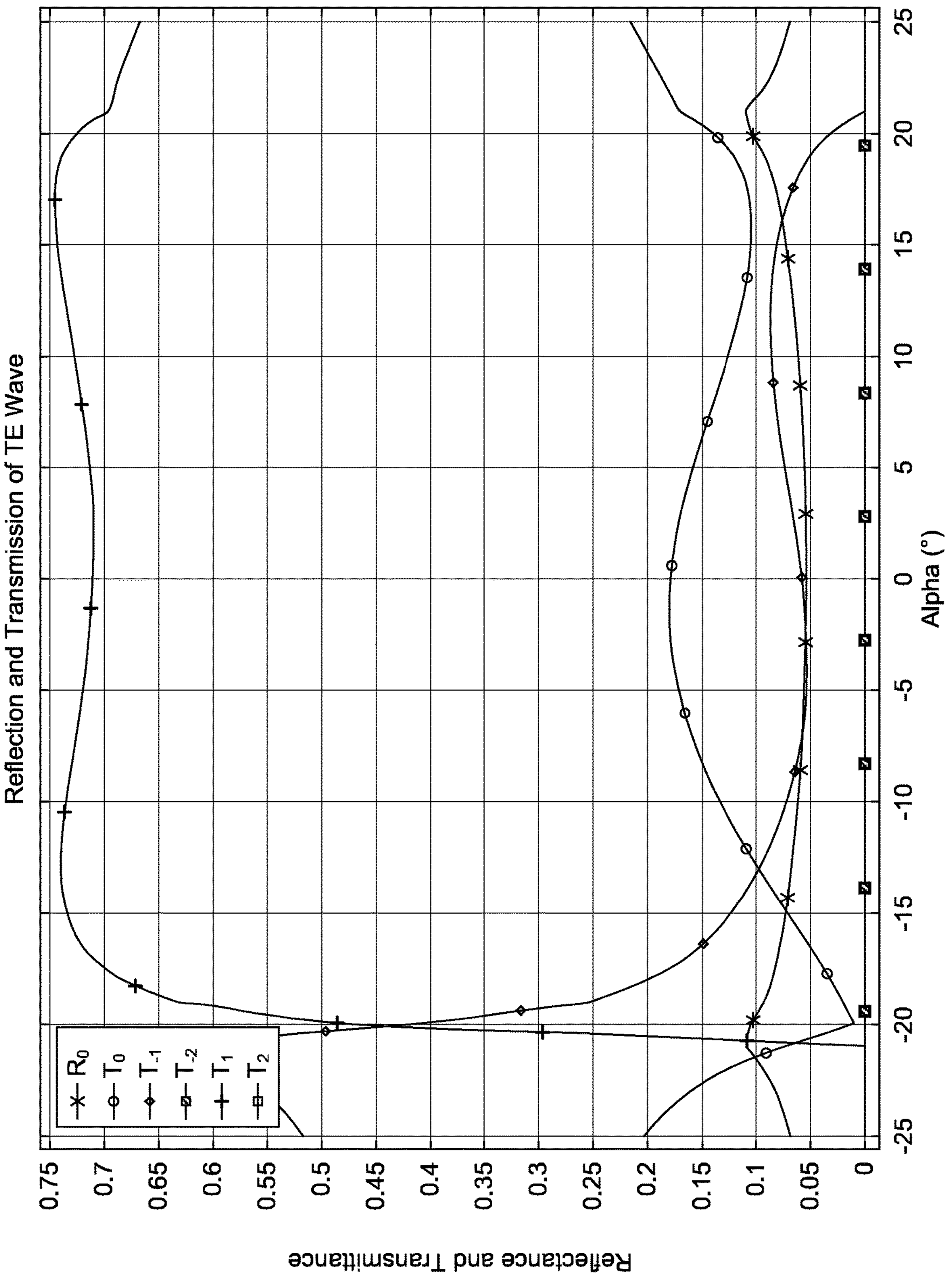

The computed reflectance and transmittance for TE incidence are plotted in FIGS. 19A-19B. FIG. 19A illustrates the transmittance for the order +1 ($T_1$) at $\lambda=625$ nm for a grating with the substrate with $n_3=1.7$ and with the period d=463 nm. This embodiment uses $TiO_2$ as the material of the elements of the grating and phase modifying layer and $SiO_2$ as the host medium for the second embedded element of the grating. $Al_2O_3$ is used as the material of the stop layer. The full-wave electromagnetic analysis was done for a one-dimensional periodic array of the elements. We assume that the system is infinite in X- and Y-directions. It can be seen, that such high refractive index material diffraction grating has very high intensity for transmitted first order.

To demonstrate the effect of the elements' alignment in the grating we present the dependencies for seven values of parameter $d_r$. It can be seen that changing the distance $d_r$ results in changes to the transmittivity and diffraction uniformity of the transmitted light. The computed reflectance and transmittance for TE incidence are plotted in FIG. 19B. FIG. 19B illustrates reflectance for 0-order and transmittance for 0 and ±1 orders at λ=625 nm for a grating with the stop and phase modifying layers. It can be seen that embodiments using these layers can additionally improve transmittivity $T_1$ and diffraction uniformity. The maximal intensity for this case presented in FIG. 19B for λ=625 nm is equal to $\eta_{max}$=75%. In order to give a measure for the homogeneity of the diffraction efficiency for all angles of incidence in-coupled into the waveguide, the diffraction uniformity may be represented as:

$$G = 1 - \frac{\eta_{max} - \eta_{min}}{\eta_{max} + \eta_{min}}. \tag{3.6}$$

For the asymmetric high refractive index material diffraction grating with reflectance/transmittance presented in FIG. 19B over a wide angular range (38°) the diffraction uniformity is about 97.3%.

FIGS. 19A-19B illustrate grating performance vs. angle of electromagnetic wave incidence (α) at λ=625 nm, $n_1$=1.0, $n_2$=$n_4$=$n_{L1}$=2.5884, $n_3$=1.7, $n_{L2}$=1.7663, $n_5$=1.4572 for $TiO_2$ transmissive grating with the parameters: $w_1$=60 nm, $w_2$=120 nm, $h_1$=170 nm, $h_2$=130 nm, $H_{L3}$=0 nm, using a unit cell a depicted in FIG. 18A. FIG. 19A illustrates transmittance of order +1 at different values of $d_r$, with $H_{L1}$=$H_{L2}$=0 nm. FIG. 19B illustrates reflectance and transmittance of different orders, with $d_r$=−5 nm, $H_{L1}$=$H_{L2}$=5 nm.

The diffraction grating with asymmetric elements according to example embodiments at different angles of incidence provides wavefront rotation due to the phase modification provided by the single element. In some embodiments, an example diffraction grating uses the following parameters: λ=625 nm, $n_1$=1.0, $n_2$=$n_4$=$n_{L1}$=2.5884, $n_3$=1.7, $n_{L2}$=1.7663, $n_5$=1.4572, $w_1$=60 nm, $w_2$=120 nm, $h_1$=170 nm, $h_2$=130 nm, $H_{L3}$=0 nm, $d'_r$=−5 nm, $H_{L1}$=$H_{L2}$=5 nm for the unit cell of the diffraction grating.

Figure 20A:
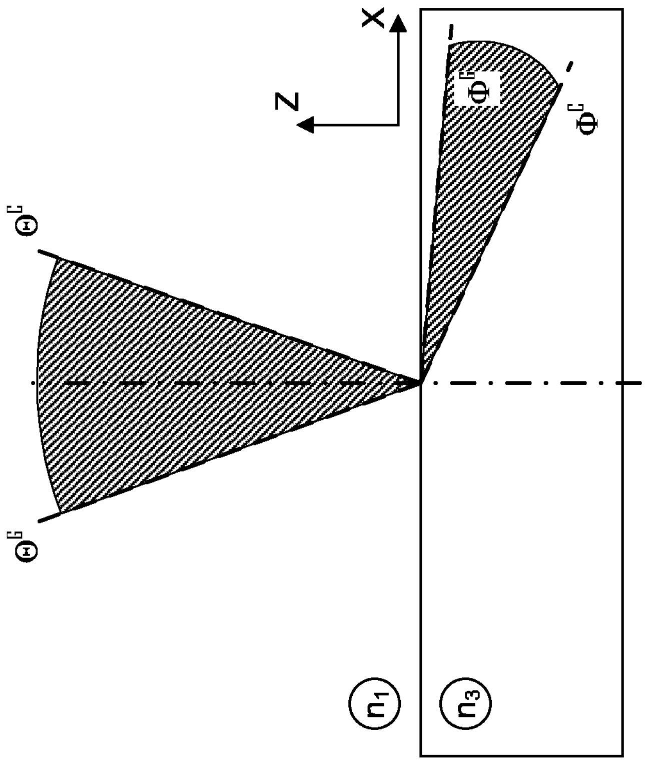
FIGS. 20A-20B illustrate schematic side views of a waveguide in-coupling system illustrating angles of incident and diffracted light for transmissive (FIG. 20A) and reflective (FIG. 20B) diffraction gratings.
Figure 20B:
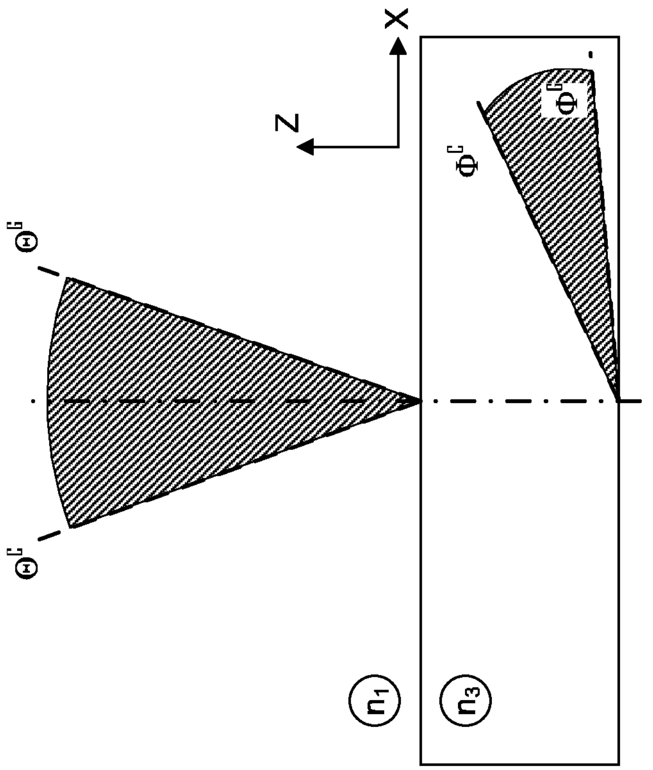

FIGS. 20A-20B illustrate schematic side views of a waveguide in-coupling system illustrating angles of incident and diffracted light for transmissive (FIG. 20A) and reflective (FIG. 20B) diffraction gratings. Angles whose name begins with the letter θ are located in the air. Angles whose name begins with ϕ are located in the waveguides and measure the angle of rays that have been diffracted. C is a critical ray, either in air or in the waveguide, G is a grazing ray.

In some embodiments, such a system operates to in-couple three different colors using single-mode transmissive diffraction gratings as described herein. FIG. 20A demonstrates the functionality of an example transmissive diffraction grating. The angular range [$\theta^G$; $\theta^C$] diffracts inside the waveguide into the angular range [$\phi^C$; $\phi^G$]. Passing through the transmissive diffraction grating into the waveguide, the total angular range corresponding to FoV of a device will propagate toward the right into the waveguide. (To get an opposite-side propagation inside the waveguide, it is desirable to use a grating with the opposite orientation of the asymmetric elements.) An incident image inside the waveguide will be mainly transferred into the positive transmitted diffraction order (first or second depending on the topology of the system). An incident image with the angles of incidence below $\theta^G$ will transmit through the diffraction grating (corresponding to the 0 transmitted order $T_0$). To be able to in-couple this portion of transmitted image by the next diffraction grating, it is desirable for the efficiency of this transmitted light to be high.

To in-couple several colors into the waveguide the grating may be initially configured for the blue color. At the wavelength corresponding to the green color we will observe the shift of an angular distribution toward the higher angles of incidence. Similar functionality with an additional shift toward the higher angles will be observed at a wavelength corresponding to the red color.

Below is a set of numerical simulations for the diffraction grating with high refractive index configured for blue color for TE polarization (see FIGS. 21A-21C). The same combination of the materials is used as for the simulations of FIGS. 19A-19B.

The presented numerical simulations take into account the dispersion of materials, and for three different colors, there are the following values of the refractive indexes for the mentioned materials:

| | λ = 460 nm | λ = 530 nm | λ = 620 nm |
|---|---|---|---|
| Sapphire ($Al_2O_3$) | 1.7783 | 1.7719 | 1.7666 |
| $TiO_2$ | 2.7878 | 2.6702 | 2.5915 |
| AlAs | 3.4739 + i0.014210 | 3.2735 + i0.0042277 | 3.1396 + i0.0011544 |
| Si | 4.5766 + i0.12819 | 4.1602 + i0.052853 | 3.9058 + i0.021982 |
| $SiO_2$ | 1.4648 | 1.4608 | 1.4574 |

In an example embodiment, a grating is configured for the blue color to couple +1st order using a pitch size of d=340.74 nm and elements with $w_1$=50 nm; $h_1$=110 nm; $w_2$=60 nm; $h_2$=55 nm, $d_r$=−15 nm; $H_{L1}$=10 nm; $H_{L2}$=5 nm; $H_{L3}$=0 nm.

Figure 21A:
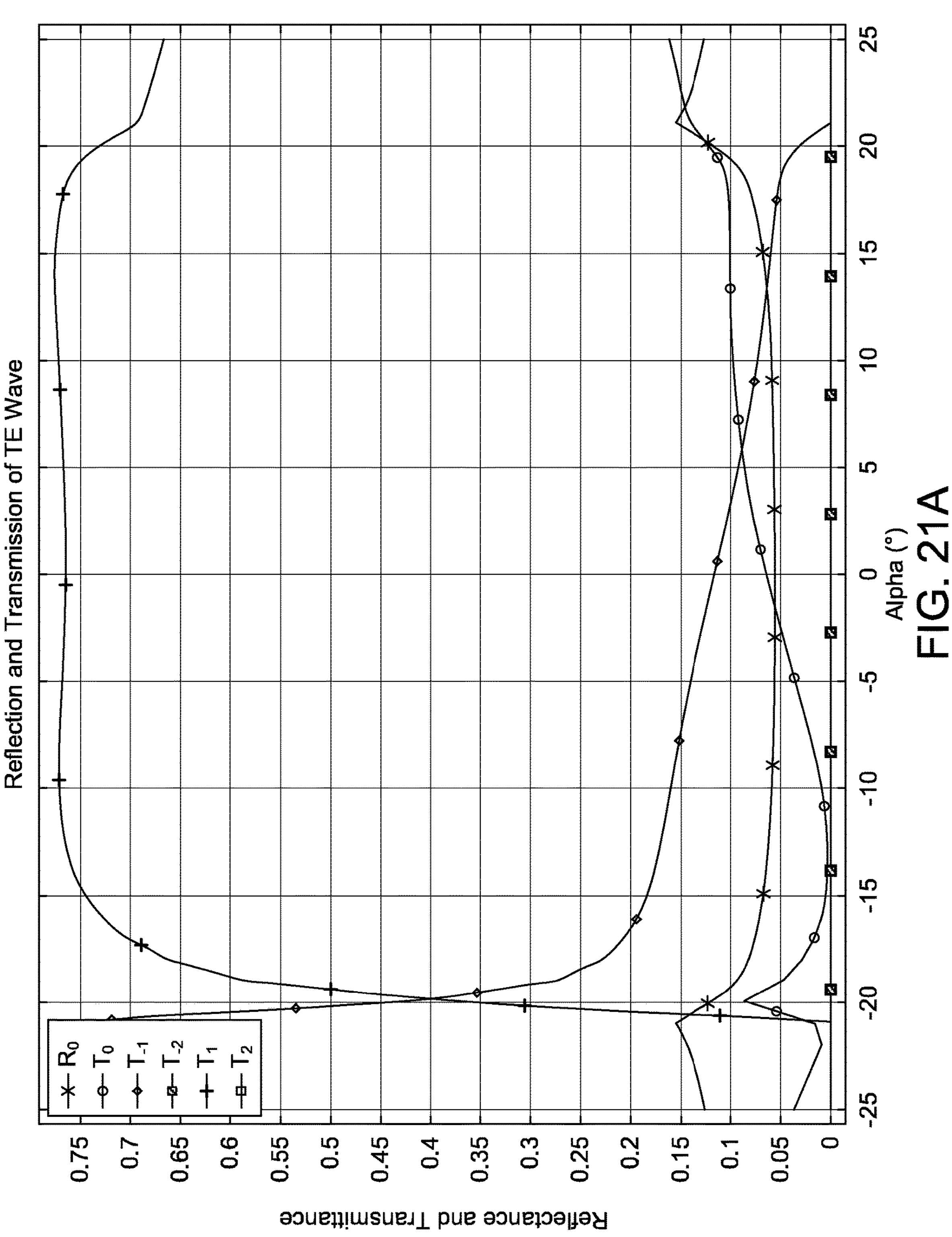
FIGS. 21A-21C illustrate reflectance and transmittance vs. angle of electromagnetic wave incidence ($\alpha$) for an example $TiO_2$ transmissive grating using a unit cell as depicted in FIG. 18A).
Figure 21B:
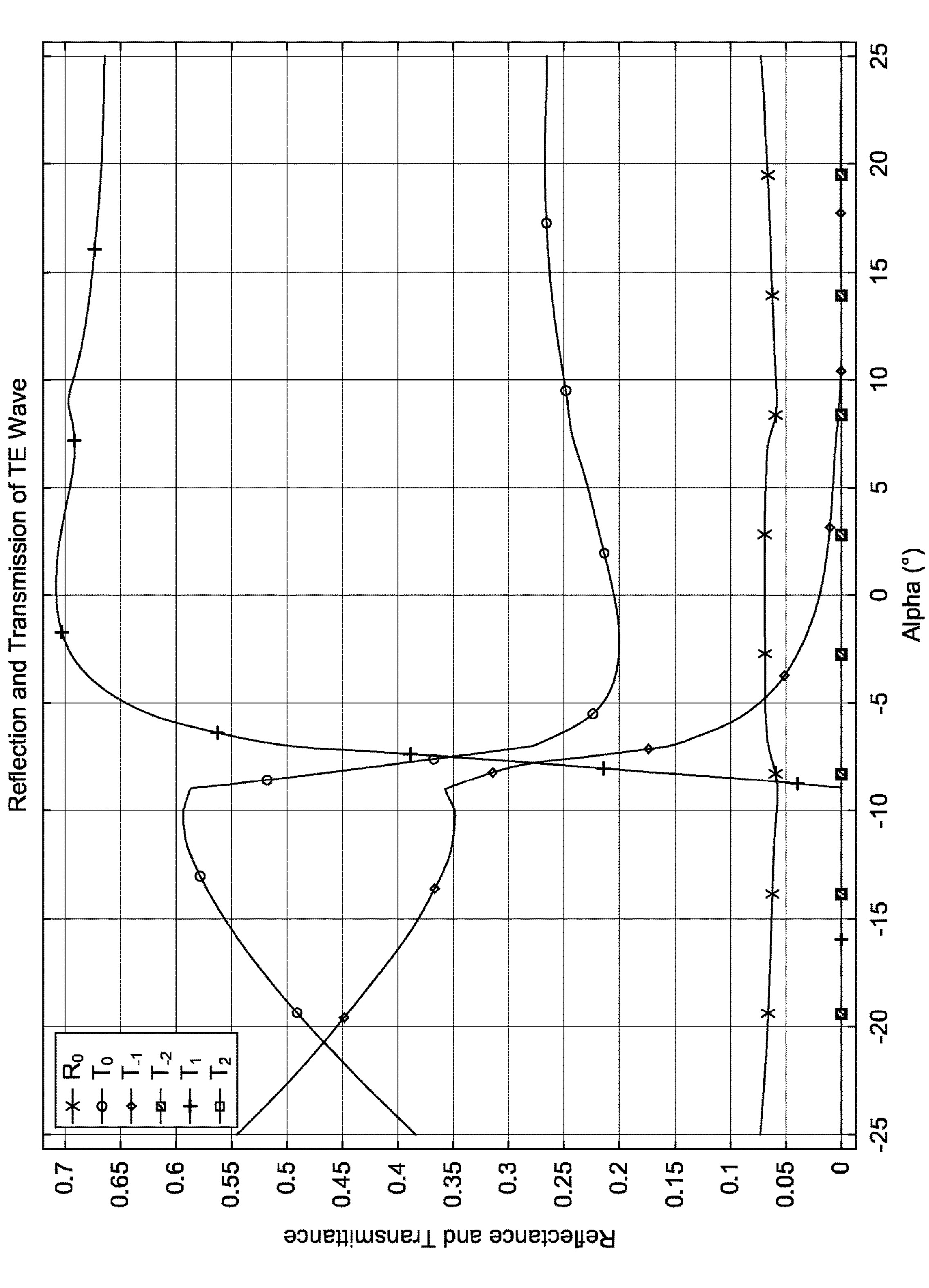
Figure 21C:
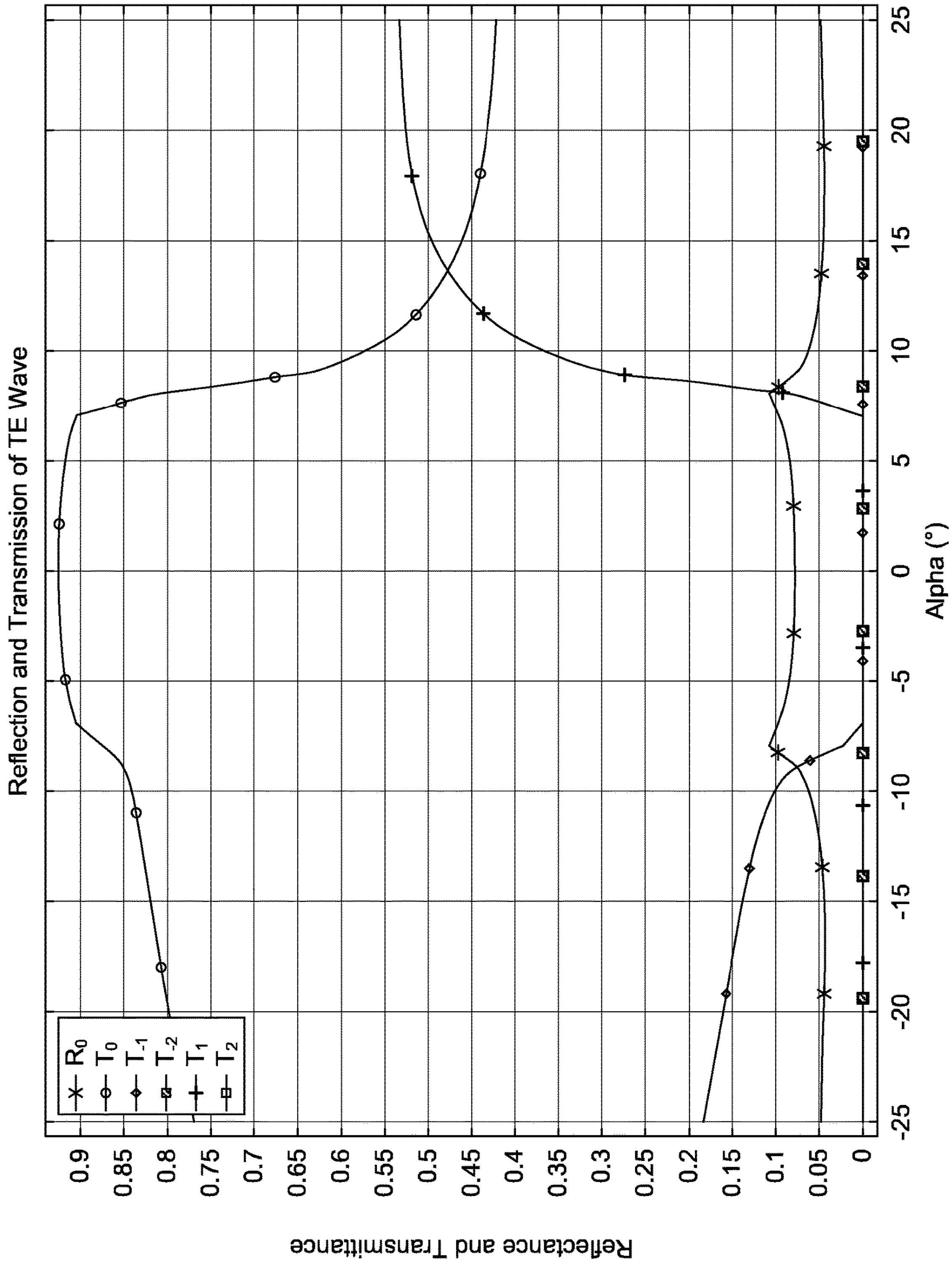

FIGS. 21A-21C illustrate reflectance and transmittance vs. angle of electromagnetic wave incidence (α) for an example $TiO_2$ transmissive grating (using a unit cell as depicted in FIG. 18A) with the following parameters: $n_1$=1.0, $n_3$=1.7, $w_1$=50 nm, $w_2$=60 nm, $h_1$=110 nm, $h_2$=55 nm, HL=10 nm; $H_{L3=5}$ nm; $H_{L3}$=0 nm, $d_r$=−15 nm. FIG. 21A illustrates results for blue light, λ=460 nm. FIG. 21B illustrates results for green light, λ=530 nm. FIG. 21C illustrates results for red light, λ=620 nm. For blue light, incident angles between about −15° and +15° are coupled into the waveguide by the transmissive grating. For green light, incident angles between about −9° and +15° are coupled into the waveguide by the transmissive grating. For red light, incident angles between about +7° and +15° are coupled into the waveguide by the transmissive grating.

It can be seen that the example diffraction grating has very high intensity for transmitted first order at λ=460 nm (see FIG. 21A). The maximal intensity for this case is equal to $\eta_{max}$=78%. In a more limited angular range (e.g. within a desired field of view of 30°) the diffraction uniformity is above 99%. The theoretically possible field of view for the proposed waveguide is about 42°. So, having such difference between theoretically possible and desired field of view, we can provide better diffraction uniformity for the angular range. At the wavelength corresponding to the green color we observe the shift of an angular distribution toward the higher angles of an incidence (see FIG. 21B). As a result, lower angles of an incidence will not be in-coupled into the waveguide by this transmissive diffraction grating. At the same time the efficiency of the zeroth order which will not be in-coupled by this grating is quite high. So, to cover the full desired angular range, this portion of transmitted light may be in-coupled by the second, reflective diffraction grating. Similar functionality will be observed at the wavelength corresponding to the red color.

Figure 22A:
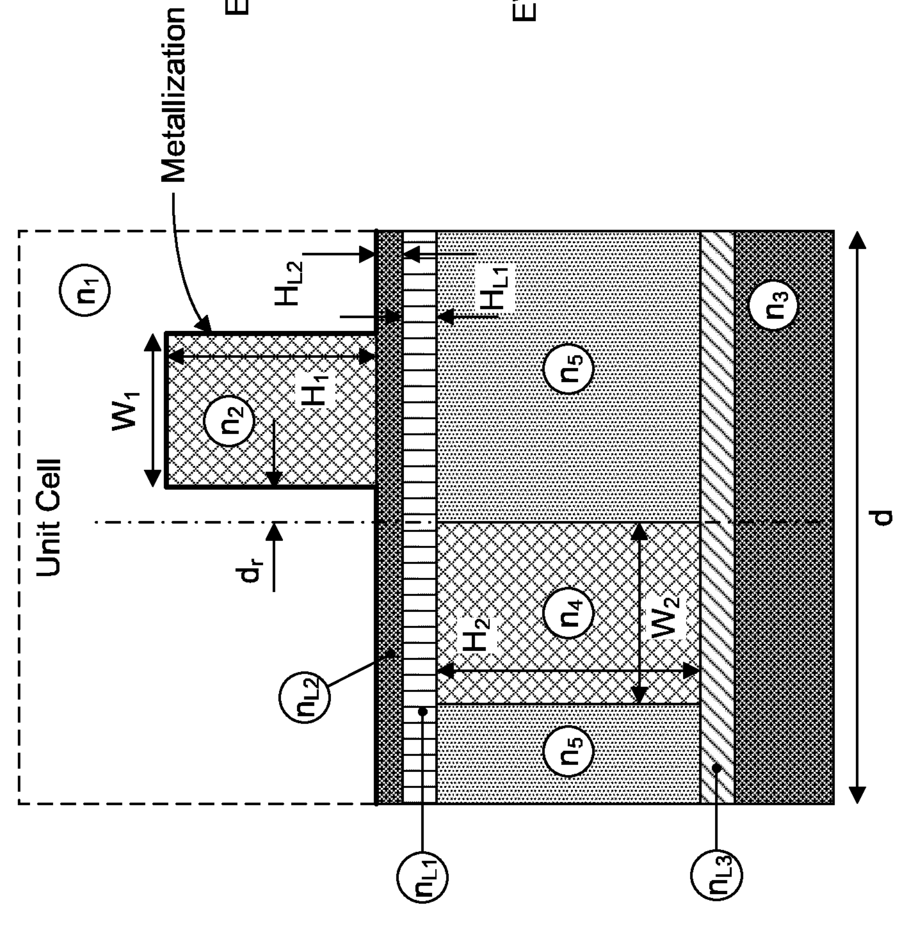
FIGS. 22A-22B are cross sectional views of a reflective grating unit cell according to some embodiments.
Figure 22B:
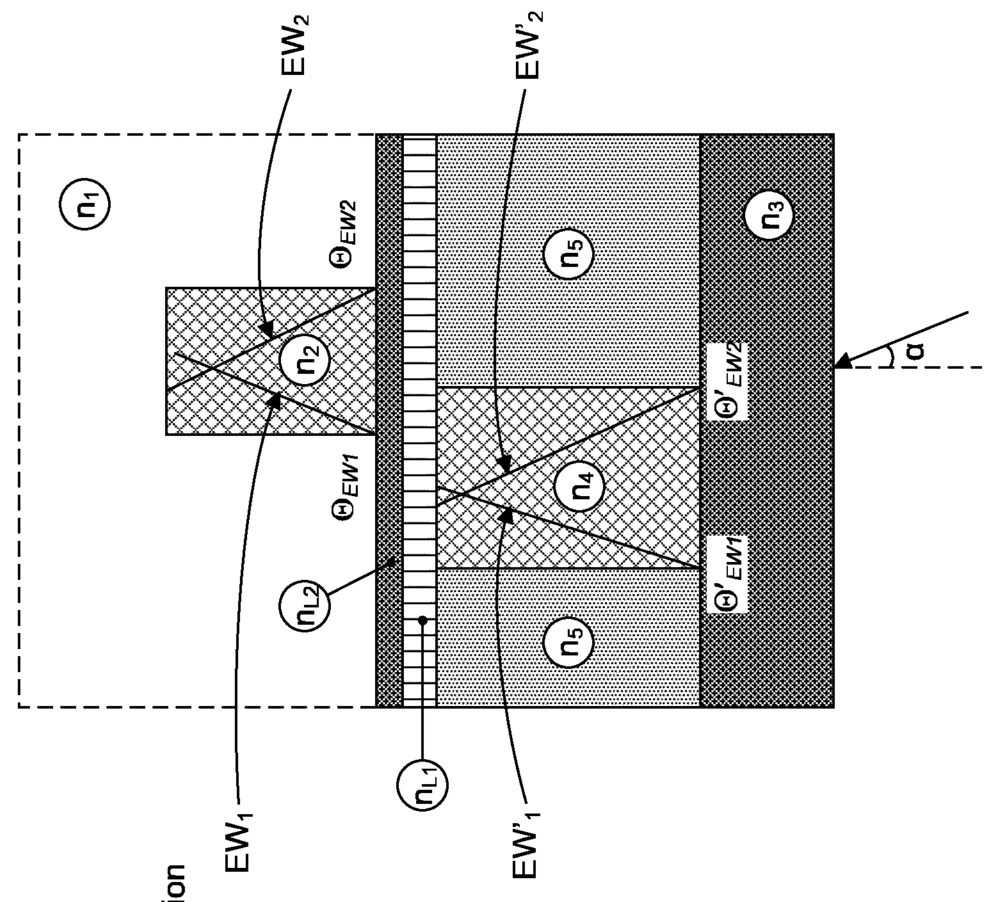

FIGS. 22A-22B are cross sectional views of a reflective grating unit cell according to some embodiments.

Some embodiments use a topology as discussed herein with high refractive index material elements for fabrication of a reflective diffraction grating with high diffraction uniformity and efficiency for incoupled diffraction orders. In example embodiments, to increase the effectiveness of the grating, a surface of the grating is at least partially metallized (see FIG. 22A). The constructive interference between the edge waves diffracted by the vertical edges and reflected by the top and walls of the high refractive index element and refracted plane wave will provide high intensity of reflected orders. FIG. 22B shows example positions and directions of edge waves generated by the single element of the reflective diffraction grating.

FIG. 20B illustrates the functionality of a reflective diffraction grating. The angular range [$\theta^C$; $\theta^G$] diffracts inside the waveguide into the angular range [$\phi^C$; $\phi^G$]. The portion of light diffracted by the reflective diffraction grating and in-coupled into the waveguide will propagate toward the right into the waveguide. (To get an opposite side propagation, the grating may be oriented differently.) An incident image inside the waveguide will be mainly transferred into the positive reflected diffraction order (first or second depending on the topology of the system). An incident image with the angles of incidence above $\theta^G$ will correspond to the zeroth reflected order $R_0$.

Consider an embodiment in which the reflective grating is configured to cover some angular range for the blue color. At the wavelength corresponding to the green color we will observe the shift of an angular distribution toward the lower angles of an incidence. Similar functionality will be observed at the wavelength corresponding to the red color.

Alternatively, consider an embodiment in which the reflective grating is configured to cover some angular range for the red color. At the wavelength corresponding to the green color we will observe the shift of an angular distribution toward the higher angles of an incidence. At the wavelength corresponding to the blue color we obtain bigger shift toward the higher angles of an incidence.

Figure 23A:
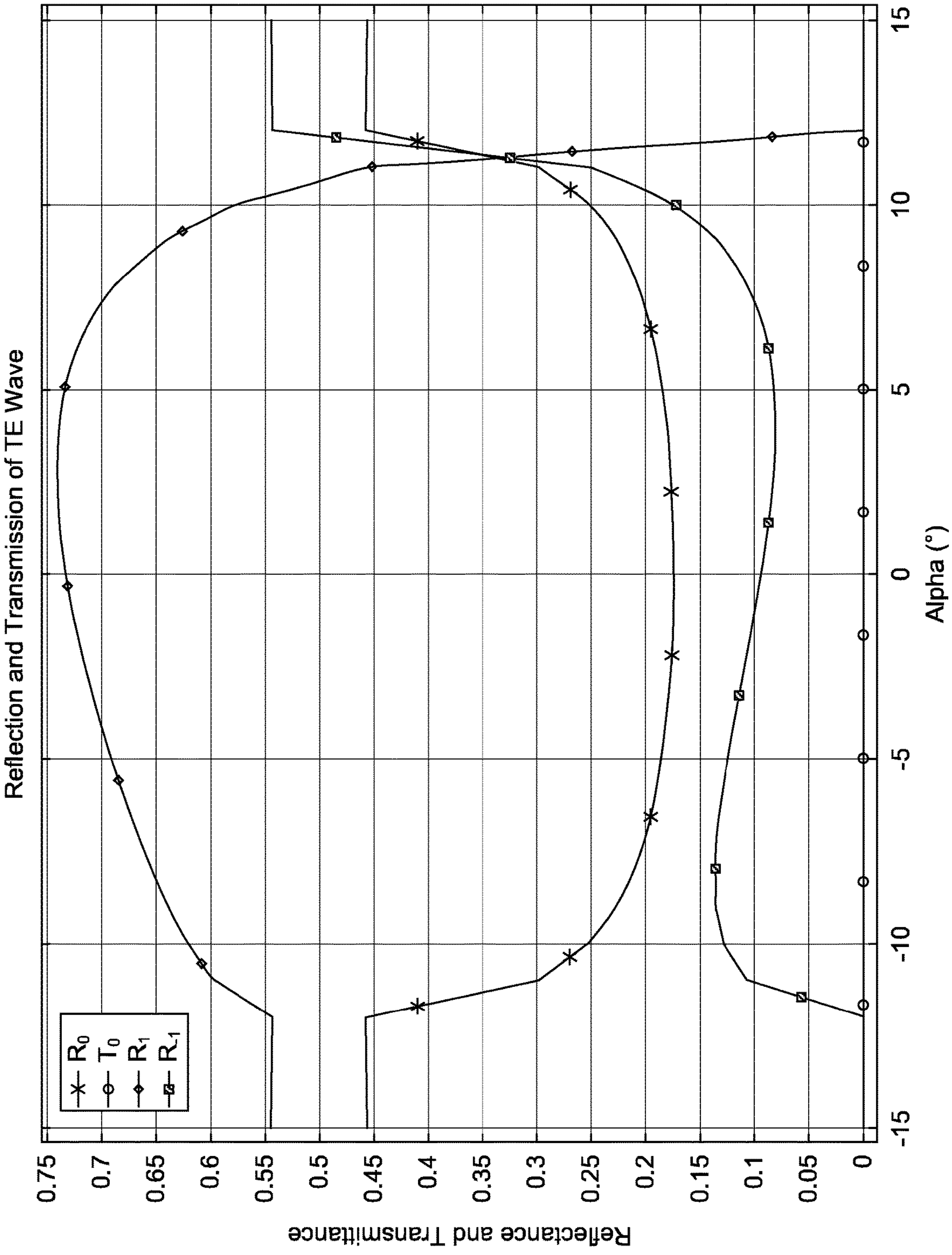
FIGS. 23A-23B illustrate reflectance and transmittance vs. angle of electromagnetic wave incidence for an example $TiO_2$ metallized reflective grating (using the unit cell of FIG. 22A).
Figure 23B:
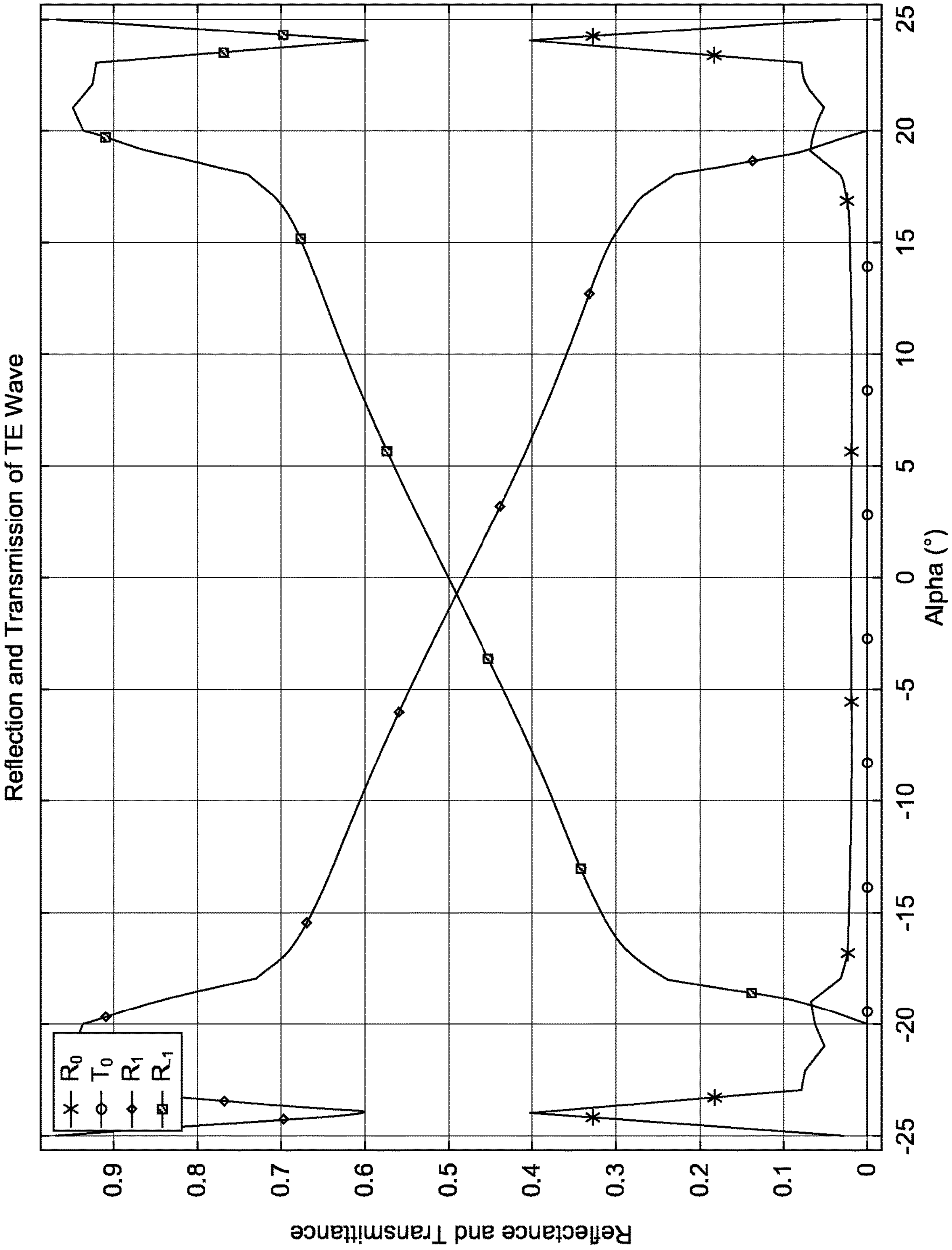

The computed reflectance for TE incidence of an example embodiment is plotted in FIGS. 23A-23B. It illustrates the transmittance for 0-order (which is equal to 0 due to the metallization) and reflectance for 0 and ±1 orders at λ=625 nm (FIG. 23A) for the grating with the substrate with $n_3$=1.7 and with the period d=463 nm. The system has been configured using $TiO_2$ as the material of the elements of the grating and phase modifying layer and $SiO_2$ as the host medium for the second embedded element of the grating. $Al_2O_3$ is the material of the stop layer in this example. A full-wave electromagnetic analysis was done for the 1D array of the elements. The simulation assumed that the system is infinite in the X- and Y-directions. The incident angles correspond to the angles of incidence in a material of the waveguide. It can be seen that such high refractive index material diffraction grating has high intensity (64%-74% for required angular range) for reflected first order. In a more limited angular range corresponding to a desired field of view of 30°, the diffraction uniformity is equal to 92.8%. The performance of the grating to in-couple the green color at wavelength λ=530 nm is shown in FIG. 23B. For the grating configured for the red color at the wavelength corresponding to the green color, there will be a shift of an angular distribution toward the higher angles of an incidence.

FIGS. 23A-23B illustrate reflectance and transmittance vs. angle of electromagnetic wave incidence (α) at $n_1$=1.0, $n_2$=$n_4$=nL, $n_3$=1.7, $n_{L2}$=$n_{L3}$ for $TiO_2$ metallized reflective grating (using the unit cell of FIG. 22A) with the following parameters: $w_1$=140 nm, $w_2$=120 nm, $h_1$=$h_2$=140 nm, $H_{L1}$=0 nm, $H_{L2}$=$H_{L3=5}$ nm, $d_r$=20 nm. FIG. 23A illustrates the results for λ=625 nm. FIG. 23B illustrates the results for λ=530 nm.

Figure 24A:
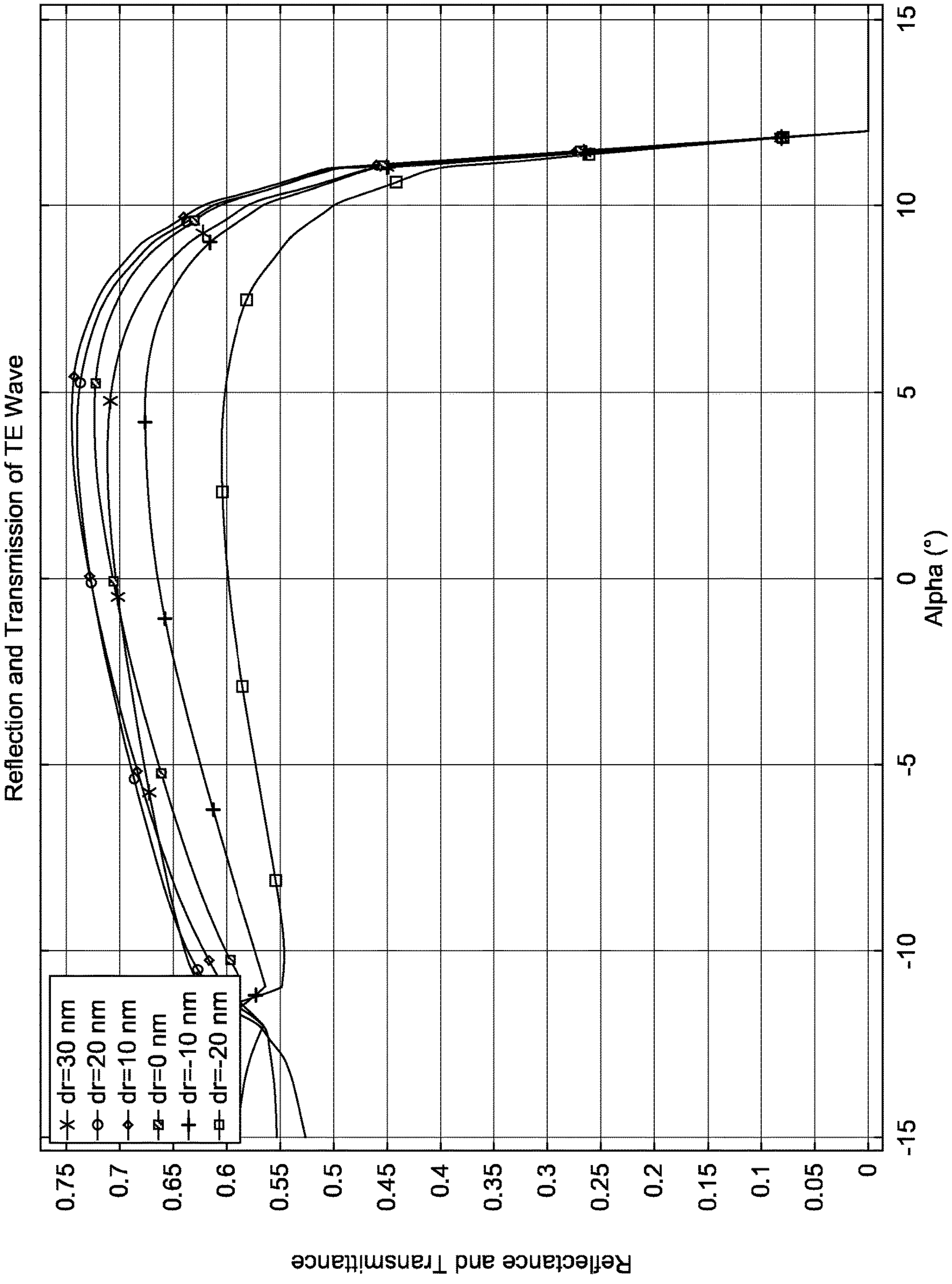
FIGS. 24A-24C illustrate reflectance and transmittance vs. angle of electromagnetic wave incidence for an example $TiO_2$ metallized reflective grating (using the unit cell depicted in FIG. 22A).
Figure 24B:
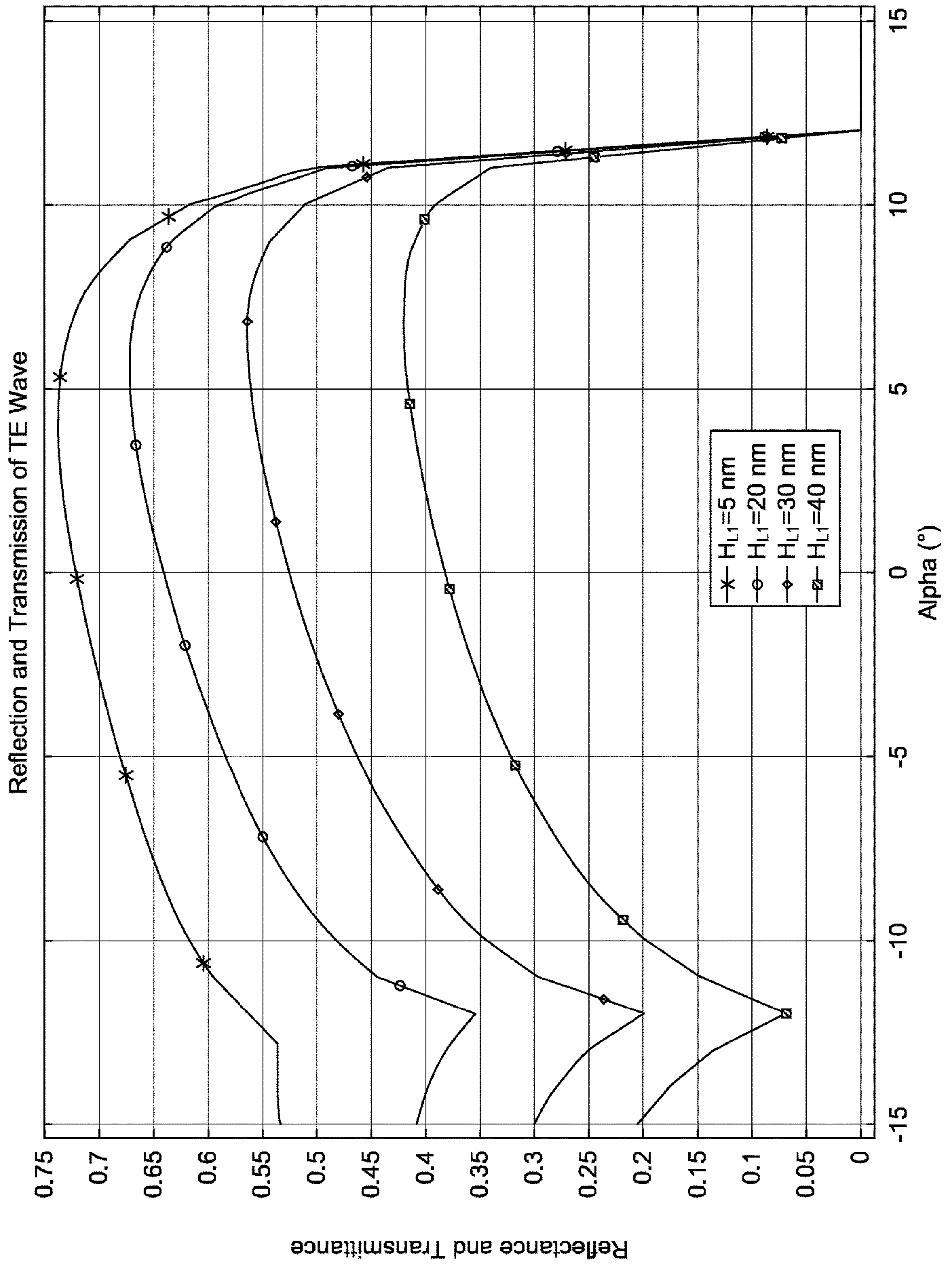
Figure 24C:
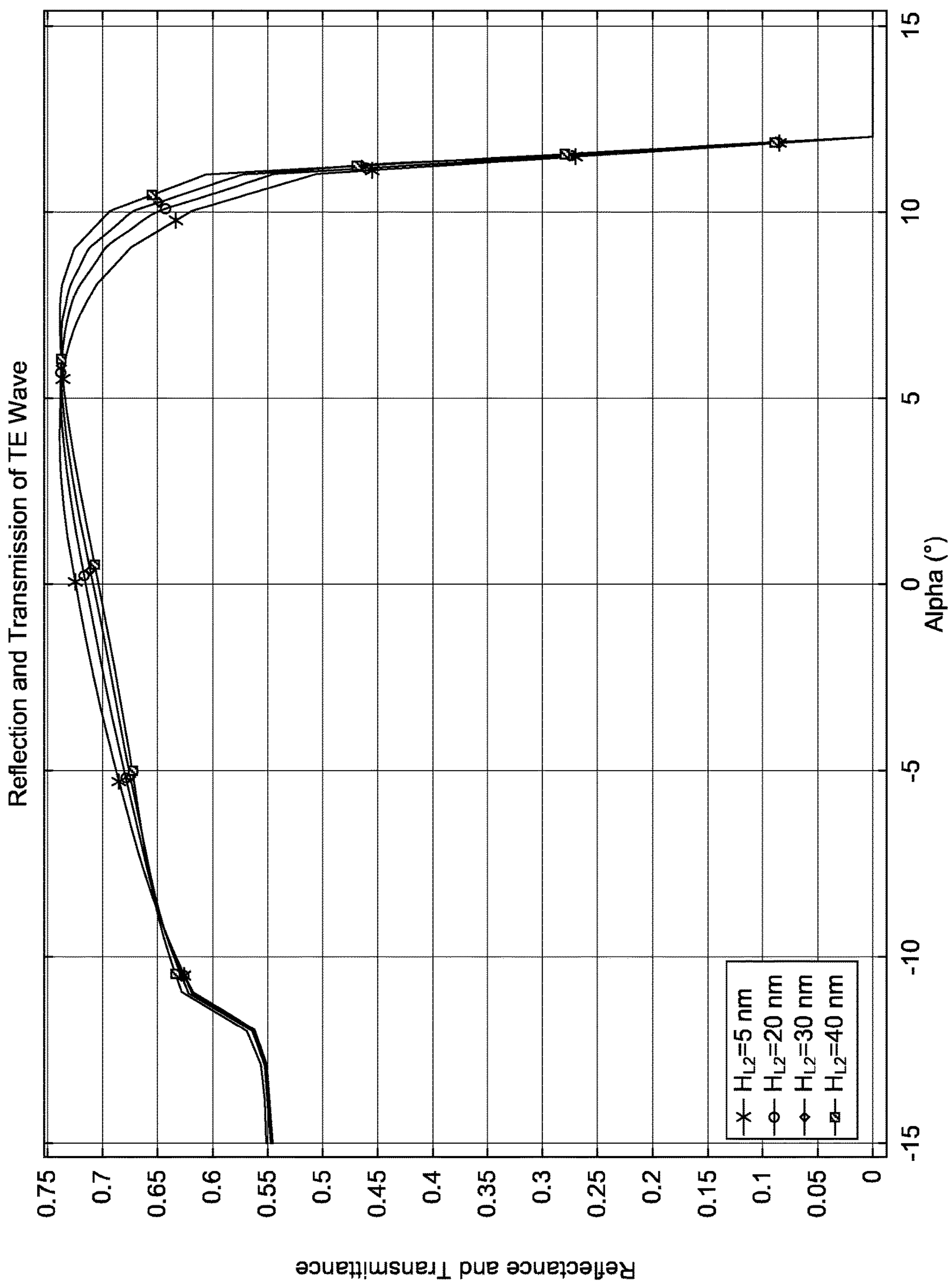

To demonstrate the effect of the elements' alignment in the grating, FIGS. 24A-24C illustrate the dependencies $R_1(\alpha)$ for six values of parameter $d_r$ (see FIG. 24A). It can be seen that changing the distance $d_r$ can change the reflectivity $R_1$ and diffraction uniformity of the reflected light. The computed reflectance $R_1$ for different thicknesses of the stop layer and phase-modifying layer is plotted in FIGS. 24B-24C. It can be seen that proper selection of the parameters of these layers could also improve the performance of the grating.

FIGS. 24A-24C illustrate reflectance and transmittance vs. angle of electromagnetic wave incidence (α) at λ=625 nm, $n_1$=1.0, $n_2$=$n_4$=$n_{L1}$=2.5884, $n_3$=1.7, $n_{L2}$=$n_{L3=1.7663}$, $n_5$=1.4572 for a $TiO_2$ metallized reflective grating (the unit cell is depicted in FIG. 22A) with the following parameters: $w_1$=140 nm, $w_2$=120 nm, $h_1$=$h_2$=140 nm, $H_{L3}$=0 nm. In FIG. 12A>24A, $H_{L1}$=$H_{L2}$=0 nm. In FIG. 24B, $H_{L2}$=0 nm, $d_r$=20 nm. In FIG. 24C, $H_{L1}$=0 nm, $d_r$=20 nm.

Figure 25A:
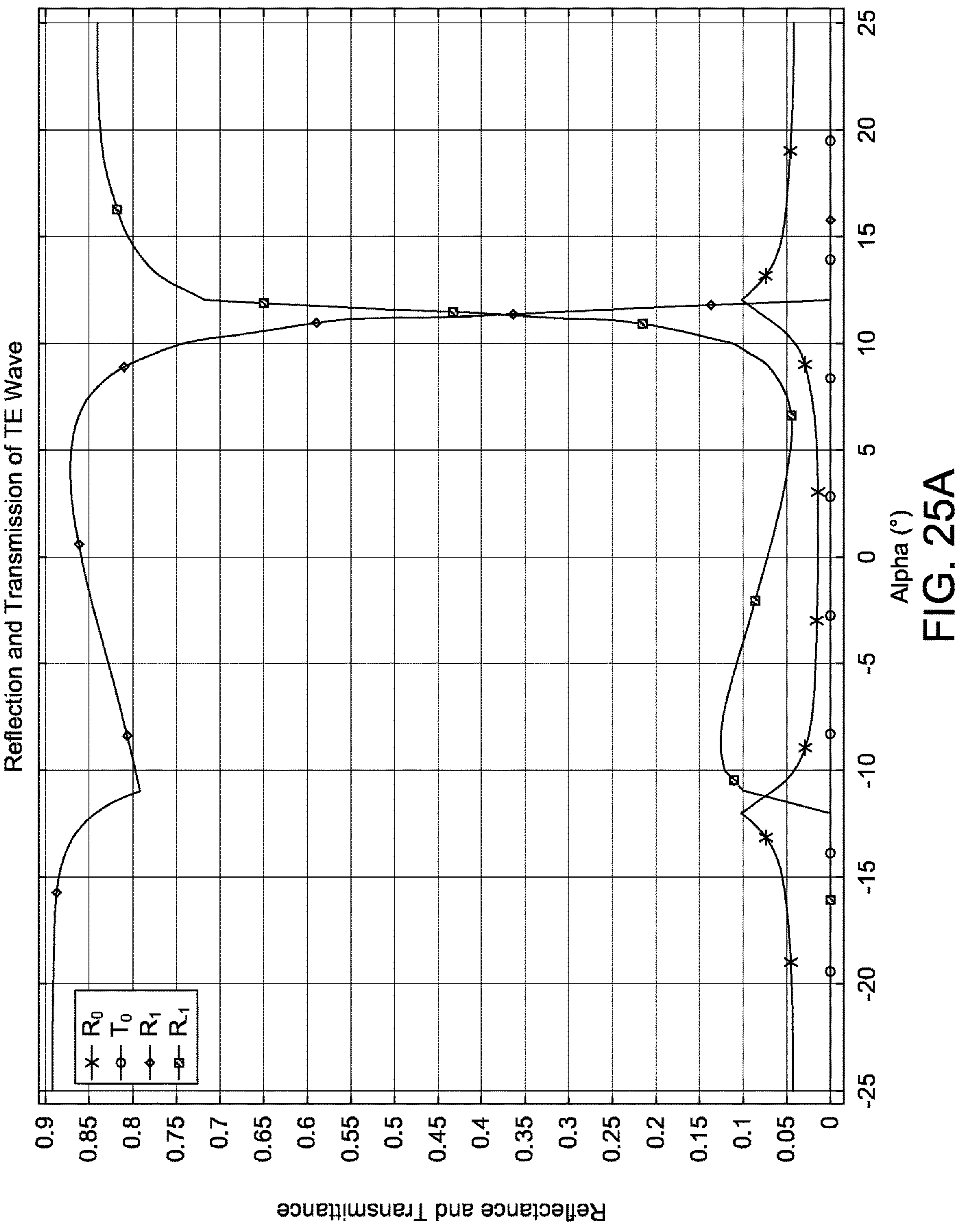
FIGS. 25A-25B illustrate reflectance and transmittance vs. angle of electromagnetic wave incidence for an example Si metallized reflective grating (using the unit cell of FIG. 22A).
Figure 25B:
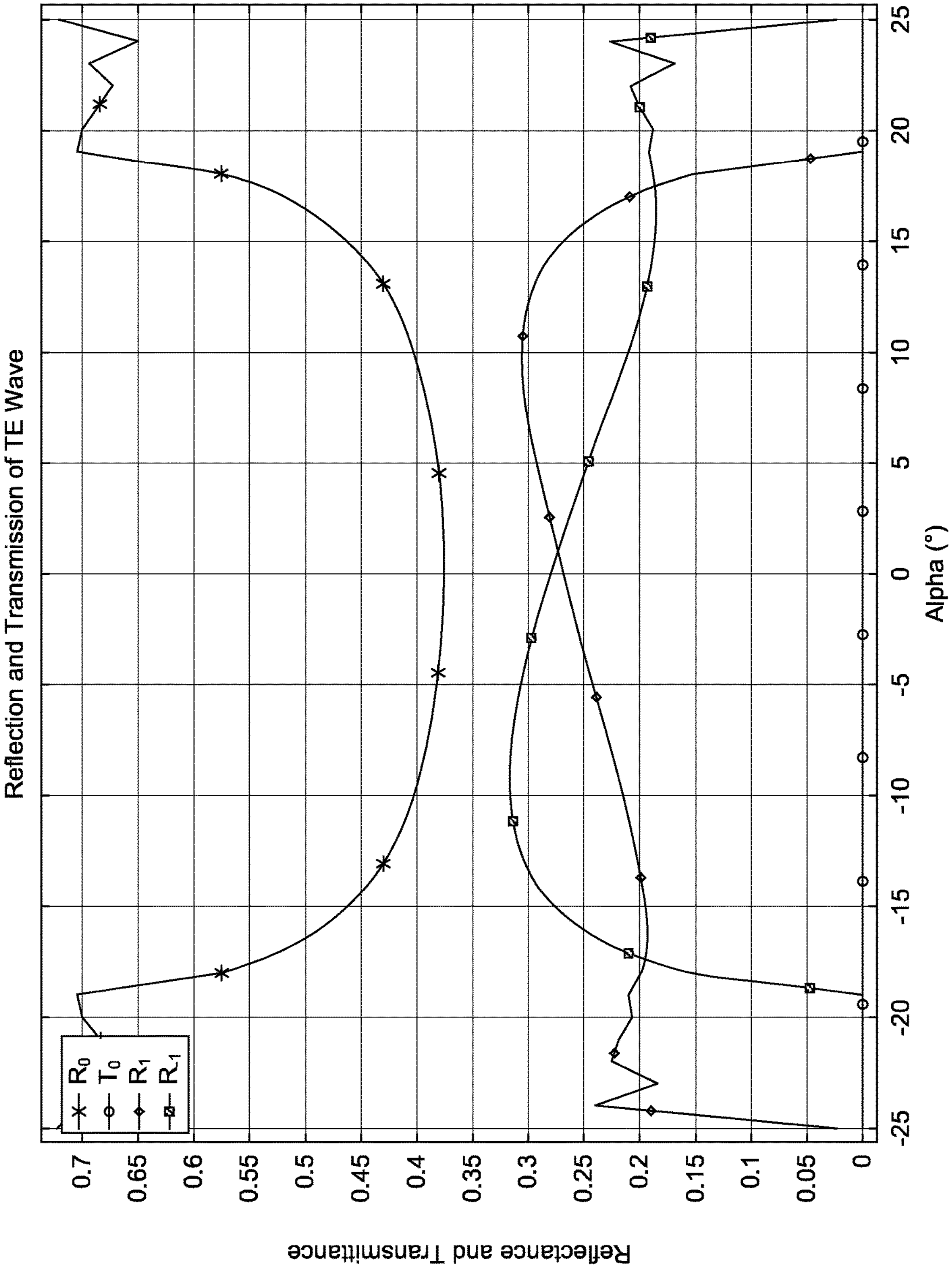

Changing the material of the elements of diffraction grating may also improve the efficiency of the reflected light. FIGS. 25A-25B show that for a diffraction grating using silicon (Si) as the material of the elements of this grating, R1 can be between 80%-87%, where the diffraction uniformity is above 95.8%. At the same time this grating does not provide high efficiency of $R_1$ at the wavelength of the green color. So, such grating could be used just to in-couple the red color.

FIGS. 25A-25B illustrate reflectance and transmittance vs. angle of electromagnetic wave incidence (α) at $n_1$=1.0, $n_3$=1.7, $n_{L2}$=$n_{L3}$, $n_2$=$n_4$ for a Si metallized reflective grating (using the unit cell of FIG. 22A) with the following parameters: $w_1$=120 nm, $w_2$=130 nm, $h_1$=$h_2$=60 nm, $H_{L1}$=0 nm, $H_{L2}$=10 nm, $H_{L3=5}$ nm, $d_r$=25 nm. FIG. 25A shows the results for λ=625 nm. FIG. 25B shows the results for λ=530 nm.

The combination of results from FIG. 21A-21C for a transmissive grating and results of FIGS. 23A-23B for a reflective grating show that the feasibility of an embodiment that uses a single waveguide with two diffraction gratings and an asymmetric unit cell design as described herein.

Example configurations of a dual-side waveguide display system using reflective and transmissive gratings are described below.

Figure 26:
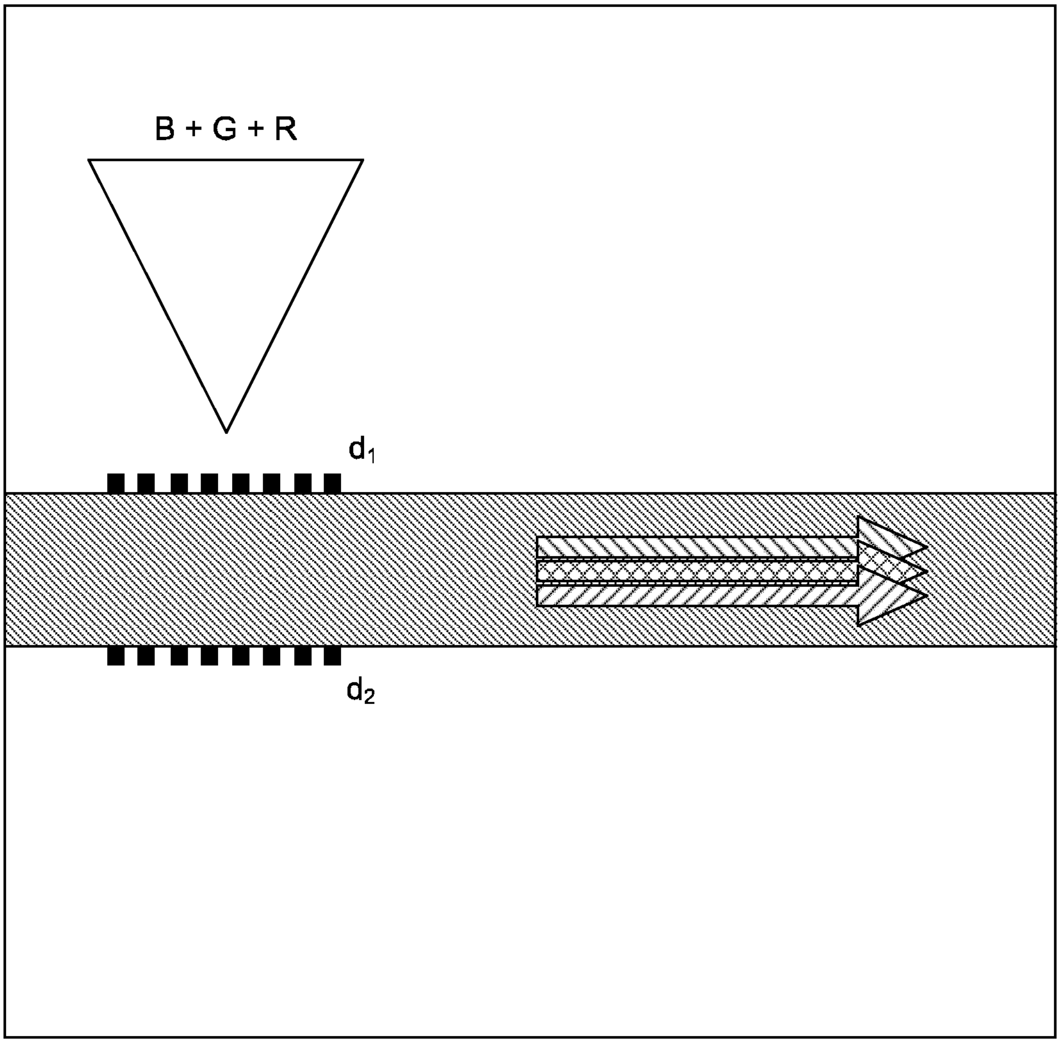
FIG. 26 is a schematic side view of an example waveguide display system according to some embodiments.

FIG. 26 is a schematic side view of an example waveguide display system according to some embodiments.

In an example system, as illustrated in FIG. 26, incident light is diffracted by two diffraction gratings and in-coupled into the waveguide. Proper combination of diffraction gratings as described in this disclosure provides a desirable field of view for a three-color image. FIGS. 20A-20B presented above demonstrate the functionality of example transmissive and reflective diffraction gratings. The angular range $[\theta^G_1; \theta^C_1]$ diffracts inside the waveguide into the angular range $[\phi^C_1; \phi^G_1]$ by the first transmissive grating. For the proposed orientation of the gratings (see FIGS. 18A-18B), passing through the transmissive diffraction grating into the waveguide, the image will propagate toward the right into the waveguide. Finally, the diffracted image inside the waveguide will be mainly transferred into the positive transmitted diffraction order (first or second depending on the topology of the system). In a case of light diffraction by the reflective diffraction grating which is from the bottom of the waveguide, an incident image will propagate also toward the right in the waveguide corresponding to the positive reflected diffraction order. The reflective grating is different from the transmissive one in that it may have a different pitch size calculated for the proper wavelength but the geometrical structure that emphasizes edge-waves may be of the same shape.

For the angular range $[\theta^G_1; \theta^C_1]$ (here $-\theta^C_1=\theta^G_1$ for on-axis in-coupling and $|\theta^C_1|\neq|\theta^G_1|$ for off-axis in-coupling) for the positive transmitted diffraction mode, the diffracted image will propagate toward the right into the waveguide. For the case of the blue color wavelength, light will be in-coupled by the top transmissive diffraction grating. For the case of other wavelengths, light will be partially in-coupled by the top transmissive diffraction grating, and a portion of the light will go through the first diffraction grating and will be diffracted by the second reflective diffraction grating which is from the bottom of the example waveguide. The corresponding angular range inside the waveguide is $[\phi^C_2; \phi^G_2]$. To increase the possible in-coupled field of view, the bottom reflective diffraction grating may be configured to in-couple the angular range $[\theta^C_2; \theta^G_2]$ for the light with maximal wavelength (red color for RGB system), where $\theta^G_2=\theta^G_{1R}+\Delta\theta$, $\theta^G_{1R}$ is the minimal incident angle in-coupled by the first grating at the red color wavelength, and $\Delta\theta$ is an angular overlapping.

For the bottom diffraction grating for the angular range $[\theta^C_2; \theta^G_2]$ the positive reflected mode of the diffracted image will propagate toward the right into the waveguide.

The transmissive and reflective diffraction gratings may have different periods calculated for the proper wavelength and may have different size and material of the elements. Nevertheless, the geometrical structure that emphasize the edge-waves can be of the same shape. Other embodiments may use elements of a different shape, providing an additional degree of freedom that may be used to improve the performance of the system.

Figure 27A:
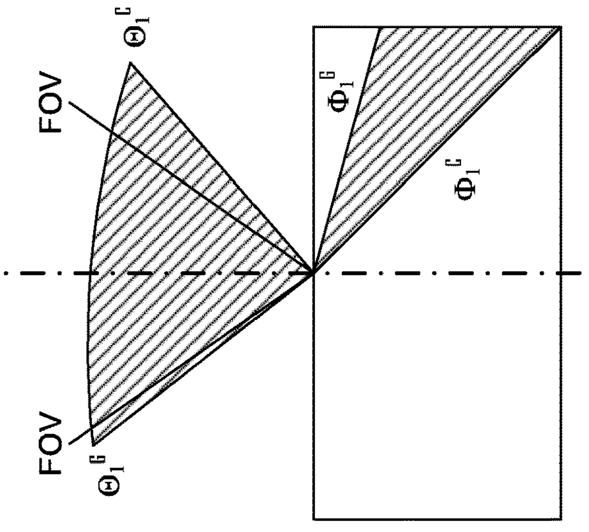
FIGS. 27A-27C are schematic side illustration of a single waveguide system operative to couple three different colors: blue (FIG. 27A), green (FIG. 27B) and red (FIG. 27C).
Figure 27B:
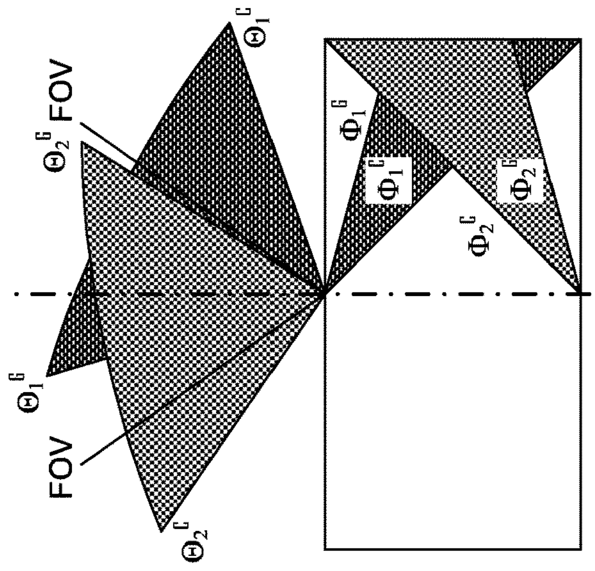
Figure 27C:
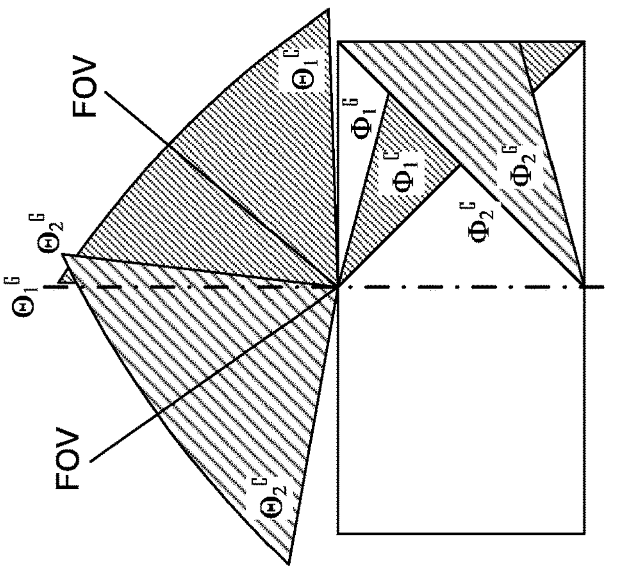

FIGS. 27A-27C are schematic side illustration of a single waveguide system operative to couple three different colors: blue (FIG. 27A), green (FIG. 27B) and red (FIG. 27C).

In some embodiments, to provide a single waveguide device in-coupling all three colors, the system may be configured as follows.

The first transmissive diffraction grating DG1 (with the period $d_1$, top of the waveguide) may be configured with a period selected to in-couple blue color wavelengths in the angular range covering the desired field of view of the device for these colors, assuming that for blue color in the case of symmetrical field of view, $$\Theta^C_{1,blue} \approx \Theta^G_{1,blue},$$

and in the case of non-symmetrical field of view $$|\Theta^C_{1,blue}| \neq |\Theta^G_{1,blue}|.$$

As in the previous case, to provide better uniformity of an in-coupled light, the corresponding characteristics of the waveguide may be selected to provide a higher theoretically possible field of view $\Delta\theta_1$ in comparison with desired FoV $\Delta\theta_2$ ($\Delta\theta_1=\Delta\theta_2+\gamma_M+\gamma_m$). Consider an embodiment in which the desired field of view is equal to $\Delta\theta_2=\theta_M-\theta_m$ ($\theta_m=-\theta_M$ for on-axis in-coupling and $|\theta_m|\neq|\theta_M|$ for off-axis in-coupling).The diffraction grating should may be configured to get high diffraction efficiency of corresponding orders $M_T$ in the desired angular range at blue color wavelengths. The angular range $[\theta^G_1; \theta^C_1]$ diffracts inside of the waveguide into the angular range $[\phi^C_1; \phi^G_1]$. To determine the period of DG1, the following system of diffraction grating equations may be used:

$$n_{3B}\sin\Phi^C_{1,blue} + n_1\sin\Theta^C_{1,blue} = \frac{M_T\lambda_B}{d_1}, \qquad (3.7)$$

$$n_{3B}\sin\Phi^G_{1,blue} + n_1\sin\Theta^G_{1,blue} = \frac{M_T\lambda_B}{d_1}.$$

Here sin $$\Phi^C_{1,blue} = \frac{1}{n_{3B}},$$

$M_T$ corresponds to the diffraction order of the first diffraction grating representing metagrating solution. According to an embodiment of the present disclosure, $$\Phi^G_{1,blue}$$

is chosen to approximately equal to 75°-90°. To calculate the pitch of the first diffraction grating, the following formula may be used:

$$d_1 = \frac{M_T\lambda_B}{n_{3B} + n_1\sin\Theta^G_{1,blue}}, \qquad (3.8)$$

where $$|\Theta^G_{1,blue}| = |\theta_m + \gamma_m|.$$

At the wavelength corresponding to the green color we will observe the shift of an angular distribution toward the higher angles of an incidence. Similar functionality will be observed at the wavelength corresponding to the red color.

Increasing the wavelength, we obtain an additional shift of an angular distribution toward the higher angles of an incidence. For all three colors all angles below $\theta^G{}_1$ transmit through the transmissive diffraction grating (it corresponds to the 0 transmitted order $T_0$) with a very high efficiency. This portion of incident image will be also diffracted by reflective grating DG2, and after it can be combined with the portion of image transmitted by the first grating DG1.

The second reflective diffraction grating DG2 (with the period $d_2$, bottom of the waveguide) may have a period selected for the red color wavelength and an angular range covering the portion of the field of view which was not in-coupled by the first grating. This diffraction grating should be also configured to get high diffraction efficiency of corresponding orders $M_R$ ($\pm 2^{nd}$ or $\pm 1^{st}$ depending on the topology) in the mentioned angular range at red color wavelength. The angular range $[\theta^C{}_2; \theta^G{}_2]$ diffracts inside of the waveguide into the angular range $[\phi^C{}_2; \phi^G{}_2]$. To configure the second reflective grating in-coupling red color, we may use such system of diffraction grating equations taking into account angular overlapping ($\Delta\theta$) for the incident rays in-coupling by the first transmissive and second reflective gratings $$\left(\Theta^G_{2,red} \approx \Theta^G_{1,red} + \Delta\theta\right):$$

$$n_{3R}\sin\Phi^G_{1,red} + n_1\sin\Theta^G_{1,red} = \frac{M_T\lambda_R}{d_1}, \qquad (3.9)$$

$$n_{3R}\sin\Phi^G_{2,red} - n_1\sin\left(\Theta^G_{1,red} + \Delta\theta\right) = \frac{M_R\lambda_R}{d_2},$$

Here $M_R$ corresponds to the diffraction order of the second reflective diffraction grating. According to an embodiment of the present disclosure, $$\Phi^G_1$$

and $$\Phi^G_2$$

are chosen approximately equal to 75°-90°. Finally, this results in $$d_2 \approx \frac{M_R\lambda_R}{n_{3R}\sin\Phi^G_{2,red} - n_1\sin\left(\Theta^G_{1,red} + \Delta\theta\right)}, \qquad (3.10)$$

$$\text{where } \Theta^G_{1,red} \approx \sin^{-1}\left(\left(-n_{3R}\sin\Phi^G_{1,red} + \frac{M_T\lambda_R}{d_1}\right)/n_1\right).$$

Example embodiments can increase the intensity and uniformity of asymmetric in-coupled orders for a desired field of view. Some embodiments use a high refractive index of the substrate/waveguide. Some embodiments provide high diffraction efficiency and diffraction uniformity for the new geometries of reflective and transmissive diffraction gratings. Some embodiments use a single waveguide to provide the desired field of view. Some embodiments provide a transmissive grating on the top of the waveguide and reflective grating on the bottom of the waveguide. The transmissive grating may be configured to in-couple blue or blue and green colors, and the reflective grating may be configured for the red color and portion of green.

4. Overview of Example Embodiments

Figure 28A:
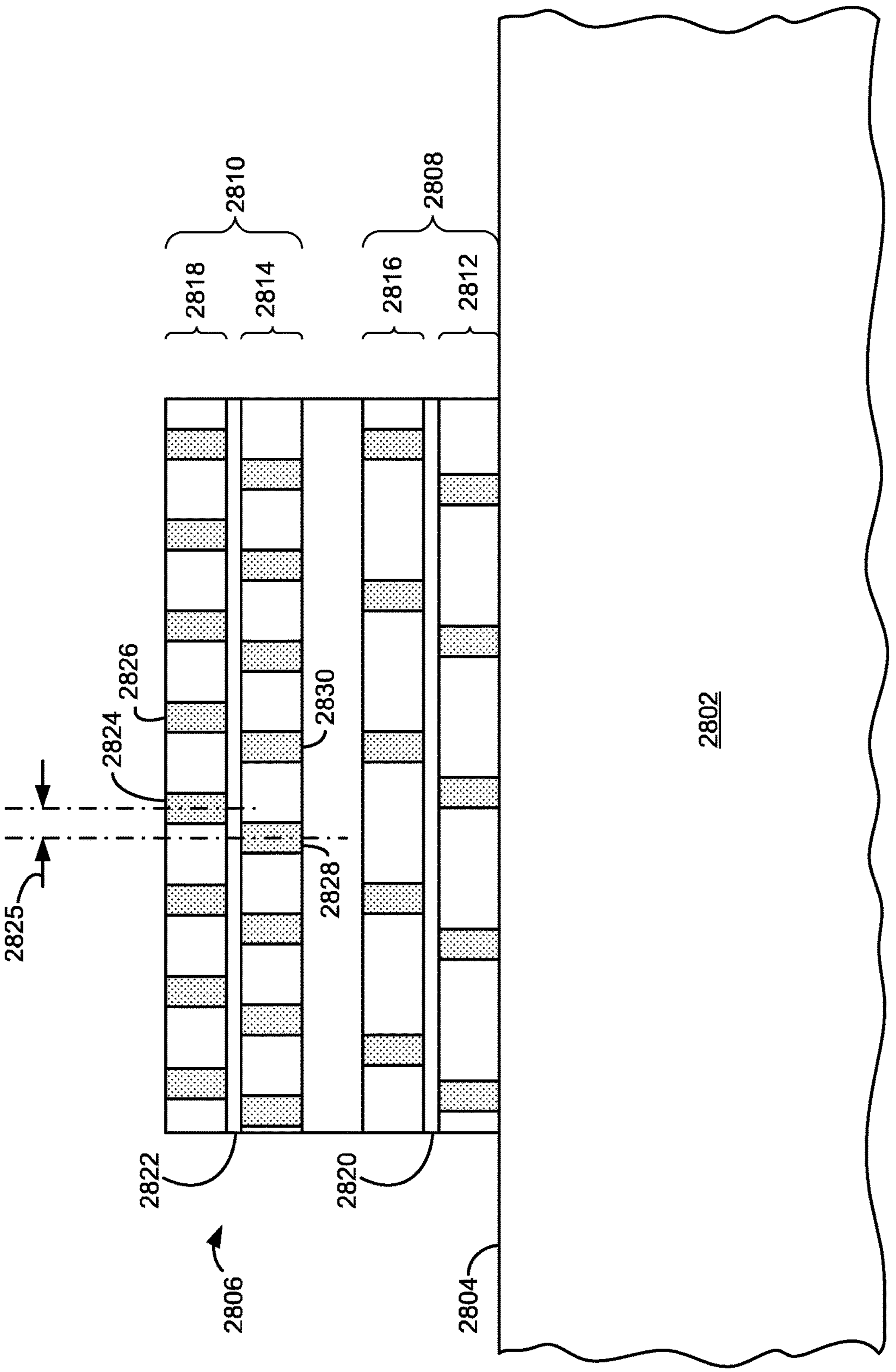
FIG. 28A is a schematic cross-sectional view of an embodiment in which two two-layer diffraction gratings are arranged on one surface of a waveguide.
Figure 28B:
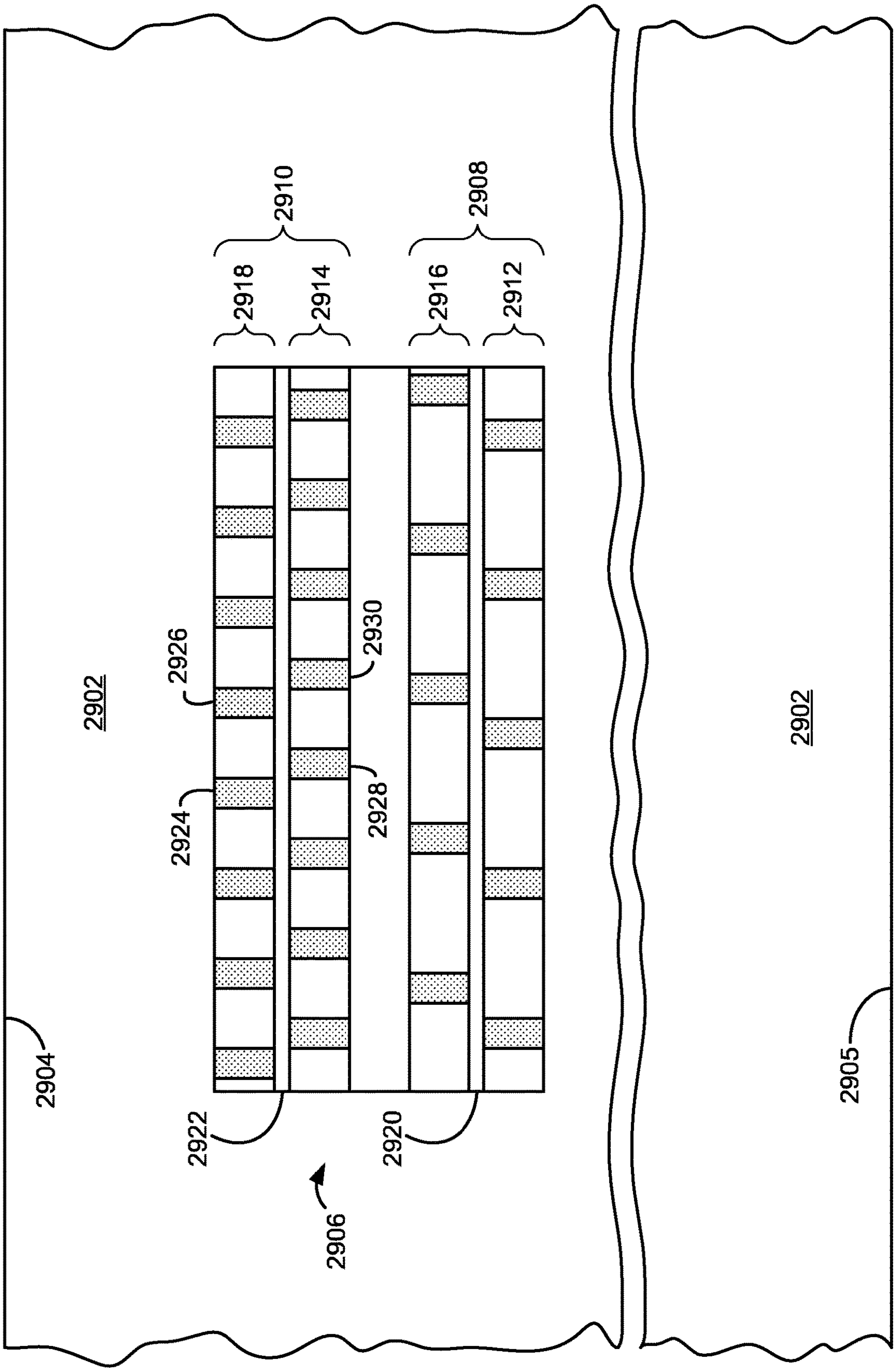
FIG. 28B is a schematic cross-sectional view of an embodiment in which two two-layer diffraction gratings are embedded between the surfaces of a waveguide.
Figure 28C:
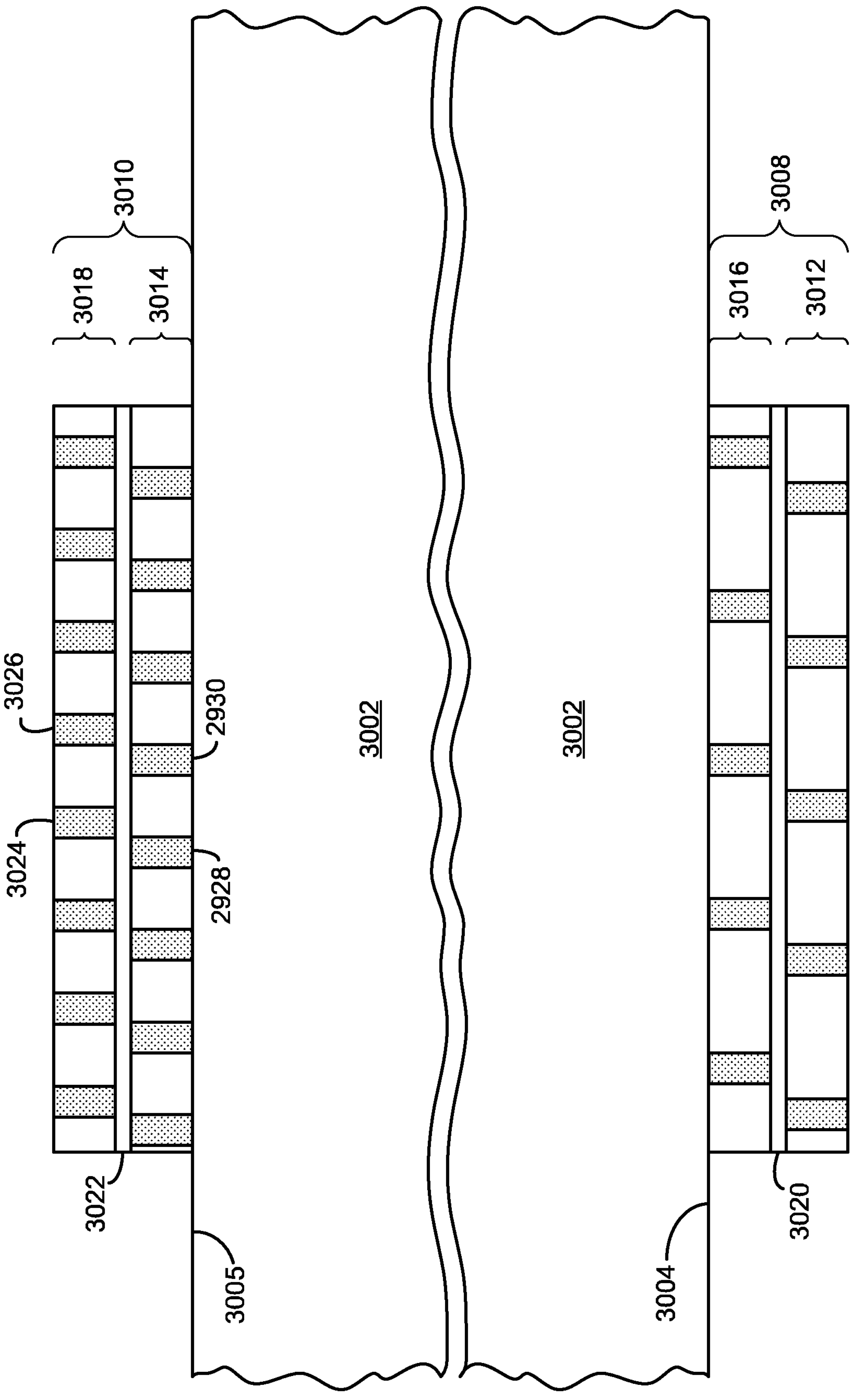
FIG. 28C is a schematic cross-sectional view of an embodiment in which two two-layer diffraction gratings are arranged on opposite surfaces of a waveguide.

FIGS. 28A-28C schematically illustrate examples of embodiments as described above. FIG. 28A illustrates an embodiment in which two two-layer diffraction gratings are arranged on one surface of a waveguide. FIG. 28B illustrates an embodiment in which two two-layer diffraction gratings are embedded between the surfaces of a waveguide. FIG. 28C illustrates an embodiment in which two two-layer diffraction gratings are arranged on opposite surfaces of a waveguide. In each of these embodiments, the gratings operate together as a coupler, which may be an in-coupler or an out-coupler.

The illustrations of FIGS. 28A-28C are shown as cross-sections of a portion of a waveguide with an associated coupler, the cross-section being taken in a plane perpendicular to grating lines of the coupler. While only a small number of grating elements are illustrated in each figure for the sake of legibility, it should be understood that practical embodiments may include many more grating elements, including embodiments with hundreds or thousands of such elements. Break lines are used in illustrating the waveguide substrate to convey that, in some embodiments, the extent and thickness of the substrate may be much greater than that of the coupler.

In the embodiment of FIG. 28A, a waveguide 2802 is provided, having a first surface 2804. A diffractive coupler 2806 is associated with the waveguide. In the illustrated example, the coupler 2806 is on the surface 2804, but in other embodiments, the coupler may be recessed in the surface or embedded between the surfaces of the waveguide. The diffractive coupler includes at least two diffraction gratings 2808, 2810. Each of the diffraction gratings has an associated grating period, and the periods of the two diffraction gratings may be different from one another. For example, the grating periods of different gratings may be configured to couple light with different wavelengths into or out of the waveguide substrate.

Each of the diffraction gratings includes a first layer of grating elements (2812, 2814) and a second layer of grating elements (2816, 2818). The first and second layers of grating elements are arranged in different planes. In some embodiments, one or more additional layers (2820, 2822), such as a phase-modifying layer, spacing layer, and/or a stop layer, may be provided between the respective first and second layers of grating elements. In some embodiments, the elements in the first layer are not in contact with the elements in the second layer.

The first and second layers of grating elements each have the grating period associated with the respective diffraction grating. For example, elements such as 2824 and 2826 in layer 2818 are arranged with the same period as elements such as 2828 and 2830 in layer 2814, that period being characteristic of the two-layer grating 2810.

Within each two-layer grating, the elements of the second layer are arranged with a lateral offset with respect to the elements of the first layer (to the left or right in the figure). The offset introduces an asymmetry that, as detailed in the simulation results presented above, allows for more light to be coupled in a desired direction (e.g. toward an exit pupil expander), as opposed to an opposite direction in which the light may be lost. Such an arrangement allows for enhanced in-coupling or out-coupling efficiency in a single-mode waveguide display system. In FIG. 28A, an example of a lateral offset 2825 is illustrated between the centers of elements 2824 and 2828. It should be noted that, with respect to FIGS. 6, 13, 18A, and 22A offset parameters such as $d_r$, and $d'_r$, can be zero even in cases where an offset is present because those parameters measure a distance between a left edge and a right edge.

In the example of FIG. 28A, the first diffraction grating 2808 overlays the substrate 2802 and the second diffraction grating 2810 overlays the first diffraction grating.

In the embodiment of FIG. 28B, a waveguide 2902 is provided, having a first surface 2904 and a second surface 2905. A diffractive coupler 2906 is associated with the waveguide. In the illustrated example, the coupler 2906 is embedded in the waveguide substrate between the first surface and the second surface. The diffractive coupler includes at least two diffraction gratings 2908, 2910. Each of the diffraction gratings has an associated grating period. The periods of the two diffraction gratings may be the same, or they may be different from one another. The grating periods of different gratings may be configured to couple light with different wavelengths into or out of the waveguide substrate.

Each of the diffraction gratings includes a first layer of grating elements (2912, 2914) and a second layer of grating elements (2916, 2918). The first and second layers of grating elements are arranged in different planes. In some embodiments, one or more additional layers (2920, 2922), such as a phase-modifying layer, spacing layer, and/or a stop layer, may be provided between the respective first and second layers of grating elements. In some embodiments, the elements in the first layer are not in contact with the elements in the second layer.

The first and second layers of grating elements each have the grating period associated with the respective diffraction grating. For example, elements such as 2924 and 2926 in layer 2918 are arranged with the same period as elements such as 2928 and 2930 in layer 2914, that period being characteristic of the two-layer grating 2910.

Within each two-layer grating, the elements of the second layer are arranged with a lateral offset with respect to the elements of the first layer (to the left or right in the figure). The offset introduces an asymmetry that, as detailed in the simulation results presented above, allows for more light to be coupled in a desired direction (e.g. toward an exit pupil expander), as opposed to an opposite direction in which the light may be lost. Such an arrangement allows for enhanced in-coupling or out-coupling efficiency in a single-mode waveguide display system.

In the embodiment of FIG. 28C, a waveguide 3002 is provided, having a first surface 3004 and a second surface 3005 substantially opposite the first surface. A diffractive coupler that includes two diffraction gratings is associated with the waveguide. In the illustrated example, the coupler includes a diffraction grating 3008 on the first surface and a diffraction grating 3010 on the second surface. Each of the diffraction gratings has an associated grating period. The periods of the two diffraction gratings 3008, 3010 may be different from one another. For example, the grating periods of different gratings may be configured to couple light with different wavelengths into or out of the waveguide substrate.

Each of the diffraction gratings includes a first layer of grating elements (3012, 3014) and a second layer of grating elements (3016, 3018). The first and second layers of grating elements are arranged in different planes. In some embodiments, one or more additional layers (3020, 3022), such as a phase-modifying layer, spacing layer, and/or a stop layer, may be provided between the respective first and second layers of grating elements. In some embodiments, the elements in the first layer are not in contact with the elements in the second layer.

The first and second layers of grating elements each have the grating period associated with the respective diffraction grating. For example, elements such as 3024 and 3026 in layer 3018 are arranged with the same period as elements such as 3028 and 3030 in layer 3014, that period being characteristic of the two-layer grating 3010.

Within each two-layer grating, the elements of the second layer are arranged with a lateral offset with respect to the elements of the first layer (to the left or right in the figure). The offset introduces an asymmetry that, as detailed in the simulation results presented above, allows for more light to be coupled in a desired direction (e.g. toward an exit pupil expander), as opposed to an opposite direction in which the light may be lost. Such an arrangement allows for enhanced in-coupling or out-coupling efficiency in a single-mode waveguide display system.

5. Further Embodiments

In some embodiments, a diffractive component includes: a substrate; a first diffraction grating (DG2) overlaying the substrate, the first diffraction grating comprising: a first layer of grating elements overlaying the substrate, the first layer comprising a plurality of first grating elements arranged with a first period; and a second layer of grating elements overlaying the first layer, the second layer comprising a plurality of second grating elements parallel to the first grating elements arranged with the first period, the second grating elements having a lateral offset from the first grating elements; and a second diffraction grating (DG1) overlaying the first diffraction grating, the second diffraction grating comprising: a third layer of grating elements overlaying the second layer, the third layer comprising a plurality of third grating elements arranged with a second period; and a fourth layer of grating elements overlaying the third layer, the fourth layer comprising a plurality of fourth grating elements parallel to the third grating elements arranged with the second period, the fourth grating elements having a lateral offset from the third grating elements.

In some embodiments, a spacing layer with a refractive index of $n_6$ is provided between the first diffraction grating and the second diffraction grating.

In some embodiments, the first, second, third, and fourth grating elements have respective refractive indices greater than a refractive index of the substrate.

Some embodiments further include a phase-modifying layer between the first layer of grating elements and the second layer of grating elements, between the third layer of grating elements and the fourth layer of grating elements, and/or between the substrate and the first layer of grating elements.

Some embodiments further include a stop layer between the first layer of grating elements and the second layer of grating elements, between the third layer of grating elements and the fourth layer of grating elements, and/or between the substrate and the first layer of grating elements.

In some embodiments, the first grating elements, the second grating elements, the third grating elements, and the fourth grating elements have a substantially rectangular cross-section.

In some embodiments, the first grating elements are not in contact with the second grating elements, the second grating elements are not in contact with the third grating elements, and the third grating elements are not in contact with the fourth grating elements.

In some embodiments, the substrate is a waveguide.

In some embodiments, the first period is 1.5 times as great as the second period.

In some embodiments, the diffractive component has a period d, and the first period is d/2.

In some embodiments, the diffractive component has a period d, and the second period is d/3.

An optical system according to some embodiments includes: a waveguide; and a diffractive in-coupler on the waveguide, the in-coupler comprising a meta-surface having a first diffraction grating with a first period and a second diffraction grating with a second period different from the first period.

A diffractive component according to some embodiments includes a waveguide substrate having a first surface and a second surface substantially opposite the first surface; and a metagrating embedded in the waveguide between the first surface and the second surface, the metagrating comprising a first diffraction grating (DG2) and a second diffraction grating (DG1) overlying the first diffraction grating.

In some embodiments, the first diffraction grating comprises: a first layer of grating elements, the first layer comprising a plurality of first grating elements arranged with a first period; and a second layer of grating elements overlaying the first layer, the second layer comprising a plurality of second grating elements parallel to the first grating elements arranged with the first period, the second grating elements having a lateral offset from the first grating elements.

In some embodiments, the second diffraction grating comprises: a third layer of grating elements being arranged over the second layer, the third layer comprising a plurality of third grating elements arranged with a second period; and a fourth layer of grating elements overlaying the third layer, the fourth layer comprising a plurality of fourth grating elements parallel to the third grating elements arranged with the second period, the fourth grating elements having a lateral offset from the third grating elements.

In some embodiments, the first and second period are the same. In other embodiments, the periods are different.

In some embodiments, the first, second, third, and fourth grating elements have respective refractive indices greater than a refractive index of the substrate.

In some embodiments, the diffractive component further includes a phase-modifying layer between the first layer of grating elements and the second layer of grating elements and/or between the third layer of grating elements and the fourth layer of grating elements.

In some embodiments, the diffractive component further includes a stop layer between the first layer of grating elements and the second layer of grating elements and/or between the third layer of grating elements and the fourth layer of grating elements.

In some embodiments, the diffractive component further includes a first stop layer between the first diffraction grating and a first inner surface of the waveguide substrate and/or a second stop layer between the second diffraction grating and a second inner surface of the waveguide substrate.

In some embodiments, the first grating elements, the second grating elements, the third grating elements, and the fourth grating elements have a substantially rectangular cross-section.

In some embodiments, the first grating elements are not in contact with the second grating elements, the second grating elements are not in contact with the third grating elements, and the third grating elements are not in contact with the fourth grating elements.

In some embodiments, the first diffraction grating is a transmissive diffraction grating and the second diffraction grating is a reflective diffraction grating.

In some embodiments, a material with a low refractive index ($n_1$) is provided between the first diffraction grating and the second diffraction grating.

An optical system according to some embodiments includes: a waveguide substrate having a first surface and a second surface substantially opposite the first surface; and a metagrating in-coupler embedded in the waveguide between the first surface and the second surface, the metagrating comprising a first diffraction grating (DG2) and a second diffraction grating (DG1) overlying the first diffraction grating. The first and second diffraction gratings may have the same period, or they may have different periods. In some embodiments, a material with a low refractive index ($n_1$) is provided between the first diffraction grating and the second diffraction grating.

In some embodiments, a diffraction grating includes a substrate having a first refractive index $n_3$; a first layer of grating elements overlaying the substrate, the first layer comprising a plurality of first grating elements having a second refractive index $n_4>n_3$ arranged with a period d; and a second layer of grating elements overlaying the first layer, the second layer comprising a plurality of second grating elements parallel to the first grating elements having a third refractive index $n_2>n_3$ arranged with the period d, the second grating elements having a lateral offset from the first grating elements.

Some embodiments further include a metallized surface over the second grating elements.

Some embodiments further include a phase-modifying layer between the first layer of grating elements and the second layer of grating elements.

Some embodiments further include a stop layer between the first layer of grating elements and the second layer of grating elements and/or between the substrate and the first layer of grating elements.

In some embodiments, the first grating elements and the second grating elements have a substantially rectangular cross-section. In some embodiments, the first grating elements and/or the second grating elements have a prismatic cross-section.

In some embodiments, the first grating elements are not in contact with the second grating elements.

In some embodiments, the substrate is a waveguide.

In some embodiments, an optical system includes a waveguide having a first surface and a second surface substantially opposite the first surface; a transmissive diffractive in-coupler on the first surface; and a reflective diffractive in-coupler on the second surface; wherein at least one of the transmissive diffractive in-coupler and the reflective diffractive in-coupler is a diffraction grating as described herein.

While the structures are primarily described herein for use with waveguide displays, applications of the structures described herein are not limited to visible light applications. With appropriate changes to the dimensions of grating elements and their spacing, embodiments may be used for electromagnetic wavelengths that are longer or shorter than those of visible light.

In the present disclosure, modifiers such as “first,” “second,” “third,” and the like are sometimes used to distinguish different features. These modifiers are not meant to imply any particular order of operation or arrangement of components. Moreover, the terms "first," "second," "third," and the like may have different meanings in different embodiments. For example, a component that is the "first" component in one embodiment may be the "second" component in a different embodiment.

Although features and elements are described above in particular combinations, one of ordinary skill in the art will appreciate that each feature or element can be used alone or in any combination with the other features and elements.

What is claimed:

1. An optical system comprising:

a waveguide substrate; and a diffractive coupler associated with the waveguide substrate, the diffractive coupler comprising a first diffraction grating and a second diffraction grating;

wherein:

the first diffraction grating overlays the second diffraction grating and the second diffraction grating overlays the waveguide substrate, and each of the diffraction gratings includes a first layer of grating elements and a second layer of grating elements, the first and second layers of grating elements being arranged in different planes, the first and second layers of grating elements having a same grating period associated with the respective diffraction grating, and the grating elements of the second layer having a lateral offset with respect to the grating elements of the first layer.

2. The optical system of claim 1, wherein the diffraction gratings have different associated grating periods.

3. The optical system of claim 1, wherein the diffraction gratings have the same associated grating period.

4. The optical system of claim 1, wherein the waveguide substrate has a refractive index and grating elements of the diffraction gratings have a refractive index greater than the refractive index of the waveguide substrate.

5. The optical system of claim 1, further comprising a phase-modifying layer between the first and second layers of grating elements of at least one of the diffraction gratings.

6. The optical system of claim 1, further comprising a stop layer between the first and second layers of grating elements of at least one of the diffraction gratings.

7. The optical system of claim 1, further comprising a stop layer between the waveguide substrate and at least one of the diffraction gratings.

8. The optical system of claim 1, wherein the grating elements of the diffraction gratings have a substantially rectangular cross-section.

9. The optical system of claim 1, wherein one of the first or second diffraction gratings is a transmissive diffraction grating and one of the first or second diffraction gratings is a reflective diffraction grating.

10. The optical system of claim 9, further comprising a metallized surface over the second diffraction grating.

11. The optical system of claim 1, wherein the grating elements in any one of the layers of grating elements are not in contact with grating elements in any other of the layers of grating elements.

12. The optical system of claim 1, wherein the diffractive coupler is asymmetric.

13. An optical system comprising:

a waveguide substrate having a first surface and a second surface substantially opposite the first surface; and a diffractive coupler associated with the waveguide substrate, the diffractive coupler comprising a first diffraction grating and a second diffraction grating;

wherein:

the first and second diffraction gratings are embedded in the waveguide substrate between the first surface and the second surface, and each of the diffraction gratings includes a first layer of grating elements and a second layer of grating elements, the first and second layers of grating elements being arranged in different planes, the first and second layers of grating elements having a same grating period associated with the respective diffraction grating, and the grating elements of the second layer having a lateral offset with respect to the grating elements of the first layer.

14. An optical system comprising:

a waveguide substrate having a first surface and a second surface substantially opposite the first surface; and a diffractive coupler associated with the waveguide substrate, the diffractive coupler comprising a first diffraction grating on the first surface and a second diffraction grating on the second surface;

wherein:

the first diffraction grating overlays the second diffraction grating and the second diffraction grating overlays the waveguide substrate, and each of the diffraction gratings includes a first layer of grating elements and a second layer of grating elements, the first and second layers of grating elements being arranged in different planes, the first and second layers of grating elements having a same grating period associated with the respective diffraction grating, and the grating elements of the second layer having a lateral offset with respect to the grating elements of the first layer.

15. The optical system of claim 13, wherein the waveguide substrate has a refractive index and grating elements of the diffraction gratings have a refractive index greater than the refractive index of the waveguide substrate.

16. The optical system of claim 13, wherein one of the first or second diffraction gratings is a transmissive diffraction grating and one of the first or second diffraction gratings is a reflective diffraction grating.

17. The optical system of claim 13, wherein the grating elements in any one of the layers of grating elements are not in contact with grating elements in any other of the layers of grating elements.

18. The optical system of claim 14, wherein the waveguide substrate has a refractive index and grating elements of the diffraction gratings have a refractive index greater than the refractive index of the waveguide substrate.

19. The optical system of claim 14, wherein one of the first or second diffraction gratings is a transmissive diffraction grating and one of the first or second diffraction gratings is a reflective diffraction grating.

20. The optical system of claim 14, wherein the grating elements in any one of the layers of grating elements are not in contact with grating elements in any other of the layers of grating elements.

* * * * *